(12) United States Patent
Matinkhoo et al.

(10) Patent No.: US 12,492,179 B2
(45) Date of Patent: Dec. 9, 2025

(54) SUBSTITUTED ETHYLAMINE FUSED HETEROCYCLIC MESCALINE DERIVATIVES

(71) Applicant: Enveric Biosciences Canada Inc., Calgary (CA)

(72) Inventors: Kaveh Matinkhoo, Calgary (CA); David James Press, Calgary (CA); Jessica Bik-jing Lee, Calgary (CA); Ye Cai, Edmonton (CA); Jillian M. Hagel, Calgary (CA); Peter J. Facchini, Calgary (CA)

(73) Assignee: Enveric Biosciences Canada Inc., Calgary (CA)

( * ) Notice: Subject to any disclaimer, the term of this patent is extended or adjusted under 35 U.S.C. 154(b) by 0 days.

(21) Appl. No.: 18/541,304

(22) Filed: Dec. 15, 2023

(65) Prior Publication Data

US 2024/0246924 A1 Jul. 25, 2024

Related U.S. Application Data

(60) Provisional application No. 63/433,256, filed on Dec. 16, 2022.

(51) Int. Cl.
| | | |
|---|---|---|
| C07D 317/60 | (2006.01) | |
| C07D 317/58 | (2006.01) | |
| C07D 317/64 | (2006.01) | |
| C07D 405/06 | (2006.01) | |
| C07D 413/06 | (2006.01) | |

(52) U.S. Cl.
CPC ......... *C07D 317/60* (2013.01); *C07D 317/58* (2013.01); *C07D 317/64* (2013.01); *C07D 405/06* (2013.01); *C07D 413/06* (2013.01)

(58) Field of Classification Search
CPC .................................................. C07D 317/60
See application file for complete search history.

(56) References Cited

U.S. PATENT DOCUMENTS

| | | | | |
|---|---|---|---|---|
| 2009/0156590 A1* | 6/2009 | Frank | ...................... | A61P 25/24 548/217 |
| 2022/0265582 A1* | 8/2022 | Liechti | .................. | A61K 31/13 |

FOREIGN PATENT DOCUMENTS

| | | | |
|---|---|---|---|
| BE | 893479 | * | 10/1982 |
| EP | 0591830 | A1 | 4/1994 |
| EP | 0825189 | A1 | 2/1998 |
| WO | 2017/066103 | A1 | 4/2017 |
| WO | 2024/026568 | A1 | 8/2023 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (Cas Registrysm) Sep. 2016 2 pages.*
Banks, J Emerg Med. May 2014 ; 46(5): 632-642.*
Samiei, J Psychiatry Behav Sci. Sep. 2016; 10(3):e7988.*
Heacock, Canadian Journal of Chemistry (1962), 40, 128-32.*
Lemaire, J. Pharm. Pharmacol. 1985, 37: 575-577.*
Corse, Journal of the American Chemical Society (1948), 70, 2837-43.*
Mattha Busby, The intercept, Jul. 26, 2022.*
Costakis, Chimika Chronika (1975), 4(2), 59-63.*
Alexandru, Quant. Struct.-Act. Relat., 18 (1999) 548-560.*
Monte, J. Med. Chem. 1996, 39, 2953-2961.*
Blaazer, ChemMedChem (2008), 3(9), 1299-1309.*
West, Solid State Chemistry and Its Applications, john Wiley & Sons, 1984.*
Venkatesh, J. Pharm. Sci. 89, 145-154 (2000).*
G. Cannon, Chapter Nineteen in Burger's Medicinal Chemistry and Drug Discovery, Fifth Edition, vol. I: Principles and Practice, Wiley-Interscience 1995, pp. 783-802.*
Benington, Journal of Organic Chemistry (1958), 23, 1979-84.*
Chodnekar, M. S. et al., "ß-Adrenergic Blocking Agents. 11. Heterocyclic Analogs of Pronethalol [2-Isopropylamino-1-(2-naphthyl)ethanol]" Journal of Medicinal Chemistry, 1971, vol. 15, No. 1, pp. 49-57.
Boatto, G. et al., "An LC—MS—MS method for quantitation of four new phenethylamines (BOX series) in plasma: in vivo application" Forensic Toxicol, Aug. 10, 2013 (Oct. 8, 2013), vol. 32, pp. 75-81.
Glennon, R. A. et al., "Discriminative Stimulus Properties of MDA Analogs" Biological Psychiatry, 1982, vol. 17, No. 7, pp. 807-814.
Marchetti, G. et al., "The Activity of some new adrenergic receptor blocking drugs" Arzneimittel-Forschung, 1968, vol. 18, No. 1, pp. 43-48.
Braun, U. et al., "Centrally Active AT-Substituted Analogs of 3,4-Methylenedioxyphenylisopropylamine (3,4-Methylenedioxyamphetamine)" Journal of Pharmaceutical Sciences, 1980, vol. 69, No. 2, pp. 192-195.
Heacock, R. A. et al, "Synthesis of Potentially Physiologically Active ß-Phenylethylamines", Canadian Journal of Chemistry, 1962, vol. 40, pp. 133-142.
Bogenschutz, M.P. and Johnson M. W. (2016), Prog. in Neuro-Psychopharmacol. & Biol. Psychiatry 64; 250-258.
Romeu, A.G. et al. (2017), Exp. Clin. Psychopharmacol. Aug. 2016; 24(4): 229-268.
Bock and Bermudez, 2021, FEBS Journal 288: 2513-2528.

(Continued)

Primary Examiner — Nizal S Chandrakumar
(74) Attorney, Agent, or Firm — Smart & Biggar LP; Michael Fenwick

(57) ABSTRACT

Disclosed are novel fused mescaline derivative compounds, notably substituted ethylamine fused heterocyclic mescaline derivatives, including substituted ethylamine fused dioxolane mescaline derivatives, and pharmaceutical and recreational drug formulations containing the same. Methods of making and using these compounds are also disclosed.

3 Claims, 35 Drawing Sheets

(56) References Cited

OTHER PUBLICATIONS

McCorvy and Roth, 2015, Pharmacology and Therapeutics 150: 129-142.
Inserra et al., 2020, Pharmacol. Rev 73: 202.
Haleem, D.J. Behav. Pharm. 2015, 26:45-58.
McClure-Begley et al. Nat. Rev. Drug Discov. 2022, 21:463-473.
Cao et al. Science 2022, 375:403-411.
Devroye et al. Pharmacol. Ther. 2018, 181:143-155.
Segelcke et al. Cephalalgia 2017, 37:365-371.
Savino et al., 2023, Brain Science 13: 734.
Przegaliński et al., 2023, Nutrients 15:1449.
Saggu et al., 2023, Molecular Psychiatry 28: 588-600.
Boiko et al., 2022, Neurochemical Research 47: 2909-2924.
Żuk et al., 2022, Pharmacological Reports 74: 406-424.
Kim, 2023, International Journal of Molecular Sciences 24: 6742.
Salatino-Oliveira et al. Am. J. Med. Genet. B Neuropsychiatr. Genet. 2018, 177:211-231.
Outhred et al. Neurosci. Biobehav. Rev, 2013, 37:1786-800.
Taciak et al. Pharmacol. Rep. 2018, 70:37-46.
Y. Zou et al., Eur. J. Med. Chem., 138, 199-211 (2017).
K. N. Campbell et al., J. Org. Chem., 16, 1736 -1740 (1951).
D. Ghosh, et al., Tetrahedr. Lett., 58, 2014-2018 (2017).
M. G. Cabiddu et al., Tetrahedron 59, 4383-4387 (2003).
Owens et al., 1997, Journal of Pharmacology and Experimental Therapeutics 283:1305-1322.
Celada et al., 2013, CNS Drugs 27:703-716.
Marcher-Rørsted et al., 2020, ACS Chem. Neurosci. 11: 1238.
Simmler et al., 2013, British J. Pharmacol. 168: 458.
Halberstadt et al., 2019, J. Psychopharm. 33: 406-414.
Halberstadt, 2015, Behav. Brain Res. 277: 99.
Langin et al., Eur. J. Pharmacol. 167:95-104, 1989.
Hall and Strange Brit. J. Pharmacol. 121:731-736, 1997.
Mackenzie et al., [Eur. J. Pharmacol. 266:79-85, 1994.
Witt-Endersby and Dubocovich [Mol. Pharmacol. 50: 166-174, 1996.
Mulheron et al., J. Biol. Chem. 269: 12954-12962, 1994.
Bryant et al., Life Sci. 15:1259-1268, 1996.
Kursar et al., Mol. Pharmacol. 46: 227-234, 1994.
Tatsumi et al., Eur. J. Pharmacol. 368: 277-283, 1999.
Pacholczyk et al., Nature 350: 350-354, 1991.
Pristupa et al., [Mol. Pharmacol. 45: 125-135, 1994.
Braun et al., J Pharm Sci, 69(2): 192-5, 1980.
Chodnekar et al. Journal of Medicinal Chemistry, 15(1):49-57, 2024.
Boatto et al. Forensic Toxicol 32:75-81, 2014.
Glennon et al. Biological Psychiatry. 17(7):807, 1982.
Marchetti et al. Arzneimittel-Forschung, 18(1):43-48, 1968.
Heacock et al. Canadian Journal of Chemistry, 40:133-142, 1962.
ISR_Written Opinion dated Mar. 4, 2024.

\* cited by examiner

FIG. 3C (ii)

MM679  intermediate P intermediate P  MM718

MM764 → MM765

MM783 → MM785

MM784 → MM786

MM766 → MM767

SUBSTITUTED ETHYLAMINE FUSED HETEROCYCLIC MESCALINE DERIVATIVES

RELATED APPLICATION

This application claims the benefit of U.S. Provisional Application No. 63/433,256 filed Dec. 16, 2022; the entire content of U.S. Patent Application No. 63/433,256 is hereby incorporated by reference.

FIELD OF THE DISCLOSURE

The compositions and methods disclosed herein relate to a chemical compound known as mescaline. Furthermore, the compositions and methods disclosed herein relate in particular to fused heterocyclic mescaline derivatives, and more in particular to fused heterocyclic mescaline derivatives possessing a substituted ethylamine chain.

BACKGROUND OF THE DISCLOSURE

The following paragraphs are provided by way of background to the present disclosure. They are not however an admission that anything discussed therein is prior art or part of the knowledge of a person of skill in the art.

The biochemical pathways in the cells of living organisms may be classified as being part of primary metabolism, or as being part of secondary metabolism. Pathways that are part of a cell's primary metabolism are involved in catabolism for energy production or in anabolism for building block production for the cell. Secondary metabolites, on the other hand, are produced by the cell without having an obvious anabolic or catabolic function. It has long been recognized that secondary metabolites can be useful in many respects, including as therapeutic compounds.

Mescaline (chemical name 3,4,5 trimethoxyphenethylamine), for example, is a secondary metabolite that is naturally produced by certain cactus species belonging to a variety of genera within the plant family of Cactaceae. Cactus species which can produce mescaline include, for example, cactus species belonging to the genus *Lophophora*, including *Lophophora williamsii* (peyote) and *Lophophora diffusa* and cactus species belonging to the genus *Echinopsis/Trichocereus*, including *Echinopsis pachanoi/Trichocereus pachanoi* (also known as San Pedro), *Echinopsis peruviana/Trichocereus peruvianus* (also known as Peruvian torch), (*Echinopsis lageniformis/Trichocereus bridgesii* (also known as Bolivian torch), and *Echinopsis scopulicola/Trichocereus scopulicola*.

The interest of the art in mescaline is well established. Thus, for example, mescaline is a psychoactive compound and is therefore used as a recreational drug. Mescaline is also used in Native American religious ceremonies, and for spiritual purposes by Andean indigenous cultures. Furthermore, mescaline has been evaluated for its potential in the treatment of addictions, notably alcohol addiction (Bogenschutz, M. P. and Johnson M. W. (2016), Prog. in Neuro-Psychopharmacol. & Biol. Psychiatry 64; 250-258; Romeu, A. G. et al. (2017), Exp. Clin. Psychopharmacol. 2016 August; 24(4): 229-268).

Although the toxicity of mescaline is low, adverse side effects, including, for example, panic attacks, paranoia, and psychotic states, sometimes together or individually referred to as "a bad trip", are not infrequently experienced by mescaline users. Furthermore, mescaline can induce nausea and vomiting.

There exists therefore a need in the art for improved mescaline compounds.

SUMMARY OF THE DISCLOSURE

The following paragraphs are intended to introduce the reader to the more detailed description, not to define or limit the claimed subject matter of the present disclosure.

In one aspect, the present disclosure relates to mescaline and derivative compounds.

In another aspect, the present disclosure relates to fused heterocyclic mescaline derivatives, and methods of making and using these compounds.

In another aspect, the present disclosure relates to fused heterocyclic mescaline derivatives having a substituted ethylamine chain and methods of making and using these compounds, notably an ethylamine chain in which the $C_1$ and/or the $C_2$ atom are substituted.

Accordingly, in one aspect, the present disclosure provides, in at least one embodiment, in accordance with the teachings herein, a compound having chemical formula (I) or (II):

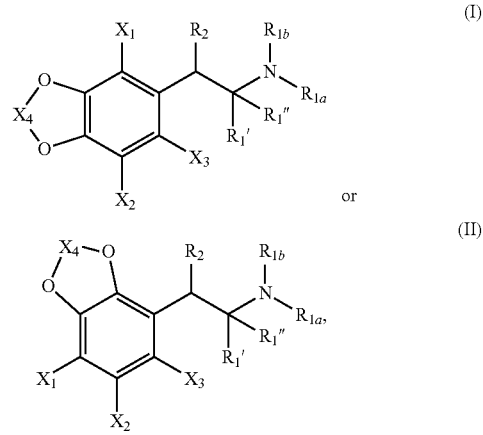

wherein, in chemical formula (I) or (II):

$X_1$, $X_2$, and $X_3$ are independently selected from a hydrogen atom, O-alkyl, acyl, N-(alkyl)$_2$, N-(alkyl)(H), OH, a halogen, or NH$_2$;

$X_4$ is an alkylene group or substituted alkylene group;

$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;

or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring, or $NR_{1a}R_{1b}$ is a nitro group;

and when $R_1'$ and $R_1''$ are joined to form an oxo group, $R_2$ is an alkyl group, O-alkyl group, or hydroxy group.

In at least one embodiment, in an aspect, the compound having formula (I) and (II) can have a chemical formula $(I_a)$ and $(II_a)$:

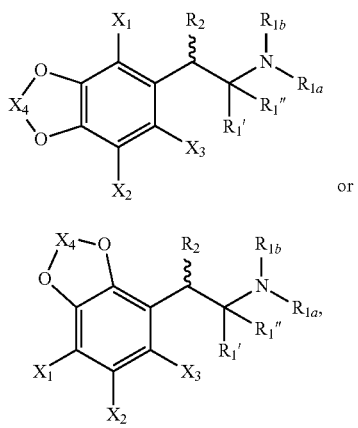

respectively.

In at least one embodiment, in an aspect, $X_4$ can be a $(C_1-C_3)$-alkylene group.

In at least one embodiment, in an aspect, $X_4$ can be an alkylene group ($-CH_2CH_2-$) having two carbon atoms, to thereby form a fused dioxane.

In at least one embodiment, in an aspect, $X_4$ can be an alkylene group having one carbon atom ($-CH_2-$), to thereby form a fused dioxolane.

In at least one embodiment, in an aspect, the compound having formula (I) and (II) can have a chemical formula $(I_b)$ and $(II_b)$:

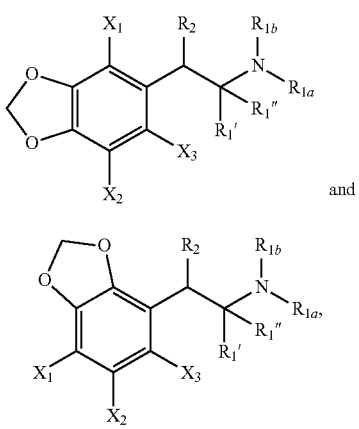

respectively.

In at least one embodiment, in an aspect, the compound having chemical formula (I) or (II) can have a chemical formula $(I_c)$, and $(II_c)$:

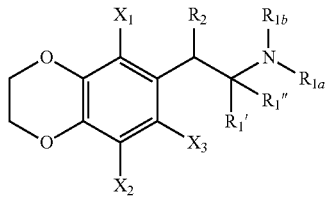

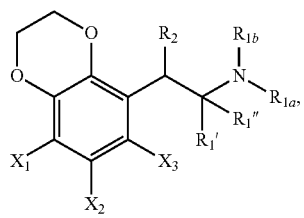

respectively.

In at least one embodiment, in an aspect, the amino group ($-NR_{1a}R_{1b}$) can be protonated to form ($-N^+HR_{1a}R_{1b}$), and chemical formula (I), $(I_a)$, $(I_b)$, $(I_c)$, (II), $(II_a)$, $(II_b)$, $(II_c)$ can further include a negatively charged anion balancing the positively charged nitrogen atom.

In at least one embodiment, in an aspect, $X_1$, $X_2$, $X_3$, can each be a hydrogen atom (H).

In at least one embodiment, in an aspect, at least one of $X_1$, $X_2$, $X_3$, can each be an O-alkyl group or a halogen.

In at least one embodiment, in an aspect, $X_3$ can be an O-alkyl group or a halogen atom, and $X_1$ and $X_2$ can each be a hydrogen atom (H).

In at least one embodiment, in an aspect, $X_3$ can be a $(C_1-C_6)$—O-alkyl group and $X_1$ and $X_2$ can each be a hydrogen atom (H).

In at least one embodiment, in an aspect, $X_3$ can be a $(C_1-C_3)$—O-alkyl group and $X_1$ and $X_2$ can each be a hydrogen atom (H).

In at least one embodiment, in an aspect, $X_3$ can be a methoxy group ($-OCH_3$) and $X_1$ and $X_2$ can each be a hydrogen atom (H).

In at least one embodiment, in an aspect, $X_3$ can be bromine (Br) and $X_1$ and $X_2$ can each be a hydrogen atom (H).

In at least one embodiment, in an aspect, $R_1'$ and $R_1''$ can be joined together to form an oxo group (C=O) and $R_2$ can be a hydrogen atom (H).

In at least one embodiment, in an aspect, $R_1'$ and $R_1''$ can be joined together to form an oxo group (C=O) and $R_2$ can be an alkyl group.

In at least one embodiment, in an aspect, $R_1'$ and $R_1''$ can be joined together to form an oxo group (C=O) and $R_2$ can be a $(C_1-C_6)$-alkyl group.

In at least one embodiment, in an aspect, $R_1'$ and $R_1''$ can be joined together to form an oxo group (C=O) and $R_2$ can be a $(C_1-C_3)$-alkyl group.

In at least one embodiment, in an aspect, $R_1'$ and $R_1''$ can be joined together to form an oxo group (C=O) and $R_2$ can be a methyl group ($-CH_3$), or an ethyl group ($-CH_2-CH_3$) group.

In at least one embodiment, in an aspect, $R_1'$ and $R_1''$ can each be a hydrogen atom and $R_2$ can be an alkyl group.

In at least one embodiment, in an aspect, $R_1'$ and $R_1''$ can each be a hydrogen atom and $R_2$ can be a $(C_1-C_6)$-alkyl group.

In at least one embodiment, in an aspect, $R_1'$ and $R_1''$ can each be a hydrogen atom and $R_2$ can be a $(C_1\text{-}C_3)$-alkyl group.

In at least one embodiment, in an aspect, $R_1'$ and $R_1''$ can each be a hydrogen atom and $R_2$ can be a methyl group ($-CH_3$), or an ethyl group ($-CH_2-CH_3$) group.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and $R_2$ can be an alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and $R_2$ can be an $(C_1\text{-}C_6)$-alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and $R_2$ can be an $(C_1\text{-}C_3)$-alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and $R_2$ can be a methyl group ($-CH_3$), or an ethyl group ($-CH_2-CH_3$) group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted with at least one $(C_1\text{-}C_6)$ alkyl group, and $R_2$ can be an alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted with at least one $(C_1\text{-}C_6)$ alkyl group, and $R_2$ can be a $(C_1\text{-}C_6)$ alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted with at least one $(C_1\text{-}C_6)$ alkyl group, and $R_2$ can be a $(C_1\text{-}C_3)$ alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted with at least one $(C_1\text{-}C_6)$ alkyl group, and $R_2$ can be a methyl group ($-CH_3$), or an ethyl group ($-CH_2-CH_3$) group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted, independently or simultaneously, with at least two $(C_1\text{-}C_6)$ alkyl groups, the alkyl groups being substituents on the same heterocyclic carbon atom, and $R_2$ can be an alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted, independently or simultaneously, with at least two $(C_1\text{-}C_6)$ alkyl groups, the alkyl groups being substituents on the same heterocyclic carbon atom, and $R_2$ can be a $(C_1\text{-}C_6)$ alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted, independently or simultaneously, with at least two $(C_1\text{-}C_6)$ alkyl groups, the alkyl groups being substituents on the same heterocyclic carbon atom, and $R_2$ can be a $(C_1\text{-}C_3)$ alkyl group or a hydrogen atom.

In at least one embodiment, in an aspect, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, wherein the heterocyclic ring, in addition to the nitrogen atom, includes an oxygen atom, and is substituted, independently or simultaneously, with at least two $(C_1\text{-}C_6)$ alkyl groups, the alkyl groups being substituents on the same heterocyclic carbon atom, and $R_2$ can be a methyl group ($-CH_3$), or an ethyl group ($-CH_2-CH_3$) group or a hydrogen atom.

In at least one embodiment, in an aspect, the alkyl group with which the heterocyclic ring is substituted can be a methyl group ($-CH_3$).

In at least one embodiment, in an aspect, the heterocyclic ring can be partially saturated.

In at least one embodiment, in an aspect, the heterocyclic ring can be a 5- or 6-membered heterocyclic ring.

In at least one embodiment, in an aspect, when the heterocyclic ring is unsaturated, $R_{1a}$ can be absent.

In at least one embodiment, in an aspect, when the heterocyclic ring is unsaturated, and the nitrogen is participating in the formation of an unsaturated bond, $R_{1a}$ can be absent.

In at least one embodiment, in an aspect, $R_1'$ and $R_1''$ can be joined together to form a cycloalkyl group and $R_2$ can be a hydrogen atom.

In at least one embodiment, in an aspect, $R_1'$ and $R_1''$ can be joined together to form a cycloalkyl group, optionally a $(C_3-C_6)$ cyclo-alkyl group, and $R_2$ can be a hydrogen atom.

In at least one embodiment, in an aspect, $R_1'$ and $R_1''$ can be joined together to form a cycloalkyl group, optionally a $C_3$, $C_5$, or $C_6$ cyclo-alkyl group, and wherein $R_2$ can be a hydrogen atom.

In at least one embodiment, in an aspect, $R_1'$ and $R_1''$ can each be a hydrogen atom, and $R_2$ can be a hydroxy group.

In at least one embodiment, in an aspect, $R_1'$ and $R_1''$ can each be a hydrogen atom, and $R_2$ can be an O-alkyl group.

In at least one embodiment, in an aspect, $R_1'$ and $R_1''$ can each be a hydrogen atom, and $R_2$ can be an $O-(C_1-C_6)$-alkyl group.

In at least one embodiment, in an aspect, $R_1'$ and $R_1''$ can each be a hydrogen atom, and $R_2$ can be an $O-(C_1-C_3)$-alkyl group.

In at least one embodiment, in an aspect, $R_1'$ and $R_1''$ can each be a hydrogen atom, and $R_2$ can be a methoxy group ($-O-CH_3$).

In at least one embodiment, in an aspect, the chemical compound having formula (I) or (II) can be selected from the group of compounds having chemical formula $(A_x)$; $(A_y)$; $(A_z)$; $(B_x)$; $(B_y)$; $(B_z)$; (C); (D); (E); (F); and (G):

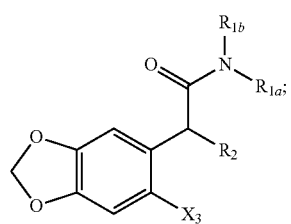

$(A_x)$

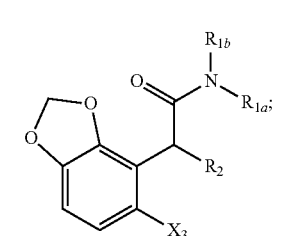

$(A_y)$

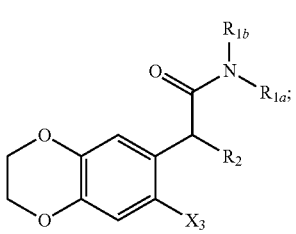

$(A_z)$

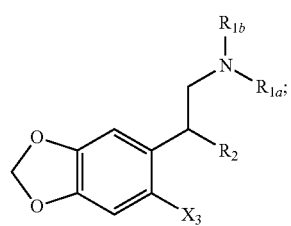

$(B_x)$

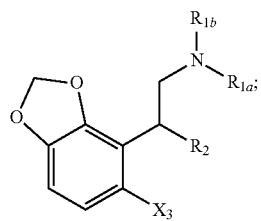

$(B_y)$

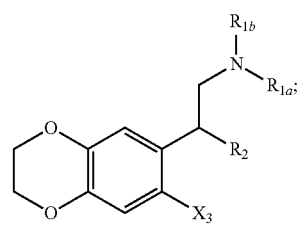

$(B_z)$

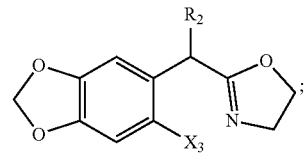

(C)

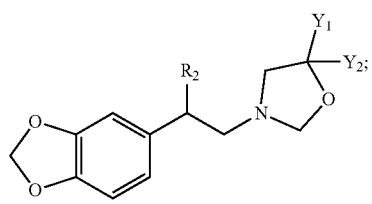

(D)

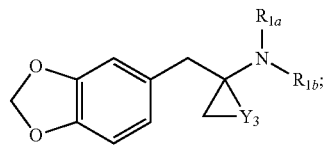

(E)

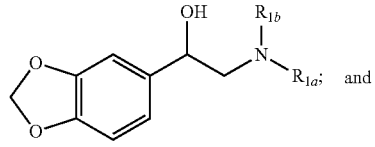

(F)

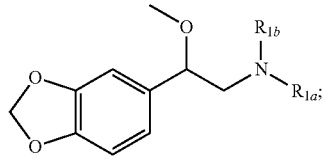

(G)

wherein
- $X_3$ is a methoxy group ($-OCH_3$), bromine (Br), or a hydrogen atom;
- $R_2$ is a hydrogen atom, a methyl group, or an ethyl group, provided that in chemical formula (A) and (B) $R_2$ is a methyl or ethyl group;
- $R_{1a}$ and $R_{1b}$ are each independently or both simultaneously selected from a methyl group, an ethyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring;

$Y_1$ and $Y_2$ are each independently or simultaneously a hydrogen atom or a methyl group; and $Y_3$ is methylene, ethylene, propylene, or butylene.

In at least one embodiment, in an aspect, in chemical formula (A), $R_2$ can be a hydrogen atom, a methyl group, or an ethyl group, and $R_{1a}$ and $R_{1b}$ can each independently or both simultaneously be selected from a methyl group, a $CH_2CH_2OH$ group, a $CH_2$-phenyl group, or a hydrogen atom, or $R_{1a}$ and $R_{1b}$ can be joined together, along with the nitrogen atom to which they are attached, to form a 5-membered heterocyclic ring.

In at least one embodiment, in an aspect, in chemical formula (B), $R_2$ can be a methyl group or an ethyl group, and $R_{1a}$ and $R_{1b}$ can each independently or both simultaneously be selected from a methyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring.

In at least one embodiment, in an aspect, in chemical formula (C), $R_2$ can be a hydrogen atom, a methyl group or an ethyl group.

In at least one embodiment, in an aspect, in chemical formula (D), $R_2$ can be a methyl group or an ethyl group, and $Y_1$ and $Y_2$ can each independently or simultaneously be a hydrogen atom or a methyl group.

In at least one embodiment, in an aspect, in chemical formula (E), $Y_3$ can be methylene, ethylene, propylene, or butylene, and $R_{1a}$ and $R_{1b}$ can each independently or both simultaneously selected from a methyl group, an ethyl group, a $CH_2$-phenyl group, a hydrogen atom, or $R_{1a}$ and $R_{1b}$ are both simultaneously an oxygen atom.

In at least one embodiment, in an aspect, in each chemical formula (F) or (G), $R_{1a}$ and $R_{1b}$ can each be independently, or both simultaneously selected from a methyl group, ethyl group, a $CH_2$-phenyl group, or a hydrogen atom.

In at least one embodiment, in an aspect, the chemical compound having formula (I) or (II) can be selected from the group of compounds having the chemical formula: $A_x(I)$-$A_z(XI)$; $B_x(I)$-$B_z(X)$; $C(I)$-$C(IV)$; $D(I)$-$D(IV)$; $E(I)$-$(X)$; $F(I)$-$F(VI)$; and $G(I)$-$G(V)$:

(A): $A_x(I)$; $A_x(II)$; $A_x(III)$; $A_x(IV)$; $A_x(V)$; $A_x(VI)$; $A_x(VII)$; $A_x(VIII)$; $A_x(IX)$; $A_y(X)$; and $A_z(XI)$:

$A_x(I)$

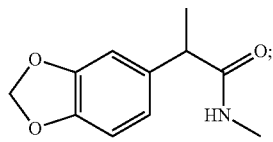

$A_x(II)$

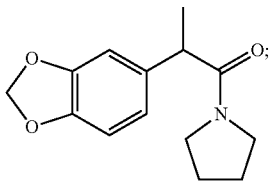

$A_x(III)$

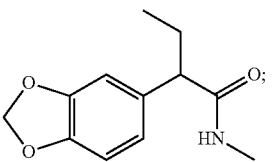

-continued $A_x(IV)$

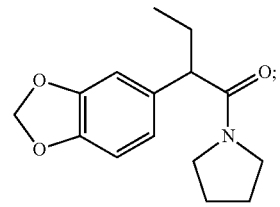

$A_x(V)$

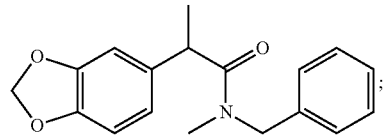

$A_x(VI)$

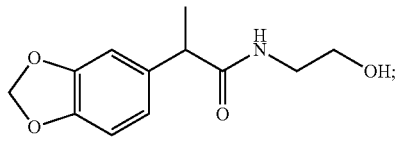

$A_x(VII)$

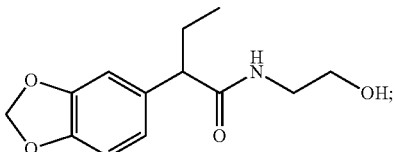

$A_x(VIII)$

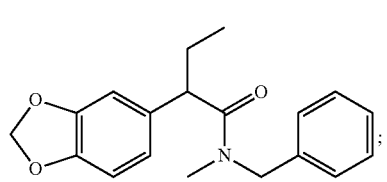

$A_x(IX)$

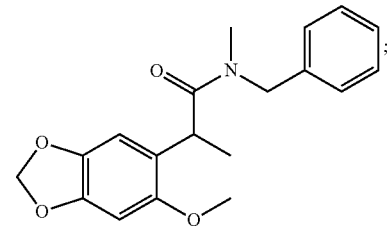

$A_y(X)$

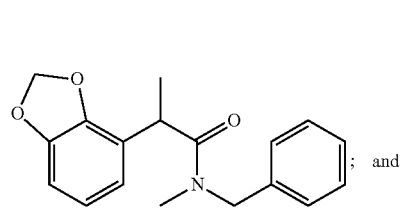

; and $A_x(XI)$

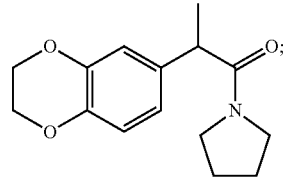

(B): $B_x(I)$; $B_x(II)$; $B_x(III)$; $B_x(IV)$; $B_x(V)$; $B_x(VI)$; $B_x(VII)$; $B_x(VIII)$; $B_y(IX)$; and $B_z(X)$:
$B_x(I)$
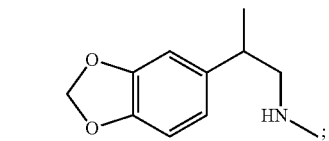
$B_x(II)$
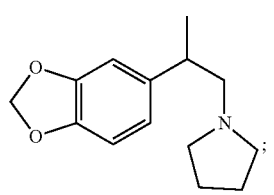
$B_x(III)$
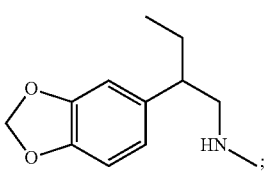
$B_x(IV)$
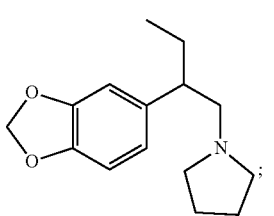
$B_x(V)$
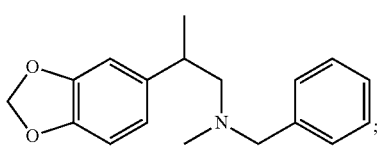
$B_x(VI)$
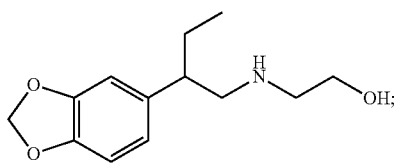
$B_x(VII)$
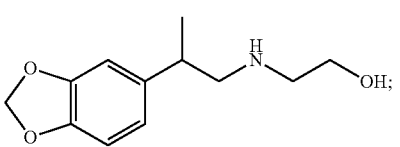
$B_x(VIII)$
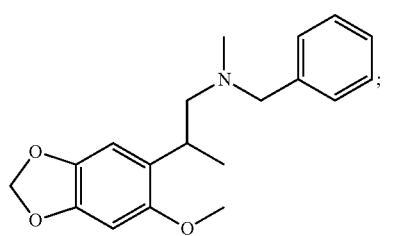
-continued
$B_y(IX)$
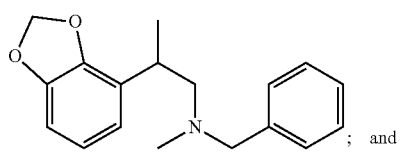
; and
$B_z(X)$
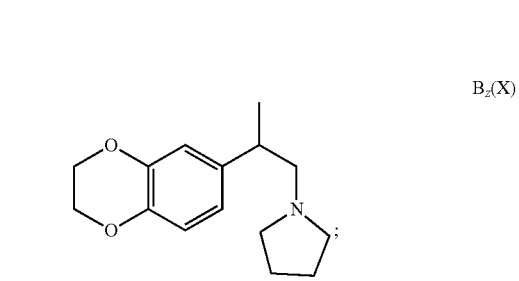
(C): C(I); C(II); C(III); and C(IV):
C(I)
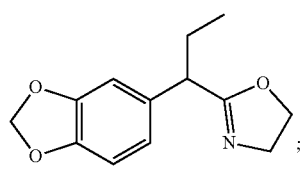
C(II)
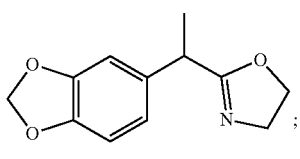
C(III)
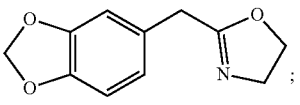
C(IV)
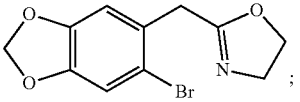
(D): D(I); D(II); D(III); and D(IV):
D(I)
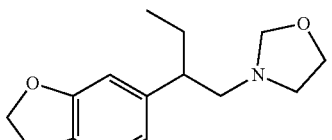
D(II)
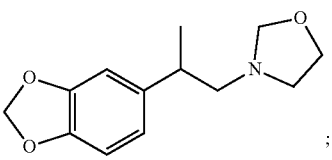

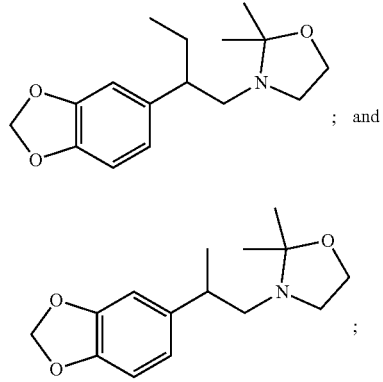
D(III)
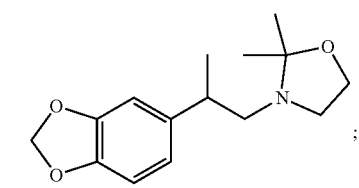
D(IV)
(E): E(I); E(II); E(III); E(IV); E(V); E(VI); E(VII); E(VIII); E(IX); and E(X):
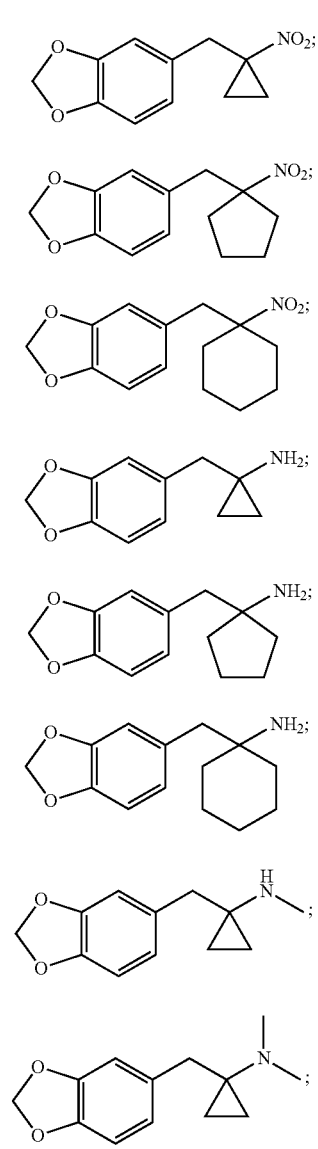
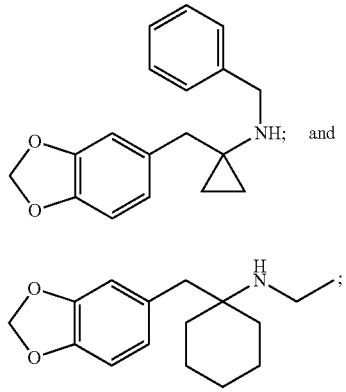
E(IX)
E(X)
(F): F(I); F(II); F(III); F(IV); F(V); and F(VI):
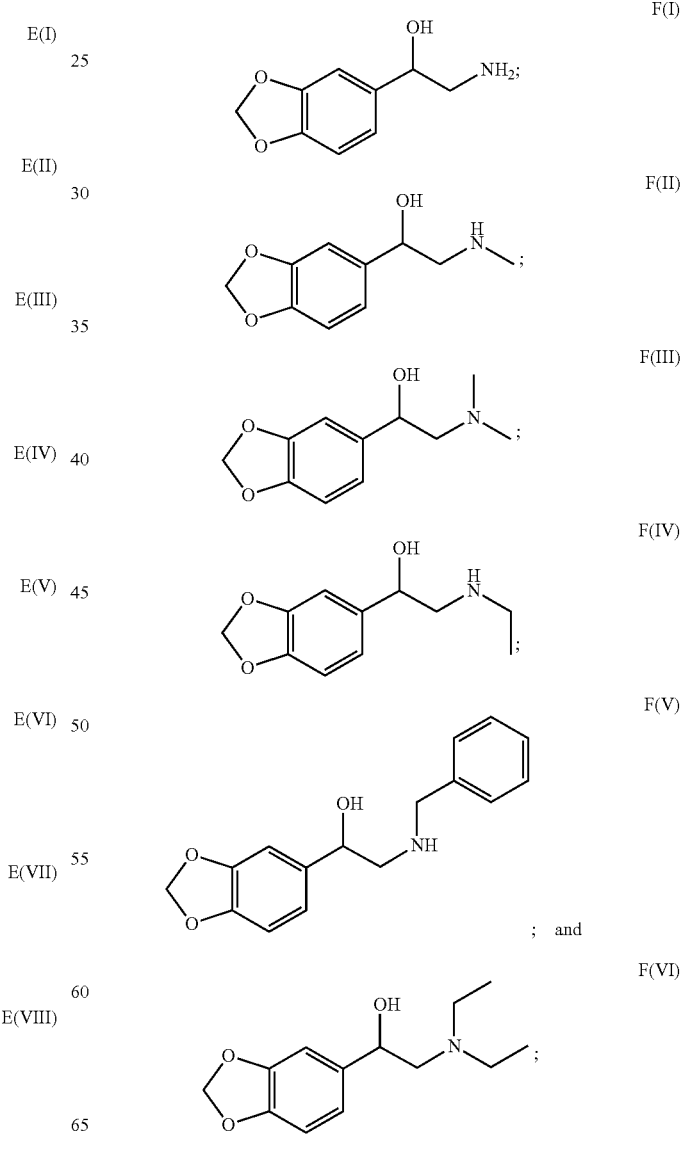

and (G): G(I); G(II); G(III); G(IV); and G(V):

(G)

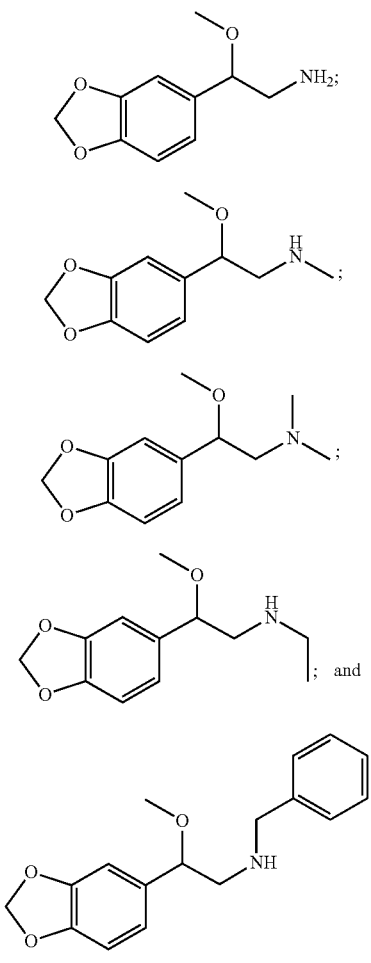

G(I)

G(II)

G(III)

G(IV)

G(IV)

wherein in each of compound $A_x$(I) to G(V), excepting E(I)-E(III), optionally, the nitrogen atom of the ethylamine portion may be protonated and includes a negatively charged anion balancing the positively charged nitrogen atom.

In another aspect, the present disclosure relates to pharmaceutical and recreational drug formulations comprising fused heterocyclic mescaline derivatives. Accordingly, in one aspect, the present disclosure provides, in at least one embodiment, a pharmaceutical or recreational drug formulation comprising an effective amount of a chemical compound selected from a compound having chemical formula (I) or (II):

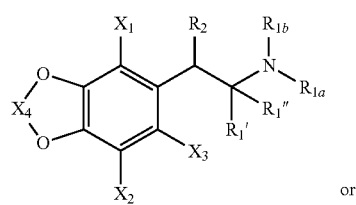

(I)

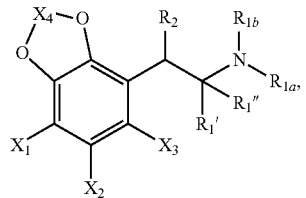

(II)

or a pharmaceutically acceptable salt or solvate thereof, wherein, in chemical formula (I) or (II):

$X_1$, $X_2$, and $X_3$ are independently selected from a hydrogen atom, O-alkyl, acyl, N-(alkyl)$_2$, N-(alkyl)(H), OH, a halogen, or $NH_2$;

$X_4$ is an alkylene group or substituted alkylene group;

$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;

or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring, or $NR_{1a}R_{1b}$ is a nitro group;

and when $R_1'$ and $R_1''$ are joined to form an oxo group, $R_2$ is an alkyl group, O-alkyl group, or hydroxy group, together with a pharmaceutically acceptable excipient, diluent, or carrier.

In another aspect, the present disclosure relates to methods of treatment of brain neurological disorders. Accordingly, the present disclosure further provides, in one embodiment, a method for treating a psychiatric disorder, the method comprising administering to a subject in need thereof a pharmaceutical formulation comprising a compound having chemical formula (I) or (II):

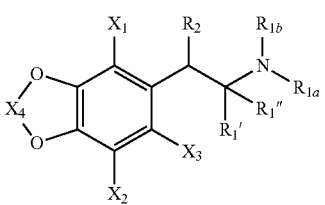

(I)

or

-continued

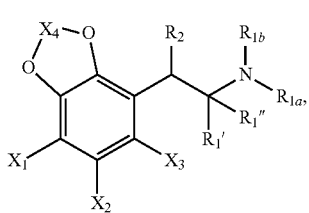

or a pharmaceutically acceptable salt or solvate thereof,
wherein, in chemical formula (I) or (II):
- $X_1$, $X_2$, and $X_3$ are independently selected from a hydrogen atom, O-alkyl, acyl, N-(alkyl)$_2$, N-(alkyl)(H), OH, a halogen, or $NH_2$;
- $X_4$ is an alkylene group or substituted alkylene group;
- $R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
- or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and
- $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring, or $NR_{1a}R_{1b}$ is a nitro group;
- and
- when $R_1'$ and $R_1''$ are joined to form an oxo group, $R_2$ is an alkyl group, O-alkyl group, or hydroxy group, wherein the pharmaceutical formulation is administered in an effective amount to treat the brain neurological disorder in the subject.

In at least one embodiment, in an aspect, upon administration the compound having chemical formula (I) or (II) can interact with a receptor in the subject to thereby modulate the receptor and exert a pharmacological effect.

In at least one embodiment, in an aspect, the receptor can be a G-protein coupled receptor (GPCR).

In at least one embodiment, in an aspect, the receptor can be a 5-HT receptor.

In at least one embodiment, in an aspect, the receptor can be a 5-HT$_{1A}$ receptor, a 5-HT$_{2A}$ receptor, a 5-HT$_{2B}$ receptor, a 5-HT$_{2C}$ receptor, an $\alpha_{2A}$ receptor, a $D_2$ receptor, a $D_3$ receptor, or an MT$_1$ receptor.

In at least one embodiment, in an aspect, upon administration the compound having chemical formula (I) or (II) can interact with a transmembrane transport protein in the subject to thereby modulate the transmembrane transport protein and exert a pharmacological effect.

In at least one embodiment, in an aspect, the transmembrane transport protein can be a dopamine active transporter (DAT), a norephedrine transporter (NET), or a serotonin transporter (SERT) transmembrane transport protein.

In at least one embodiment, in an aspect, the disorder can be a G-protein coupled receptor (GPCR)-mediated disorder.

In at least one embodiment, in an aspect, the disorder can be a 5-HT receptor-mediated disorder.

In at least one embodiment, in an aspect, the disorder can be a 5-HT$_{1A}$ receptor-mediated disorder, a 5-HT$_{2A}$ receptor-mediated disorder, a 5-HT$_{2B}$ receptor-mediated disorder, a 5-HT$_{2C}$ receptor-mediated disorder, a 5-HT$_{1D}$ receptor-mediated disorder, a $\alpha_{2A}$ receptor-mediated disorder, a $D_2$ receptor-mediated disorder, a $D_3$ receptor-mediated disorder, or an MT$_1$ receptor-mediated disorder.

In at least one embodiment, in an aspect, a dose can be administered of about 0.001 mg to about 5,000 mg.

In another aspect, the present disclosure provides, in at least one embodiment, a method for modulating (i) a receptor selected from 5-HT$_{1A}$ receptor, a 5-HT$_{2A}$ receptor, a 5-HT$_{2B}$ receptor, a 5-HT$_{2C}$ receptor, an $\alpha_{2A}$ receptor, a $D_2$ receptor, a $D_3$ receptor, or an MT$_1$ receptor; or (ii) a transmembrane transport protein selected from a dopamine active transporter (DAT), a norephedrine transporter (NET) or a serotonin transporter (SERT) transmembrane transport protein, the method comprising contacting (i) the 5-HT$_{1A}$ receptor, the 5-HT$_{2A}$ receptor, the 5-HT$_{2B}$ receptor, the 5-HT$_{2C}$ receptor, the $\alpha_{2A}$ receptor, a $D_2$ receptor, the $D_3$ receptor, or the MT$_1$ receptor; or (ii) the dopamine active transporter (DAT), the norephedrine transporter (NET), or the serotonin transporter (SERT) transmembrane transport protein with a selected from a first chemical compound having chemical formula (I), and a second chemical compound having chemical formula (II):

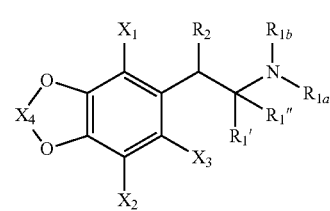

or

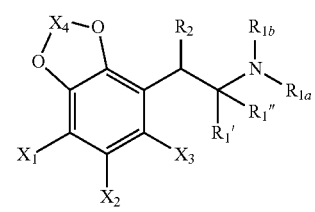

wherein, in chemical formula (I) or (II):
- $X_1$, $X_2$, and $X_3$ are independently selected from a hydrogen atom, O-alkyl, acyl, N-(alkyl)$_2$, N-(alkyl)(H), OH, a halogen, or $NH_2$;
- $X_4$ is an alkylene group or substituted alkylene group;
- $R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
- or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and R$_2$ is an alkyl group, O-alkyl group, hydroxy group, or a hydrogen atom; and at least one of R$_1$', R$_1$" and R$_2$ is a substituent other than a hydrogen atom, and when R$_1$" is not joined together with R$_{1b}$, R$_{1a}$ and R$_{1b}$ are each independently selected from an alkyl group, a hydroxylalkyl group, an optionally substituted alkyl-aryl group, or a hydrogen atom, or R$_{1a}$ and R$_{1b}$ are joined together, along with the nitrogen atom to which they are attached, to form a 3-10-membered optionally substituted heterocyclic ring, or NR$_{1a}$R$_{1b}$ is a nitro group;

and when R$_1$' and R$_1$" are joined to form an oxo group, R$_2$ is an alkyl group, O-alkyl group, or hydroxy group, under reaction conditions sufficient to modulate (i) the 5-HT$_{1A}$ receptor, the 5-HT$_{2A}$ receptor, the 5-HT$_{2B}$ receptor, the 5-HT$_{2C}$ receptor, the α$_{2A}$ receptor, a D$_2$ receptor, the D$_3$ receptor, or the MT$_1$ receptor; (ii) the dopamine active transporter (DAT), the norephedrine transporter (NET), or the serotonin transporter (SERT) transmembrane transport protein.

In at least one embodiment, in an aspect, the reaction conditions can be in vitro reaction conditions.

In at least one embodiment, in an aspect, the reaction conditions can be in vivo reaction conditions.

In another aspect, the present disclosure relates to methods of making mescaline derivatives. Accordingly, in an aspect, in at least one embodiment, provided herein is a method of making a first chemical compound having chemical formula (I) or (II):

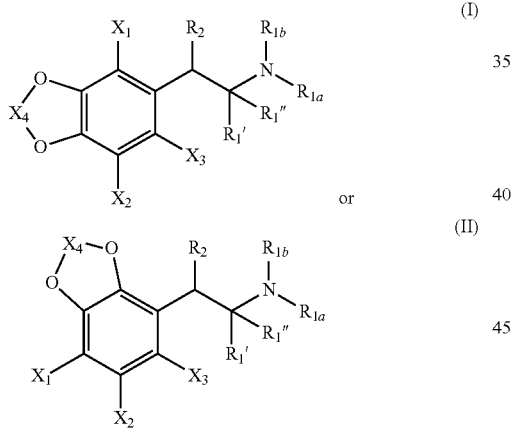

wherein, in chemical formula (I) or (II):
X$_1$, X$_2$, and X$_3$ are independently selected from a hydrogen atom, O-alkyl, acyl, N-(alkyl)$_2$, N-(alkyl)(H), OH, a halogen, or NH$_2$;
X$_4$ is an alkylene group or substituted alkylene group;
R$_1$' and R$_1$" are independently or simultaneously an alkyl group, or a hydrogen atom, wherein at least one of R$_1$' and R$_1$" is hydrogen, or R$_1$' and R$_1$" are joined together to form an oxo group (C=O) or a cycloalkyl group;
or R$_1$" is joined together with R$_{1b}$, together with the carbon atom to which R$_1$" is attached and the nitrogen atom to which R$_{1b}$ is attached, to form an optionally substituted saturated or unsaturated 3-10-membered heterocyclic ring, and when the heterocyclic ring is unsaturated, R$_1$' and R$_{1a}$ are optionally absent; and R$_2$ is an alkyl group, O-alkyl group, hydroxy group, or a hydrogen atom; and at least one of R$_1$', R$_1$" and R$_2$ is a substituent other than a hydrogen atom, and when R$_1$" is not joined together with R$_{1b}$, R$_{1a}$ and R$_{1b}$ are each independently selected from an alkyl group, a hydroxylalkyl group, an optionally substituted alkyl-aryl group, or a hydrogen atom, or R$_{1a}$ and R$_{1b}$ are joined together, along with the nitrogen atom to which they are attached, to form a 3-10-membered optionally substituted heterocyclic ring, or NR$_{1a}$R$_{1b}$ is a nitro group;

and when R$_1$' and R$_1$" are joined to form an oxo group, R$_2$ is an alkyl group, O-alkyl group, or hydroxy group, wherein the method involves the performance of at least one chemical synthesis reaction selected from the reactions depicted in FIGS. 3A, 3B, 3C(i), 3C(ii), 3D, 3E, 3F, and 3G.

In at least one embodiment, in an aspect, the compound having chemical formula (I) can be a compound having formula (A$_x$):

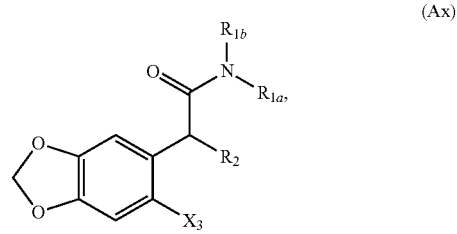

wherein X$_3$ is a hydrogen atom or a methoxy group (—OCH$_3$), wherein R$_2$ is a hydrogen atom, a methyl group, or an ethyl group, and R$_{1a}$ and R$_{1b}$ are each independently or both simultaneously selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from:
(i) (b); (a) and (b); (e); and (d) and (e), depicted in FIG. 3A;
(ii) (d); (c) and (d); (b), (c) and (d); and (a), (b), (c), and (d), depicted in FIG. 3D; and
(iii) (c); (b) and (c); and (a), (b), and (c), depicted in FIG. 3E.

In at least one embodiment, in an aspect, the compound having chemical formula (II) can be a compound having formula (A$_y$):

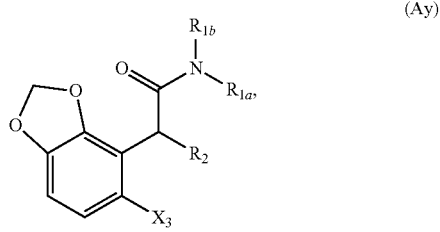

wherein X$_3$ is a hydrogen atom, wherein R$_2$ is a methyl group, and R$_{1a}$ and R$_{1b}$ are each independently or both simultaneously selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from (c); (b) and (c); and (a), (b), and (c), depicted in FIG. 3F.

In at least one embodiment, in an aspect, the compound having chemical formula (I) can be a compound having formula (A$_z$):

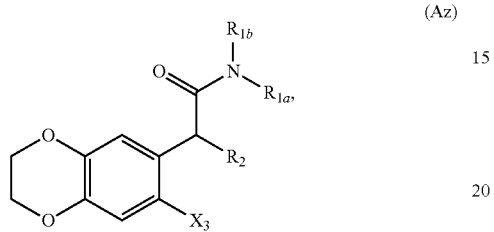

(Az)

wherein X$_3$ is a hydrogen atom, wherein R$_2$ is a methyl group, and R$_{1a}$ and R$_{1b}$ are each independently or both simultaneously selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from (b); and (a) and (b), depicted in FIG. 3G.

In at least one embodiment, in an aspect, the compound having chemical formula (I) can be a compound having formula (B$_x$):

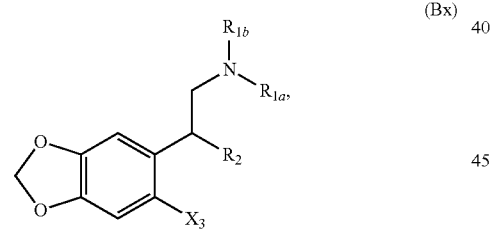

(Bx)

wherein X$_3$ is a hydrogen atom or a methoxy group (—OCH$_3$), wherein R$_2$ is a methyl group, or an ethyl group, and R$_{1a}$ and R$_{1b}$ each independently or both simultaneously are selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from:

(i) (c); (b) and (c); (a), (b), and (c); (f); (e) and (f); and (d), (e), and (f), depicted in FIG. 3A; and (ii) (d); (c) and (d); (b), (c), and (d); and (a), (b), (c), and (d), depicted in FIG. 3E.

In at least one embodiment, in an aspect, the compound having chemical formula (II) can be a compound having formula (B$_y$):

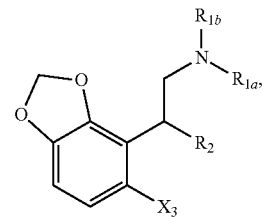

(By)

wherein X$_3$ is a hydrogen atom, wherein R$_2$ is a methyl group, and R$_{1a}$ and R$_{1b}$ are each independently or both simultaneously selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from (d); (c) and (d); (b), (c), and (d); and (a), (b), (c), and (d), depicted in FIG. 3F.

In at least one embodiment, in an aspect, the compound having chemical formula (I) can be a compound having formula (B$_z$):

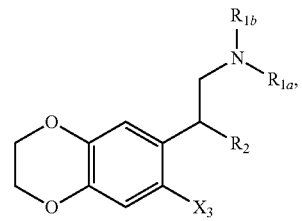

(Bz)

wherein X$_3$ is a hydrogen atom, wherein R$_2$ is a methyl group, and R$_{1a}$ and R$_{1b}$ are each independently or both simultaneously selected from a methyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring, and the at least one chemical synthesis reaction is a reaction selected from (c); (b) and (c); and (a), (b), and (c), depicted in FIG. 3G.

In at least one embodiment, in an aspect, the compound having chemical formula (I) can be a compound having formula (C):

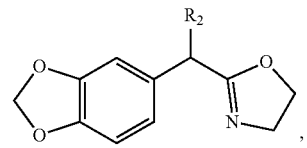

(C)

wherein R$_2$ is a hydrogen atom, a methyl group or an ethyl group, and the at least one chemical synthesis reaction is a reaction selected from:

(i) (i); (e) and (i); and (d), (e), and (i), depicted in FIG. 3A; and (ii) (f); (e) and (f); (b), (e) and (f); and (a), (b), (e), and (f), depicted in FIG. 3E.

In at least one embodiment, in an aspect, the compound having chemical formula (I) can be a compound having formula (D):

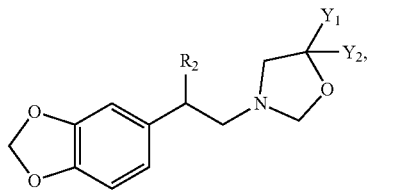

(D)

wherein R$_2$ is a methyl group or an ethyl group, and Y$_1$ and Y$_2$ each independently or simultaneously are a hydrogen atom or a methyl group, and the at least one chemical synthesis reaction is a reaction selected from (h); (f) and (h); (e), (f), and (h); (d), (e), (f), and (h); (g); (f) and (g); (e), (f), and (g); and (d), (e), (f), and (g), depicted in FIG. 3A.

In at least one embodiment, in an aspect, the compound having chemical formula (I) can be a compound having formula (E):

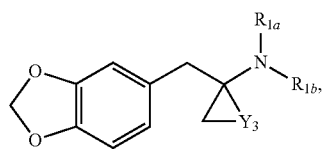

(E)

wherein Y$_3$ is methylene, ethylene, propylene, or butylene, and R$_{1a}$ and R$_{1b}$ are each independently or both simultaneously selected from a methyl group, an ethyl group, a CH$_2$-phenyl group, a hydrogen atom, or R$_{1a}$ and R$_{1b}$ are both simultaneously an oxygen atom.

and the at least one chemical synthesis reaction is a reaction selected from:
(i) (e); (d) and (e); (c), (d), and (e); (b), (c), (d), and (e); and (a), (b), (c), (d), and (e);
(ii) (d); (c) and (d); (b), (c), and (d); and (a), (b), (c), and (d); and
(iii) (c); (b) and (c); and (a), (b), and (c);
(iv) (b); and (a) and (b),
depicted in FIG. 3B.

In at least one embodiment, in an aspect, the compound having chemical formula (I) can be a compound having formula (F):

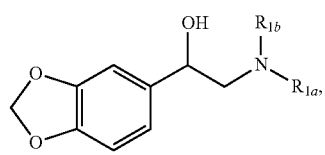

(F)

wherein R$_{1a}$ and R$_{1b}$ are each independently or both simultaneously selected from a methyl group, ethyl group, a CH$_2$-phenyl group, or a hydrogen atom, and the at least one chemical synthesis reaction is a reaction selected from:

(i) (d); (c) and (d); (b), (c), and (d); and (a), (b), (c), and (d);
(ii) (c); (b) and (c); and (a), (b), and (c); and
(iii) (b); and (a) and (b),
depicted in FIG. 3C(i).

In at least one embodiment, in an aspect, the compound having chemical formula (I) can be a compound having formula (G):

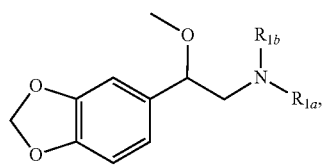

(G)

wherein R$_{1a}$ and R$_{1b}$ are each independently or both simultaneously selected from a methyl group, ethyl group, a CH$_2$-phenyl group, or a hydrogen atom, and the at least one chemical synthesis reaction is a reaction selected from:
(i) (h); (g) and (h); (f), (g), and (h); (e), (f), (g), and (h); and (a), (e), (f), (g), and (h);
(ii) (g); (f) and (g); (e), (f), and (g); and (a), (e), (f), and (g); and
(iii) (f); (e) and (f); and (a), (e) and (f),
depicted in FIGS. 3C(i) and 3C(ii).

In another aspect the present disclosure provides, in at least one embodiment, a use of a chemical compound having chemical formula (I) or (II):

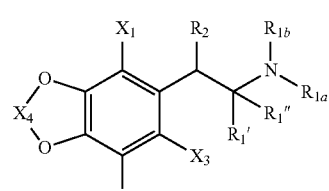

(I)

or

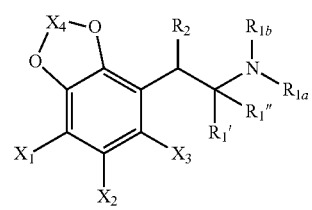

(II)

wherein, in chemical formula (I) or (II):
X$_1$, X$_2$, and X$_3$ are independently selected from a hydrogen atom, O-alkyl, acyl, N-(alkyl)$_2$, N-(alkyl)(H), OH, a halogen, or NH$_2$;
X$_4$ is an alkylene group or substituted alkylene group;
R$_1$' and R$_1$" are independently or simultaneously an alkyl group, or a hydrogen atom, wherein at least one of R$_1$' and R$_1$" is hydrogen, or R$_1$' and R$_1$" are joined together to form an oxo group (C=O) or a cycloalkyl group;
or R$_1$" is joined together with R$_{1b}$, together with the carbon atom to which R$_1$" is attached and the nitrogen atom to which R$_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring, or $NR_{1a}R_{1b}$ is a nitro group;

and when $R_1'$ and $R_1''$ are joined to form an oxo group, $R_2$ is an alkyl group, O-alkyl group, or hydroxy group, in the manufacture of a pharmaceutical or recreational drug formulation.

In at least one embodiment, in an aspect, the manufacture can comprise formulating the chemical compound with an excipient, diluent, or carrier.

In another aspect the present disclosure provides, in at least one embodiment, a use of a compound having chemical formula (I) or (II):

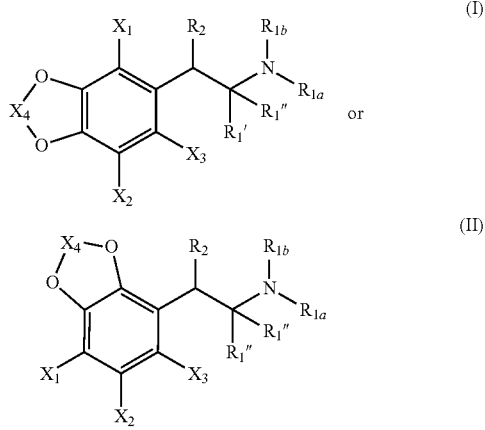

wherein, in chemical formula (I) or (II):

$X_1$, $X_2$, and $X_3$ are independently selected from a hydrogen atom, O-alkyl, acyl, N-(alkyl)$_2$, N-(alkyl)(H), OH, a halogen, or $NH_2$;

$X_4$ is an alkylene group or substituted alkylene group;

$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;

or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1b}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring, or $NR_{1a}R_{1b}$ is a nitro group;

and when $R_1'$ and $R_1''$ are joined to form an oxo group, $R_2$ is an alkyl group, O-alkyl group, or hydroxy group, together with a diluent, carrier, or excipient as a pharmaceutical or recreational drug formulation.

Other features and advantages will become apparent from the following detailed description. It should be understood, however, that the detailed description, while indicating preferred implementations of the disclosure, are given by way of illustration only, since various changes and modifications within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached figures. The figures provided herein are provided for a better understanding of the example embodiments and to show more clearly how the various embodiments may be carried into effect. The figures are not intended to limit the present disclosure.

Figure 1:
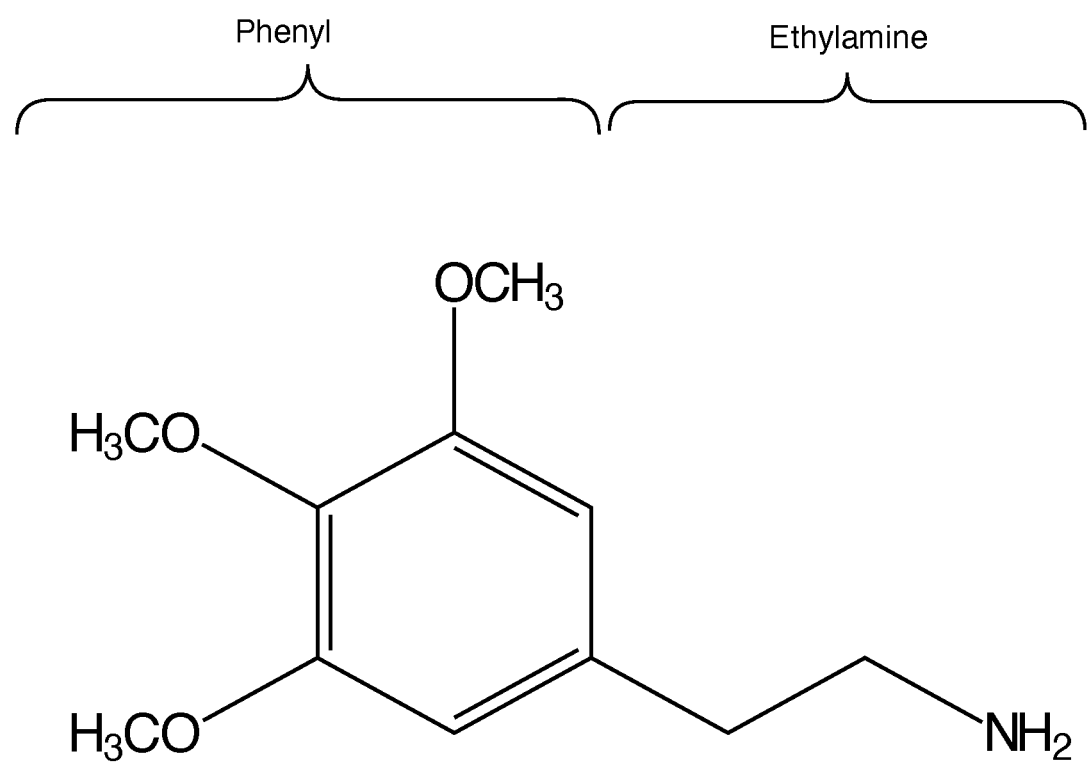
FIG. 1 depicts the chemical structure of mescaline, and identifies a phenyl portion, comprising a substituted phenyl group, and an ethylamine portion of the compound.

The figures together with the following detailed description make apparent to those skilled in the art how the disclosure may be implemented in practice.

DETAILED DESCRIPTION

Various compositions, systems or processes will be described below to provide an example of an embodiment of each claimed subject matter. No embodiment described below limits any claimed subject matter and any claimed subject matter may cover processes, compositions or systems that differ from those described below. The claimed subject matter is not limited to compositions, processes or systems having all of the features of any one composition, system or process described below or to features common to multiple or all of the compositions, systems or processes described below. It is possible that a composition, system, or process described below is not an embodiment of any claimed subject matter. Any subject matter disclosed in a composition, system or process described below that is not claimed in this document may be the subject matter of another protective instrument, for example, a continuing patent application, and the applicant(s), inventor(s) or owner(s) do not intend to abandon, disclaim or dedicate to the public any such subject matter by its disclosure in this document.

As used herein and in the claims, the singular forms, such "a", "an" and "the" include the plural reference and vice versa unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers.

When ranges are used herein for physical properties, such as molecular weight, or chemical properties, such as chemical formulae, all combinations and sub-combinations of ranges and specific embodiments therein are intended to be included. Other than in the operating examples, or where otherwise indicated, all numbers expressing quantities of ingredients or reaction conditions used herein should be understood as modified in all instances by the term "about." The term "about" when referring to a number or a numerical range means that the number or numerical range referred to is an approximation within experimental variability (or within statistical experimental error), and thus the number or numerical range may vary between 1% and 15% of the stated number or numerical range, as will be readily recognized by context. Furthermore, any range of values described herein is intended to specifically include the limiting values of the range, and any intermediate value or sub-range within the given range, and all such intermediate values and sub-ranges are individually and specifically disclosed (e.g., a range of 1 to 5 includes 1, 1.5, 2, 2.75, 3, 3.90, 4, and 5). Similarly, other terms of degree such as "substantially" and "approximately" as used herein mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular embodiments only, and is not intended to limit the scope of the present invention, which is defined solely by the claims.

All publications, patents and patent applications are herein incorporated by reference in their entirety to the same extent as if each individual publication, patent, or patent application was specifically and individually indicated to be incorporated by reference in its entirety.

Terms and Definitions

The term "mescaline" refers to a chemical compound having the structure set forth in FIG. 1. It is noted that mescaline is also known in the art as 3,4,5 trimethoxyphenethylamine. It is further noted that mescaline includes a phenyl portion comprising a substituted phenyl group, and an ethylamine portion, as shown in FIG. 1.

Figure 2:
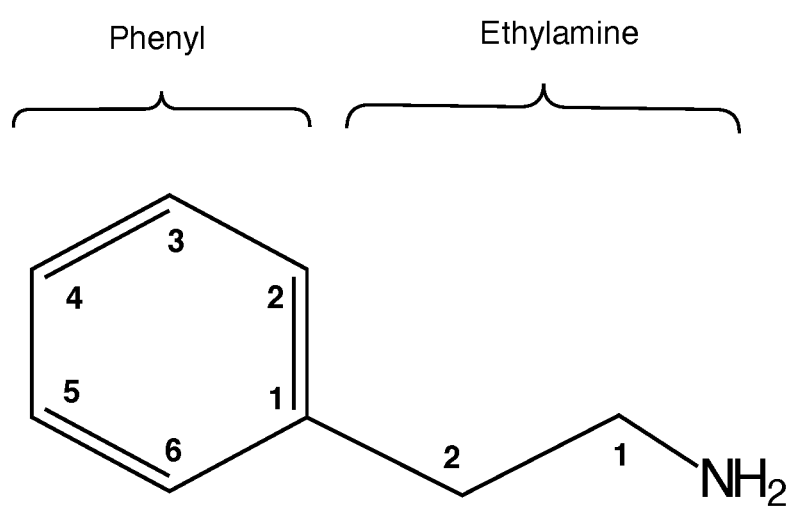
FIG. 2 depicts a certain prototype structure of mescaline derivative compounds. The prototype structure contains a phenyl portion, comprising a substituted phenyl group, and an ethylamine portion, as indicated. Carbon atoms have been numbered $C_1$, $C_2$, $C_3$ etc. to indicate their position in the phenyl portion or ethylamine portion, respectively. Thus, for example, it will be clear from FIG. 2 that the ethylamine chain extends from the $C_1$ carbon of the phenyl group. Furthermore, it is noted that certain compounds may be named in accordance with the same. Thus, for example, the $C_1$ carbon atom of the ethylamine chain is aminated, and the chain is referred to as ethylamine. By way of another example, in 2,3 (1,3) dioxolanephenyl N-ethylamine, phenyl portion carbon atoms $C_2$ and $C_3$, are each participating in the formation of a (1,3) dioxolane group (i.e., a pentane in which the carbons at positions 1 and 3 have been replaced with an oxygen atom). Similarly, in 3,4,5 trimethoxyphenethylamine (mescaline), phenyl portion carbon atoms $C_3$, $C_4$, and $C_5$ are each bonded to a methoxy group.

The term "mescaline derivative prototype structure" refers to the chemical structure shown in FIG. 2. The mescaline derivatives disclosed herein include the mescaline derivative prototype structure shown in FIG. 2, wherein various atoms may be substituted, as herein described. It is noted that the prototype structure comprises a phenyl portion and an ethylamine portion. Furthermore, it is noted that specific carbon atoms in the mescaline derivative prototype structure are numbered. In this respect, it is noted that specific carbon atoms in the phenyl portion of the prototype structure are numbered separately from the carbon atoms in the ethylamine portion. Reference may be made herein to these numbered carbons, for example, $C_1$ of the phenyl portion, $C_2$ of the phenyl portion, $C_1$ of the ethylamine portion, $C_2$ of the ethylamine portion, and so forth. It is noted that the ethylamine chain extends from the $C_1$ carbon atom of the phenyl portion of the prototype structure. It is further noted that, in general terms, disclosed herein are mescaline derivatives in which: (i) adjacent carbon atoms $C_2$ and $C_3$ (formula (II) and formula ($II_b$)) or $C_3$ and $C_4$ (formula (I) and formula ($I_b$)) of the phenyl portion of the prototype structure participate in a fusion to a heterocycle, notably, in some embodiments, a 5-membered heterocycle, and notably, in some embodiments, a (1,3) dioxolane ring; and (ii) the N-ethylamine chain extending from the $C_1$ atom of the phenyl portion of the prototype structure is a substituted ethylamine chain, notably an ethylamine chain which possess a substituted $C_1$ and/or a substituted $C_2$ carbon atom (—$CHR_2$—$CR_1'R_1''$—) wherein $R_2$ and/or $R_1'$ and/or $R_1''$ are a substituent. Thus, the herein disclosed mescaline derivatives can be said to be substituted ethylamine fused heterocyclic mescaline derivatives.

A straight bond, or a wavy or squiggly bond, drawn to a chiral atom, including, notably a chiral carbon atom, within a structural chemical formula indicates that the stereochemistry of the chiral atom is undefined. Examples of such chemical structural formulas are structural formulas (a) and (b):

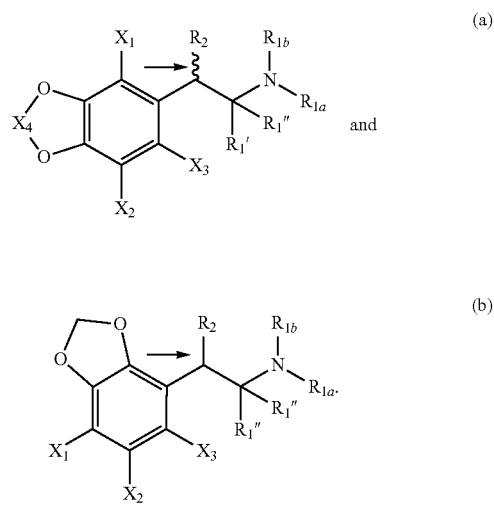

Thus, for example, a straight bond, or a wavy or squiggly bond, drawn to a chiral atom is intended to denote the S- or R-, configuration, as well as mixtures thereof, in a single figure. When a straight bond, or a wavy or squiggly bond, are attached to a double bond moiety (such as —C=C—), included are the cis- or trans- (or (E)- or (Z)-) geometric isomers, or mixtures thereof.

The term "chiral carbon atom" as used herein refers to a carbon atom bonded to four different substituents.

The terms "stereoisomer" and "stereoisomeric compound", as used herein, are intended to refer to a chemical compound in reference to another chemical compound, wherein both compounds have the same chemical formula when the structural formula is denoted with straight bonds. However, when the structural formula of the two compounds is denoted with one or more wedge bonds (◢, ⋰⋰) drawn to an atom, to thereby define the three dimensional configuration of the compounds, the compounds are three-dimensionally differently configured. In this respect, the wedge bonds can signify that stereoisomers of a compound exist. A pair of stereoisomers can include two compounds which are configured three-dimensionally such that they are mirror images of one another. Thus, for example, compounds (a(i)) and (a(ii)) are stereoisomers which are mirror images of one another,

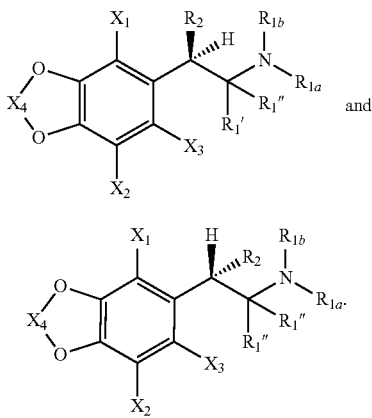

It is noted that stereoisomers may occur in mixtures containing varying relative amounts of the stereoisomers, including mixtures comprising equimolar, or approximately equimolar quantities of two stereoisomers, which may also be referred to as "racemic mixtures".

The terms "hydroxy group", and "hydroxy", as used herein, refers to a molecule containing one atom of oxygen bonded to one atom of hydrogen and having the chemical formula —OH. A hydroxy group through its oxygen atom may be chemically bonded to another entity.

The terms "amino" and "amino group", as used herein, refers to a molecule containing one atom of nitrogen bonded to hydrogen atoms and having the formula —$NH_2$. An amino group also may be protonated and having the formula —$NH_3^+$. In its protonated form the amino group may form an ammonium salt, for example, a chloride or sulfate ammonium salt, or an organic ammonium salt, all of which may be represented herein as $NH_3^+Z^-$. An amino group through its nitrogen atom may be chemically bonded to another entity. Furthermore, it is noted that an entity attached to an amino group may be referred to herein as an "aminated" entity, e.g., an aminated mescaline derivative is a mescaline derivative possessing an amino group.

The term "oxo group", as used herein, refers to the group =O, and, for example, can be formed by replacing two hydrogens bonded to the same carbon atom with =O.

The term "carbonyl group", as used herein, refers to the group —C=O, and can be formed by replacing two hydrogens bonded to the same carbon atom with =O.

The terms "halogen", "halogen group", "halo-" and "halogenated", as used herein, refer to the class of chemical elements consisting of fluorine (F), chlorine (Cl), bromine (Br), and iodine (I). Accordingly, halogenated compounds can refer to "fluorinated", "chlorinated", "brominated", or "iodinated" compounds.

The term "alkyl group", as used herein, refers to a hydrocarbon group arranged in a chain having the chemical formula —$C_nH_{2n+1}$. Alkyl groups include, without limitation, methyl groups (—$CH_3$), ethyl groups (—$C_2H_5$), propyl groups (—$C_3H_7$) and butyl groups (—$C_4H_9$). The alkyl groups (including O-alkyl, and the alkyl groups present in acyl and O-acyl) in any of the embodiments of the disclosure is $C_1$-$C_{20}$-alkyl. In another embodiment, the alkyl group is $C_1$-$C_{10}$-alkyl. In another embodiment, the alkyl group is $C_1$-$C_6$-alkyl. In another embodiment, the alkyl group is methyl, ethyl, propyl, butyl or pentyl.

The term "nitro group", as used herein, refers to a molecule containing one atom of nitrogen bonded to two atoms of oxygen and having the formula —$NO_2$.

The term "cyclo-alkyl", as used herein, refers to cyclically arranged hydrocarbon groups, including cyclically arranged ($C_3$-$C_{20}$), ($C_3$-$C_{10}$), and ($C_3$-$C_6$) hydrocarbon groups, and includes saturated and partially saturated cyclo-alkyl groups, and further includes cyclo-propane, cyclo-butane, cyclo-pentane, cyclohexane, cycloheptane, cyclopentene, and cyclohexene.

The terms "O-alkyl group", and "alkoxy group", as used herein interchangeably, refer to a hydrocarbon group arranged in a chain having the chemical formula —O—$C_nH_{2n+1}$. O-alkyl groups include, without limitation, O-methyl groups (—O—$CH_3$) (i.e., methoxy), O-ethyl groups (—O—$C_2H_5$) (i.e., ethoxy), O-propyl groups (—O—$C_3H_7$) (i.e., propoxy) and O-butyl groups (—O—$C_4H_9$) (i.e., butoxy).

The terms "N-alkyl group", as used herein, refers to a hydrocarbon group arranged in a chain having the chemical formula —N—$C_nH_{2n+1}$. N-alkyl groups include, without limitation, N-methyl groups (—N—$CH_3$), N-ethyl groups (—N—$C_2H_5$), N-propyl groups (—N—$C_3H_7$), and N-butyl groups (—N—$C_4H_9$).

The term "hydroxylalkyl", as used herein, refers to a hydrocarbon group arranged in a straight chain substituted with at least one hydroxy group, including a straight chain having the chemical formula —$C_nH_{2n}$OH, or a hydrocarbon group arranged in branched chain substituted with at least one hydroxy group. In the noted chemical formula, depending on the carbon chain, length specific hydroxylalkyl groups may be termed a methanol group (n=1) or hydroxymethyl, an ethanol group (n=2) or hydroxyethyl, a propanol group (n=3) or hydroxypropyl, a butanol group (n=4) or hydroxybutyl etc. A further example hydroxylalkyl includes a hydrocarbon group having the formula:

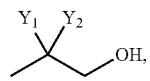

wherein $Y_1$ and $Y_2$ are each simultaneously or independently a hydrogen atom, or an alkyl group (e.g., —$CH_3$, —$CH_2$—$CH_3$).

The term "acyl group", as used herein, refers to a carbon atom double bonded to an oxygen and single bonded to an alkyl group. The carbon atom further can be bonded to another entity. An acyl group can be described by the chemical formula: —C(=O)—$C_nH_{2n+1}$ (—C(=O)-alkyl) or e.g., ($C_1$-$C_6$)-acyl, ($C_1$-$C_3$)-acyl etc. Furthermore, depending on the carbon chain, length specific acyl groups may be termed a formyl group (n=0), an acetyl group (n=1), a propionyl group (n=2), a butyryl group (n=3), a pentanoyl group (n=4), etc.

The term "O-acyl group", as used herein, refers to an acyl group in which the carbon atom is single bonded to an additional oxygen atom. The additional oxygen atom can be bonded to another entity. An O-acyl group can be described by the chemical formula: —O—C(=O)—$C_nH_{2n+1}$ or e.g., —O—($C_1$-$C_6$)-acyl, —O—($C_1$-$C_3$)-acyl etc. Furthermore, depending on the carbon chain, length specific O-acyl groups may be termed an O-formyl group (n=0), an O-acetyl group (n=1), an O-propionyl group (n=2), an O-butyryl group (n=3), an O-pentanoyl group (n=4) etc.

The term "alkylene", as used herein refers to a divalent alkyl group, including, for example, methylene, ethylene, and propylene.

The term "hetero", as used herein (e.g., "heterocycle", "heterocyclic", "heterocyclic group"), refers to a saturated or partially saturated or aromatic cyclic group, in which one or two ring atoms are a heteroatom selected from N, O, or S, the remaining ring atoms being C. Included are, for example, ($C_3$-$C_{20}$), ($C_3$-$C_{10}$), and ($C_3$-$C_6$) cyclic groups comprising one or two hetero atoms selected from O, S, or N.

The term "aryl group", as used herein, refers to an aromatic ring compound in which at least one hydrogen atom has been removed from the aromatic ring to permit the bonding of a carbon atom in the aromatic ring to another entity. The aryl groups can optionally be a substituted $C_6$-$C_{14}$-aryl. The aryl group can further optionally be substituted $C_6$-$C_{10}$-aryl, or phenyl. Further aryl groups include phenyl, naphthyl, tetrahydronaphthyl, phenanthrenyl, biphenylenyl, indanyl, or indenyl and the like.

The term "alkyl-aryl", as used herein, refers to an alkylene group substituted with an aryl group.

The term "pharmaceutical formulation", as used herein, refers to a preparation in a form which allows an active ingredient, including a psychoactive ingredient, contained therein to provide effective treatment, and which does not contain any other ingredients which cause excessive toxicity, an allergic response, irritation, or other adverse response commensurate with a reasonable risk/benefit ratio. The pharmaceutical formulation may contain other pharmaceutical ingredients such as excipients, carriers, diluents, or auxiliary agents.

The term "receptor", as used herein, refers to a protein present on the surface of a cell, or in a cell not associated with a cellular surface (e.g., a soluble receptor) capable of mediating signaling to and/or from the cell, or within the cell and thereby affect cellular physiology. Receptors may be classified in classes, such as the G-protein coupled receptors ("GPCRs"), families, such as 5-HT receptors, and sub-families such as 5-$HT_{1A}$ receptors, 5-$HT_{2A}$ receptors, and 5-$HT_{2B}$ receptors, and so on. In this respect, "signaling" refers to a response in the form of a series of chemical reactions which can occur when a molecule, including, for example, the fused heterocyclic mescaline derivatives disclosed herein, interacts with a receptor. Signaling generally proceeds across a cellular membrane and/or within a cell, to reach a target molecule or chemical reaction, and results in a modulation in cellular physiology. Thus, signaling can be thought of as a transduction process by which a molecule interacting with a receptor can modulate cellular physiology, and, furthermore, signaling can be a process by which molecules inside a cell can be modulated by molecules outside a cell. Signaling and interactions between molecules and receptors, including for example, affinity, binding efficiency, and kinetics, can be evaluated through a variety of assays, including, for example, assays known as receptor binding assays (for example, radioligand binding assays, such as e.g., [$^3$H]ketanserin assays may be used to evaluate receptor 5-$HT_{2A}$ receptor activity), competition assays, and saturation binding assays, and the like.

The term "G-protein coupled receptor" or "GPCR", as used herein, refers to a class of evolutionarily related transmembrane receptors capable of interacting with a class of proteins known as G-proteins (guanine nucleotide binding proteins). GPCRs can mediate cellular responses to external stimuli (Weis and Kobilka, 2018, Annual Review of Biochemistry 87: 897-919) and can be activated by interacting with a ligand, including neurotransmitters, such as serotonin or dopamine, for example, which, can then initiate an interaction of the receptor with a G-protein and can elicit dissociation of the G-protein into α and βγ subunits. In turn, these α and βγ subunits can mediate further downstream signaling. GPCRs can also activate other signaling pathways, for example, through arrestin proteins and kinases. Certain ligands can preferentially activate a subset of all GPCR signaling pathways. Signaling pathways downstream of a GPCR can mediate therapeutic efficacy, or can cause drug adverse effects (Bock and Bermudez, 2021, FEBS Journal 288: 2513-2528).

The term 5-HT receptor", as used herein, refers to a family of GPCRs receptors found in the central and peripheral nervous system and include sub-families, such as, 5-$HT_{1A}$ receptors, 5-$HT_{2A}$ receptors, and 5-$HT_{2B}$ receptors. 5-HT receptors can mediate signaling through specific G-proteins, including notably $G\alpha_i$, $G\alpha_{q/11}$, and $G\alpha_s$ and can be involved in the control of multiple physiological processes including cognition, mood, and modulation of sleep-wake cycles, for example (McCorvy and Roth, 2015, Pharmacology and Therapeutics 150: 129-142). 5-HT receptors can further mediate signaling through arrestin as well as G-protein independent signaling pathways. 5-HT-receptors are implicated in multiple brain neurological disorders including migraine headaches, and neuropsychiatric disorders, such as schizophrenia and depression, for example.

The term "5-$HT_{1A}$ receptor" (also referred to as "HT1A" or "HTR1A"), as used herein, refers to a sub-family of a family of receptors for the neurotransmitter and peripheral signal mediator serotonin. 5-$HT_{1A}$ receptors can mediate a plurality of central and peripheral physiologic functions of serotonin. Ligand activity at 5-$HT_{1A}$ is generally not associated with hallucination, although many hallucinogenic compounds are known to modulate 5-$HT_{1A}$ receptors to impart physiological responses (Inserra et al., 2020, Pharmacol. Rev 73: 202). 5-$HT_{1A}$ receptors are implicated in various brain neurological disorders, including depression and anxiety, schizophrenia, and Parkinson's disease (Behav. Pharm. 2015, 26:45-58).

The term "5-$HT_{2A}$ receptor" (also referred to as "$HT_{2A}$" or "HTR2A"), as used herein, refers to a sub-family of a family of receptors for the neurotransmitter and peripheral signal mediator serotonin. 5-$HT_{2A}$ receptors can mediate a plurality of central and peripheral physiologic functions of serotonin. Central nervous system effects can include mediation of hallucinogenic effects of hallucinogenic compounds. 5-$HT_{2A}$ receptors are implicated in various brain neurological disorders (Nat. Rev. Drug Discov. 2022, 21:463-473; Science 2022, 375:403-411).

The term "5-$HT_{2B}$ receptor" (also referred to herein as "HT2B" or "HTR2B"), as used herein, refers to a sub-family of a family of receptors for the neurotransmitter and peripheral signal mediator serotonin. 5-$HT_{2B}$ receptors can mediate a plurality of central and peripheral physiologic functions of serotonin. Central nervous system effects can include mediation of hallucinogenic effects of hallucinogenic compounds. 5-$HT_{2B}$ receptors are implicated in various brain neurological disorders, including schizophrenia (Pharmacol. Ther. 2018, 181:143-155) and migraine (Cephalalgia 2017, 37:365-371).

The term "5-$HT_{2C}$ receptor" (also referred to herein as "HT2C" or "HTR2C"), as used herein, refers to a sub-family of a family of receptors for the neurotransmitter and peripheral signal mediator serotonin. Antagonism of 5-$HT_{2C}$ receptors by drugs such as agomelatine can increase availability of norepinephrine and dopamine in the prefrontal cortex, and can lead to antidepressant and nootropic effects (Savino et al., 2023, Brain Science 13: 734). Further, $5\text{-HT}_{2C}$ receptors can play a role in food intake and body weight control (Przegaliński et al., 2023, Nutrients 15:1449).

The term "$\alpha_{2A}$ receptor" (also referred to herein as "α-2A", or "alpha2A") as used herein, refers to a sub-family of a family of receptors for catecholamine neurotransmitters and signal mediators such as norepinephrine (noradrenaline) and epinephrine (adrenaline). α-2A receptors are implicated in various brain neurological disorders, including schizophrenia, bipolar disorders, and post-traumatic stress disorder (PTSD) (Saggu et al., 2023, Molecular Psychiatry 28: 588-600).

The term "$MT_1$ receptor" (also referred to herein as "MT1"), used herein, refers to a sub-family of a family of receptors for the neural transmitter and signal mediator melatonin. $MT_1$ receptors are implicated in various brain neurological disorders, including sleep disorders and depression (Boiko et al., 2022, Neurochemical Research 47: 2909-2924).

The term "$D_2$ receptor," (also referred to herein as "$D_2$" or "D2"), as used herein, refers to a sub-family of a family of receptors for the neural transmitter and signal mediator dopamine. $D_2$ receptors are implicated in various brain neurological disorders, including schizophrenia, Parkinson's disease, depression, and anxiety (Żuk et al., 2022, Pharmacological Reports 74: 406-424).

The term "$D_3$ receptor" (also referred to herein as "$D_3$" or "D3"), as used herein, refers to a sub-family of a family of receptors for the neural transmitter and signal mediator dopamine. $D_3$ receptors are implicated in various brain neurological disorders, including schizophrenia, drug addiction, and Parkinson's disease (Kim, 2023, International Journal of Molecular Sciences 24: 6742).

The term "DAT", as used herein, refers to a transmembrane transport protein also known as "dopamine active transporter", which is involved in transporting dopamine into the cytosol. DAT is implicated in various brain neurological disorders, notably dopamine related disorders such as attention deficit hyperactivity disorder (ADHD), bipolar disorder, and clinical depression, anxiety (Am. J. Med. Genet. B Neuropsychiatr. Genet. 2018, 177:211-231).

The term "NET", as used herein, refers to a transmembrane transport protein also known as "norepinephrine transporter" or "noradrenaline transporter" or "NAT" which is involved in $Na^+/Cl^-$ dependent re-uptake of extracellular norepinephrine or noradrenaline. NET is implicated in various brain neurological disorders, including attention deficit hyperactivity disorder (ADHD) and clinical depression (Neurosci. Biobehav. Rev, 2013, 37:1786-800).

The term "SERT", as used herein, refers to a transmembrane transport protein also known as "serotonin transporter" which is involved in neuronal serotonin transport, notably from the synaptic cleft back to the presynaptic neuron, thereby terminating the action of serotonin. SERT is implicated in various brain neurological disorders, including anxiety and depression (Pharmacol. Rep. 2018, 70:37-46).

The term "modulating receptors", as used herein, refers to the ability of a compound disclosed herein to alter the function of receptors. A receptor modulator may activate the activity of a receptor or inhibit the activity of a receptor depending on the concentration of the compound exposed to the receptor. Such activation or inhibition may be contingent on the occurrence of a specific event, such as activation of a signal transduction pathway, and/or maybe manifest only in particular cell types. The term "modulating receptors," also refers to altering the function of a receptor by increasing or decreasing the probability that a complex forms between a receptor and a natural binding partner to form a multimer. A receptor modulator may increase the probability that such a complex forms between the receptor and the natural binding partner, may increase or decrease the probability that a complex forms between the receptor and the natural binding partner depending on the concentration of the compound exposed to the receptor, and or may decrease the probability that a complex forms between the receptor and the natural binding partner. It is further noted that the fused heterocyclic mescaline derivatives of the present disclosure may alter the function of a receptor by acting as an agonist or antagonist of the receptor, and that fused heterocyclic mescaline derivatives according to the present disclosure may alter the function of a receptor by directly interacting therewith or binding thereto, or by indirectly interacting therewith through one or more other molecular entities. In general, the receptor may be any receptor, including any receptor set forth herein, such as, any of a $5\text{-HT}_{1A}$, $5\text{-HT}_{2A}$, a $5\text{-HT}_{2B}$, $5\text{-HT}_{2C}$, $D_2$, $D_3$, $\alpha_{2A}$, $MT_1$ receptor, for example. Accordingly, it will be clear, that in order to refer modulating specific receptors, terms such as "modulating $5\text{-HT}_{1A}$ receptors", "modulating $5\text{-HT}_{2A}$ receptors", "modulating $5\text{-HT}_{2B}$ receptors", and so forth, may be used herein.

The term "receptor-mediated disorder", as used herein, refers to a disorder that is characterized by abnormal receptor activity. A receptor-mediated disorder may be completely or partially mediated by modulating a receptor. In particular, a receptor-mediated disorder is one in which modulation of the receptor results in some effect on an underlying disorder e.g., administration of a receptor modulator results in some improvement in at least some of the subjects being treated. In general, the receptor may be any receptor, including any receptor set forth herein, such as any of a $5\text{-HT}_{1A}$, $5\text{-HT}_{2A}$, a $5\text{-HT}_{2B}$, $5\text{-HT}_{2C}$, $\alpha_{2A}$, $D_2$, $D_3$, or a $MT_1$ receptor, for example. Accordingly, it will be clear, that in order to refer specific receptor-mediated disorders, terms such as "$5\text{-HT}_{1A}$ receptor-mediated disorder", "$5\text{-HT}_{2A}$ receptor-mediated disorder", "$5\text{-HT}_{2B}$ receptor-mediated disorder", and so forth, may be used.

The term "recreational drug formulation", as used herein, refers to a preparation in a form which allows a psychoactive ingredient contained therein to be effective for administration as a recreational drug, and which does not contain any other ingredients which cause excessive toxicity, an allergic response, irritation, or other adverse response commensurate with a reasonable risk/benefit ratio. The recreational drug formulation may contain other ingredients such as excipients, carriers, diluents, or auxiliary agents.

The term "effective for administration as a recreational drug", as used herein, refers to a preparation in a form which allows a subject to voluntarily induce a psychoactive effect for non-medical purposes upon administration, generally in the form of self-administration. The effect may include an altered state of consciousness, satisfaction, pleasure, euphoria, perceptual distortion, or hallucination.

The term "effective amount", as used herein, refers to an amount of an active agent, pharmaceutical formulation, or recreational drug formulation, sufficient to induce a desired biological or therapeutic effect, including a prophylactic effect, and further including a psychoactive effect. Such effect can include an effect with respect to the signs, symptoms or causes of a disorder, or disease or any other desired alteration of a biological system. The effective amount can vary depending, for example, on the health condition, injury stage, disorder stage, or disease stage, weight, or sex of a subject being treated, timing of the administration, manner of the administration, age of the subject, and the like, all of which can be determined by those of skill in the art.

The terms "treating" and "treatment", and the like, as used herein, are intended to mean obtaining a desirable physiological, pharmacological, or biological effect, and includes prophylactic and therapeutic treatment. The effect may result in the inhibition, attenuation, amelioration, or reversal of a sign, symptom or cause of a disorder, or disease, attributable to the disorder, or disease, which includes mental and psychiatric diseases and disorders. Clinical evidence of the prevention or treatment may vary with the disorder, or disease, the subject, and the selected treatment.

The term "pharmaceutically acceptable", as used herein, refers to materials, including excipients, carriers, diluents, or auxiliary agents, that are compatible with other materials in a pharmaceutical or recreational drug formulation and within the scope of reasonable medical judgement suitable for use in contact with a subject without excessive toxicity, allergic response, irritation, or other adverse response commensurate with a reasonable risk/benefit ratio.

The term "substantially free", as used herein to describe a composition, references the substantial absence of a second compound in a composition comprising a first compound. Preferably the composition containing the first compound contains less than 5%, less than 2.5%, less than 1%, less than 0.5%, less than 0.1%, or less than 0.01% by mole percent of the second compound.

The terms "substantially pure" and "isolated", as may be used interchangeably herein describe a compound, e.g., a mescaline derivative, which has been separated from components that naturally accompany it. Typically, a compound is substantially pure when at least 60%, more preferably at least 75%, more preferably at least 90%, 95%, 96%, 97%, or 98%, and most preferably at least 99% of the total material (by volume, by wet or dry weight, or by mole percent or mole fraction) in a sample is the compound of interest. Purity can be measured by any appropriate method, e.g., in the case of polypeptides, by chromatography, gel electrophoresis or HPLC analysis.

General Implementation

As hereinbefore mentioned, the present disclosure relates to mescaline derivatives. In particular, the present disclosure provides novel heterocyclic mescaline derivatives, wherein the phenyl portion participates in the formation of a heterocyclic ring structure, including, in example embodiments, a dioxolane ring, fused to the phenyl portion. Thus, the compounds of the present disclosure can be said to be fused heterocyclic mescaline derivatives. Furthermore, the mescaline derivatives include a substituted ethylamine chain. The ethylamine chain can contain various substituent groups, including, notably $C_1$ and/or $C_2$ substituent groups. In addition, the amine group in the ethylamine chain can be substituted. Thus, the herein disclosed mescaline derivatives can be said to substituted ethylamine fused heterocyclic mescaline derivatives. In general, the herein provided novel compounds exhibit functional properties which deviate from the functional properties of mescaline. Thus, for example, the mescaline derivatives of the present disclosure, can exhibit pharmacological properties which deviate from mescaline, including, for example, with respect to interactions such as with $5-HT_{2A}$ and $5-HT_{1A}$ receptors. Furthermore, the mescaline derivatives may exhibit physico-chemical properties which differ from mescaline. Thus, for example, the fused heterocyclic mescaline derivatives may exhibit superior solubility in a solvent, for example, an aqueous solvent.

The fused heterocyclic mescaline derivatives in this respect are useful in the formulation of pharmaceutical and recreational drug formulations. In one embodiment, the fused heterocyclic mescaline derivatives of the present disclosure can conveniently be chemically synthesized. The practice of this method avoids the extraction of mescaline from cactus plants and the performance of subsequent chemical reactions to achieve the fused heterocyclic mescaline derivatives. Furthermore, the growth of cactus plants can be avoided thus limiting the dependence on climate and weather, and potential legal and social challenges associated with the cultivation of cactus plants containing psychoactive compounds. The method can efficiently yield substantial quantities of the fused heterocyclic mescaline derivatives.

In what follows selected embodiments are described with reference to the drawings.

Initially example fused heterocyclic mescaline derivatives will be described. Thereafter example methods of using and making the fused heterocyclic mescaline derivatives will be described.

Accordingly, in one aspect the present disclosure provides derivatives of a compound known as mescaline of which the chemical structure is shown in FIG. 1. The derivatives herein provided are, in particular, fused heterocyclic derivatives of mescaline. It is noted that in this respect, that the term "fused heterocyclic", refers to a derivative wherein a heterocycle is bonded to two adjacent carbon atoms present in the phenyl ring of mescaline. Similarly, the term "fused dioxolane", refers to a derivative wherein a dioxolane is bonded to two adjacent carbon atoms present in the phenyl ring of mescaline. Furthermore, the derivatives are ethylamine mescaline derivatives. In this respect, referring to FIG. 2, "ethylamine" refers to a mescaline derivative comprising an ethylamine chain wherein, in particular, specifically the $C_1$ and/or $C_2$ atom of the ethylamine chain are substituted with one or more substituents.

Thus, in one aspect, the present disclosure provides, in accordance with the teachings herein, in at least one embodiment, a chemical compound having chemical formula I or (II):

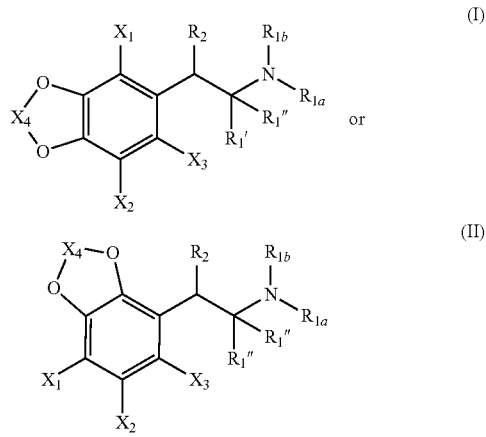

wherein, in chemical formula (I) or (II):
$X_1$, $X_2$, and $X_3$ are independently selected from a hydrogen atom, O-alkyl, acyl, N-(alkyl)$_2$, N-(alkyl)(H), OH, a halogen, or $NH_2$;
$X_4$ is an alkylene group or substituted alkylene group;
$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;

or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring or $NR_{1a}R_{1b}$ is a nitro group; and when $R_1'$ and $R_1''$ are joined to form an oxo group, $R_2$ is an alkyl group, O-alkyl group, or hydroxy group.

In one embodiment, in an aspect, the compound having formula (I) and (II) can have a chemical formula ($I_a$) and ($II_a$):

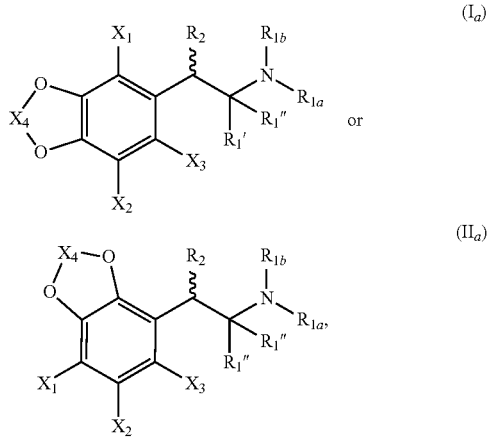

respectively.

Thus, referring to formula (I), ($I_a$), (II) and ($II_a$), $X_1$, $X_2$, and $X_3$ can be independently selected from a hydrogen atom, O-alkyl, N-alkyl, acyl, OH, a halogen, or $NH_2$. In example embodiments, $X_1$, $X_2$, and $X_3$ can each independently be selected from a hydrogen atom, O-alkyl (e.g., O—($C_1$-$C_{10}$)-alkyl, O—($C_1$-$C_6$)-alkyl, or O—($C_1$-$C_3$)-alkyl (methoxy, ethoxy, propoxy)), acyl (e.g., —(C=O)($C_1$-$C_6$)-acyl, —(C=O)($C_1$-$C_3$)-acyl), N-(alkyl)$_2$, N-(alkyl)(H), (e.g., N—($C_1$-$C_{10}$)$_2$-alkyl, N—($C_1$-$C_6$)$_2$-alkyl, N—($C_1$-$C_3$)$_2$-alkyl; —($C_1$-$C_{10}$)-alkyl(H), N—($C_1$-$C_6$)-alkyl(H), or N—($C_1$-$C_3$)-alkyl(H)), OH, halogen (C, F, Cl, I), or $NH_2$. In further example embodiments, all three of $X_1$, $X_2$, and $X_3$ can be identical substituents. In further example embodiments, all three of $X_1$, $X_2$, and $X_3$ can be identical O-alkyl groups (e.g., methoxy groups, ethoxy groups), non-identical O-alkyl groups, or partially identical O-alkyl groups (i.e., 2 identical O-alkyl groups, 1 non-identical O-alkyl group); identical N-alkyl groups, non-identical N-alkyl groups, or partially identical N-alkyl groups (i.e., 2 identical N-alkyl groups, 1 non-identical N-alkyl group); identical acyl groups, non-identical acyl groups, or partially identical acyl groups (i.e., 2 identical acyl groups, 1 non-identical acyl group); identical, non-identical or partially identical halogens (i.e., 2 identical halogens, 1 non-identical halogen). In further example embodiments, two of $X_1$, $X_2$, and $X_3$ can be identical substituents. In yet further example embodiments, all three of $X_1$, $X_2$, and $X_3$ can be non-identical substituents.

Turning to $X_4$ and referring further to formula (I) and (II), $X_4$ can be an alkylene group or substituted alkylene group. In an example embodiment, $X_4$ can be a non-substituted alkylene, including for example a ($C_1$-$C_{10}$)-alkylene, ($C_1$-$C_6$)-alkylene, or a ($C_1$-$C_3$)-alkylene (methylene (—$CH_2$—), ethylene (—$CH_2CH_2$—), propylene (—$CH_2CH_2CH_2$—)).

In an example embodiment, $X_4$ can be a substituted alkylene, including, for example, a $C_1$-$C_{10}$ substituted alkylene, $C_1$-$C_6$ substituted alkylene, or a $C_1$-$C_3$ substituted alkylene (substituted methylene (e.g., —CHR—, wherein R is a substituent), substituted ethylene (e.g., —CHRCH$_2$—, wherein R is a substituent), substituted propylene (e.g., —CH$_2$CHRCH$_2$—, wherein R is a substituent). Substituents can, for example, be selected from an oxo group (forming a carbonyl), hydroxy, halogen (F, Cl, Br, I), O-alkyl (e.g., O—($C_1$-$C_{10}$)-alkyl, O—($C_1$-$C_6$)-alkyl, or —O—($C_1$-$C_3$)-alkyl), N-(alkyl)$_2$, N-(alkyl)(H), (e.g., N—($C_1$-$C_{10}$)-alkyl, N—($C_1$-$C_6$)-alkyl, N—($C_1$-$C_3$)-alkyl, ($C_1$-$C_{10}$)-alkyl(H), N—($C_1$-$C_6$)-alkyl(H), or N—($C_1$-$C_3$)-alkyl(H)), $NH_2$, acyl (e.g., ($C_1$-$C_{10}$)-acyl, ($C_1$-$C_6$)-acyl, or ($C_1$-$C_3$)-acyl), O-acyl (e.g., O—($C_1$-$C_{10}$)-acyl, O—($C_1$-$C_6$)-acyl, or O—($C_1$-$C_3$)-acyl) aryl (e.g., $C_6$-$C_{10}$ aryl, e.g., phenyl, naphthyl), and alkyl-aryl group (e.g., ($C_1$-$C_{10}$)-alkyl-aryl, ($C_1$-$C_6$)-alkyl-aryl, or ($C_1$-$C_3$)-alkyl-aryl). Further included are singly and multiply substituted alkylenes. Multiply substituted alkylenes include substitutions of the same alkylene carbon atom (thus a halogen substituent may be e.g., —CH$_2$CF$_2$— or —CF$_2$—) or substitutions of different carbon atoms (e.g., —CHF—CHF—).

In an example embodiment, $X_4$ can be a non-substituted alkylene, notably a (methylene (—CH$_2$—)), and the compound having chemical formula (I) or (II) can have a chemical formula ($I_b$), and ($II_b$):

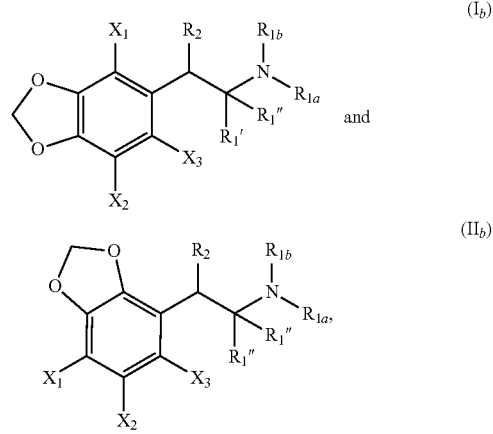

respectively. It is noted that the heterocyclic ring in formula ($I_b$) and ($II_b$) may be referred to as a dioxolane ring.

In an example embodiment, $X_4$ can be a non-substituted alkylene, notably a (ethylene (—CH$_2$CH$_2$—)), and the compound having chemical formula (I) or (II) can have a chemical formula ($I_c$), and ($II_c$):

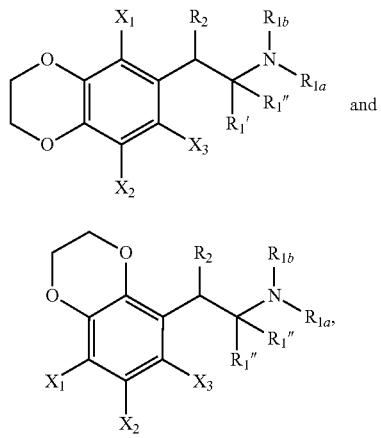

respectively. It is noted that the heterocyclic ring in formula ($I_c$) and ($II_c$) may be referred to as a dioxane ring.

As herein before noted, the current disclosure includes, in an aspect, in particular, mescaline derivatives including a substituted ethylamine chain, notably in example embodiments, an ethylamine chain possessing a substituted $C_1$ and/or a substituted $C_2$ carbon atom (—$CHR_2$—$CHR_1$—), wherein $R_1'$, $R_1''$ and/or $R_2$ are a substituent, i.e., at least one of $R_1'$, $R_1''$ or $R_2$ in formulas (I), ($I_a$), ($I_b$), ($I_c$), (II), ($II_a$), ($II_b$), and ($II_c$) is a substituent other than a hydrogen atom.

Next, further example embodiments of mescaline derivatives including a substituted ethylamine chain will be described with respect to example selections of $R_1'$, $R_1''$, and $R_2$ substituents that can be included in the ethylamine chain. It is noted that in particular example embodiments, $X_1$, $X_2$, $X_3$ can each be selected to be H, as herein illustrated by example compounds A(I)-G(V). These example embodiments, are in particular, however without limitation, intended to be included in conjunction with the hereinafter described example embodiments with respect to $R_1'$, $R_1''$, and $R_2$.

Thus, for example, referring to formula (I), ($I_a$), ($I_b$), ($I_c$), (II), ($II_a$), ($II_b$), and ($II_c$), in an example embodiment, $R_1'$ and $R_1''$ can be selected (independently from $R_2$, except, however, that $R_1'$, $R_1''$ and $R_2$ are not selected to each simultaneously be a hydrogen atom) from a hydrogen atom, or an alkyl group, wherein one of $R_1'$ and $R_1''$ is a hydrogen atom or $R_1'$ and $R_1''$ can be joined together to form an oxo group (C=O) or a cycloalkyl group. The alkyl group can be, for example, a ($C_1$-$C_6$)-alkyl group, ($C_1$-$C_3$)-alkyl group, an ethyl group (—$CH_2$—$CH_3$), or a methyl group (—$CH_3$). The cyclo-alkyl group can be a ($C_3$-$C_{20}$) cyclo-alkyl group, including, for example, a cyclo-propyl group, a cyclo-butyl group, a cyclo-pentyl group, or a cyclo-hexyl group.

Continuing to refer to formula (I), ($I_a$), ($I_b$), ($I_c$), (II), ($II_a$), ($II_b$), and ($II_c$), in an example embodiment, $R_2$ can be selected (independently from $R_1'$ and $R_1''$, except, however, that $R_1'$, $R_1''$ and $R_2$ are not selected to each simultaneously be a hydrogen atom) from an alkyl group, O-alkyl group, hydroxy group, or a hydrogen atom. The alkyl group can be, for example, a ($C_1$-$C_6$)-alkyl group, ($C_1$-$C_3$)-alkyl group, an ethyl group (—$CH_2$—$CH_3$), or a methyl group (—$CH_3$). The O-alkyl group can be, for example, a ($C_1$-$C_6$)—O-alkyl group, ($C_1$-$C_3$)—O-alkyl group, an ethoxy group (—O—$CH_2$—$CH_3$), or a methoxy group.

Thus, it will be clear, that in formula (I), ($I_a$), ($I_b$), ($I_c$), (II), ($II_a$), ($II_b$), and ($II_c$), at least one of $R_1'$, $R_1''$ and $R_2$ is a substituent other than a hydrogen atom.

Continuing to refer to formula (I), ($I_a$), ($I_b$), ($I_c$), (II), ($II_a$), ($II_b$), and ($II_c$), in another embodiment, $R_1''$ can be joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring. Furthermore, when the heterocyclic ring is unsaturated, $R_{1a}$ can be optionally absent.

Thus, continuing to refer to formula (I), ($I_a$) ($I_b$), ($I_c$), (II), ($II_a$), ($II_b$), and ($II_c$), for example, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, for example, a 5-membered or 6-membered heterocyclic ring, wherein the heterocyclic ring, in addition to the nitrogen atom, includes an oxygen atom, and $R_2$ can be an alkyl group, for example, $R_2$ can be a ($C_1$-$C_6$)-alkyl group, a ($C_1$-$C_3$)-alkyl group, a methyl group (—$CH_3$), or an ethyl group (—$CH_2$—$CH_3$) group, or a hydrogen atom. When the heterocyclic ring is unsaturated, including, in particular, when the nitrogen atom in the heterocyclic ring is participating in the formation of a double bond, $R_{1a}$ can be optionally absent.

Continuing to refer to formula (I), ($I_a$), ($I_b$), ($I_c$), (II), ($II_a$), ($II_b$), and ($II_c$), in a further example embodiment, $R_1''$ can be joined together with $R_{1b}$, together with the nitrogen atom to which $R_{1b}$ is attached, and the carbon atom to which $R_1''$ is attached, to form an optionally substituted saturated or unsaturated 3-10 membered heterocyclic ring, for example, a 5-membered or 6-membered heterocyclic ring, wherein the heterocyclic ring, in addition to the nitrogen atom, includes an oxygen atom, and is substituted with at least one, or at least two ($C_1$-$C_6$) alkyl groups, for example independently methyl or ethyl groups, and $R_2$ can be an alkyl group, for example, ($C_1$-$C_6$)-alkyl group, a ($C_1$-$C_3$)-alkyl group, a methyl group (—$CH_3$), or an ethyl group (—$CH_2$—$CH_3$) group, or a hydrogen atom. When the heterocyclic ring is unsaturated, including, in particular, when the nitrogen atom in the heterocyclic ring is participating in the formation of a double bond, $R_{1a}$ can be optionally absent.

Next substituents $R_{1a}$ and $R_{1b}$ will be further discussed. Referring again to formula (I), ($I_a$) ($I_b$), (II), ($II_a$), and ($II_b$), in an example embodiment, $R_{1a}$ and $R_{1b}$ can each be a hydrogen atom.

Continuing to refer to formula (I), ($I_a$), ($I_b$), ($I_c$), (II), ($II_a$), ($II_b$), and ($II_c$), in an example embodiment, $R_{1a}$ can be a hydrogen atom and $R_{1b}$ can be a ($C_1$-$C_6$)-alkyl group.

Continuing to refer to formula (I), ($I_a$), ($I_b$), ($I_c$), (II), ($II_a$), ($II_b$), and ($II_c$), in an example embodiment, $R_{1a}$ and $R_{1b}$ can each be a ($C_1$-$C_6$)-alkyl group or a ($C_1$-$C_3$)-alkyl group.

Continuing to refer to formula (I), ($I_a$), ($I_b$), ($I_c$), (II), ($II_a$), ($II_b$), and ($II_c$), in an example embodiment, $R_{1a}$ can be a hydrogen atom and $R_{1b}$ can be a hydroxylalkyl group, for example a hydroxyl-($C_1$-$C_6$)-alkyl group, or hydroxyl-($C_1$-$C_3$)-alkyl group, or —$CH_2$—$CH_2$—$CH_2OH$, —$CH_2$—$CH_2OH$, or —$CH_2OH$, or, in other embodiments, a hydroxylalkyl group having the formula:

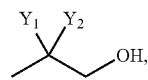

wherein $Y_1$ and $Y_2$ are each simultaneously or independently a hydrogen atom, or an alkyl group (e.g., —CH$_3$, —CH$_2$—CH$_3$, or —CH$_2$—CH$_2$—CH$_3$).

Continuing to refer to formula (I), (I$_a$), (I$_b$), (I$_c$), (II), (II$_a$), (II$_b$), and (II$_c$), in an example embodiment, R$_{1a}$ can be a hydrogen atom and R$_{1b}$ can be an alkyl-aryl group, including a (C$_1$-C$_6$)-alkyl-aryl group, such as a (C$_1$-C$_6$)-alkyl-phenyl group (e.g., —CH$_2$-phenyl), or (C$_1$-C$_3$)-alkyl-aryl group, such as a (C$_1$-C$_3$)-alkyl-phenyl group.

Continuing to refer to formula (I), (I$_a$), (I$_b$), (I$_c$), (II), (II$_a$), (II$_b$), and (II$_c$), in an example embodiment, R$_{1a}$ and R$_{1b}$ can be joined together, along with the nitrogen atom to which they are attached, to form a 3-10-membered optionally substituted heterocyclic ring, wherein the heterocyclic ring further includes an oxygen atom.

Continuing to refer to formula (I), (I$_a$), (I$_b$), (I$_c$), (II), (II$_a$), (II$_b$), and (II$_c$), in an example embodiment, R$_{1a}$ and R$_{1b}$ can be joined together, along with the nitrogen atom to which they are attached, to form a 3-10-membered, for example, a 5-membered or a 6-membered, optionally substituted heterocyclic ring, wherein the heterocyclic ring further includes an oxygen atom, and wherein the heterocyclic ring is further substituted with at least one (C$_1$-C$_6$)-alkyl group, for example, at least one methyl group, or at least two methyl groups, wherein the (C$_1$-C$_6$)-alkyl group may be two substituents on a single (i.e., the same) heterocyclic carbon atom, or two or more substituents on two or more different heterocyclic carbon atoms.

In further embodiments, —NR$_{1a}$R$_{1b}$ can be a nitro group.

In further embodiments, —NR$_{1a}$R$_{1b}$ in the compound of formula (I), (I$_a$), (I$_b$), (I$_c$), (II), (II$_a$), (II$_b$), and (II$_c$), can be protonated to form (—N$^+$HR$_{1a}$R$_{1b}$), except, however, when NR$_{1a}$R$_{1b}$ is a nitro group, and chemical formula (I), (I$_a$), (I$_b$), (I$_c$), (II), (II$_a$), (II$_b$), and (II$_c$) further include a negatively charged anion balancing the positively charged nitrogen atom, for example a sulfate ion (SO$_4^{2-}$), a nitrate ion (NO$_3^-$), or a chlorine ion (Cl$^-$).

Next, in order to further exemplify the mescaline derivative compounds that are provided in accordance with the present disclosure, example compounds in accordance with formula (I) and (II) are provided. These include compounds having the chemical formula: (A$_x$); (A$_y$); (A$_z$); (B$_x$); (B$_y$); (B$_z$); (C); (D); (E); (F); and (G):

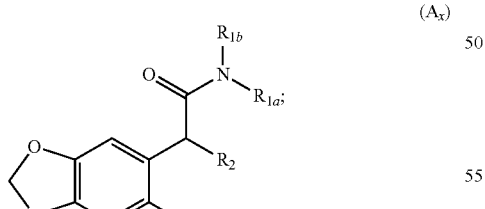
(A$_x$)

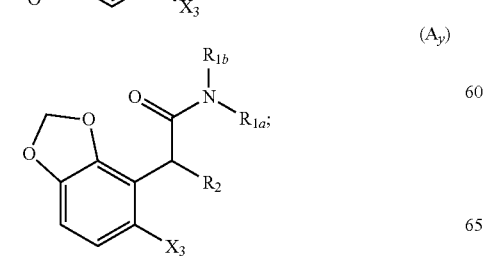
(A$_y$)

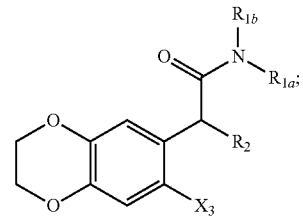
(A$_z$)

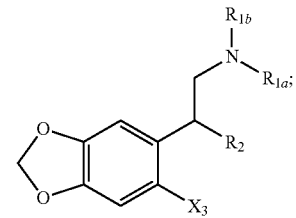
(B$_x$)

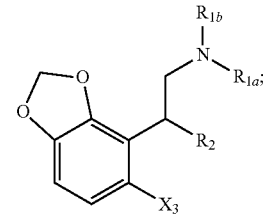
(B$_y$)

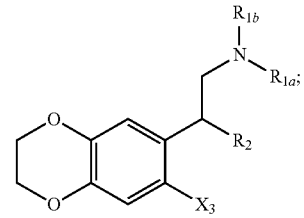
(B$_z$)

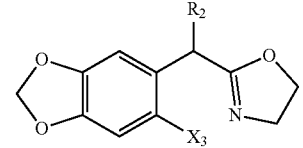
(C)

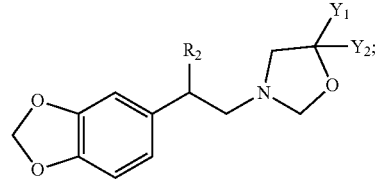
(D)

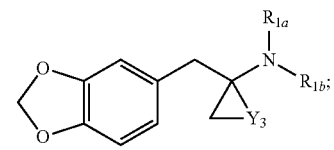
(E)

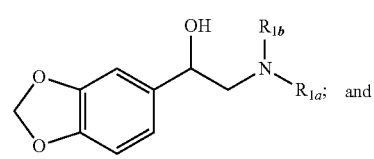
(F)

and

-continued (G)
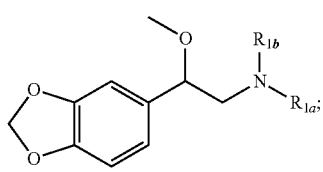

wherein
  X$_3$ is a methoxy group (—OCH$_3$), bromine (Br), or a hydrogen atom;
  R$_2$ is a hydrogen atom, a methyl group, or an ethyl group, provided that in chemical formula (A) and (B) R$_2$ is a methyl or ethyl group;
  R$_{1a}$ and R$_{1b}$ are each independently or both simultaneously selected from a methyl group, an ethyl group, a CH$_2$CH$_2$OH group, a CH$_2$-phenyl group, or a hydrogen atom, or R$_{1a}$ and R$_{1b}$ are joined together, along with the nitrogen atom to which they are attached, to form a 5-membered heterocyclic ring;
  Y$_1$ and Y$_2$ are each independently or simultaneously a hydrogen atom or a methyl group; and
  Y$_3$ is methylene, ethylene, propylene, or butylene.

Thus, the present disclosure provides, in one aspect, example compounds A$_x$(I); A$_x$(II); A$_x$(III); A$_x$(IV); A$_x$(V); A$_x$(VI); A$_x$(VII); A$_x$(VIII); A$_x$(IX); A$_y$(X); and A$_z$(XI):

A$_x$(I)
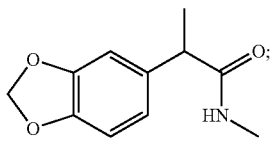

A$_x$(II)
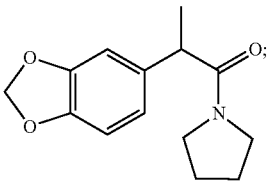

A$_x$(III)
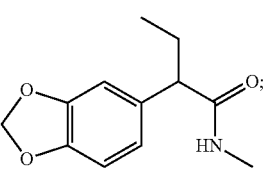

A$_x$(IV)
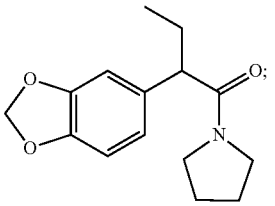

A$_x$(V)
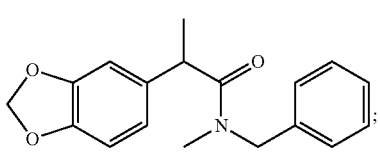

A$_x$(VI)
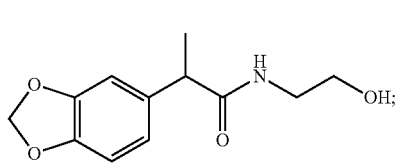

A$_x$(VII)
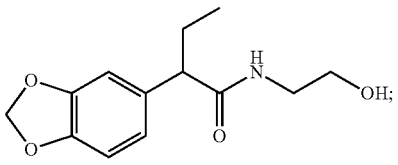

A$_x$(VIII)
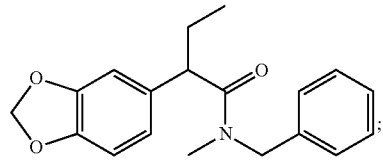

A$_x$(IX)
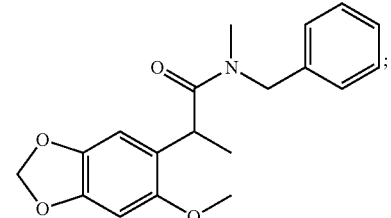

A$_y$(X)
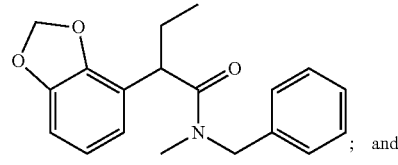
; and

A$_z$(XI)
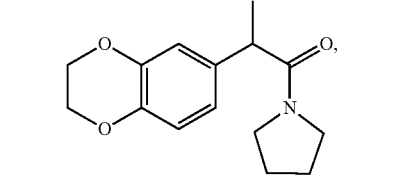

wherein in each of compound A$_x$(I) to A$_z$(XI), optionally, the nitrogen atom of the ethylamine portion is protonated and A$_x$(I) to A$_z$(XI) includes a negatively charged anion balancing the positively charged nitrogen atom.

In another aspect, the present disclosure provides example compounds B$_x$(I); B$_x$(II); B$_x$(III); B$_x$(IV); B$_x$(V); B$_x$(VI); B$_x$(VII); B$_x$(VIII); B$_y$(IX); and B$_z$(X):

B$_x$(I)
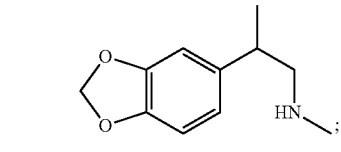

wherein in each of compound B$_x$(I) to B$_z$(X), optionally, the nitrogen atom of the ethylamine portion is protonated and B$_x$(I) to B$_z$(X) includes a negatively charged anion balancing the positively charged nitrogen atom.

In another aspect, the present disclosure provides example compounds C(I); C(II); C(III); and C(IV):

wherein in each of compound C(I) to C(IV), optionally, the nitrogen atom of the ethylamine portion is protonated and C(I) to C(IV) includes a negatively charged anion balancing the positively charged nitrogen atom.

In another aspect, the present disclosure provides example compounds D(I); D(II); D(III); and D(IV):

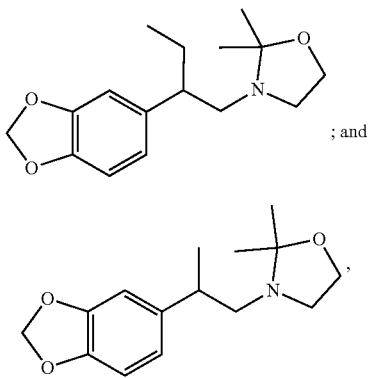

D(III)

D(IV)

wherein in each of compound D(I) to D(IV), optionally, the nitrogen atom of the ethylamine portion is protonated and D(I) to D(IV) includes a negatively charged anion balancing the positively charged nitrogen atom.

In another aspect, the present disclosure provides example compounds E(I)-E(X):

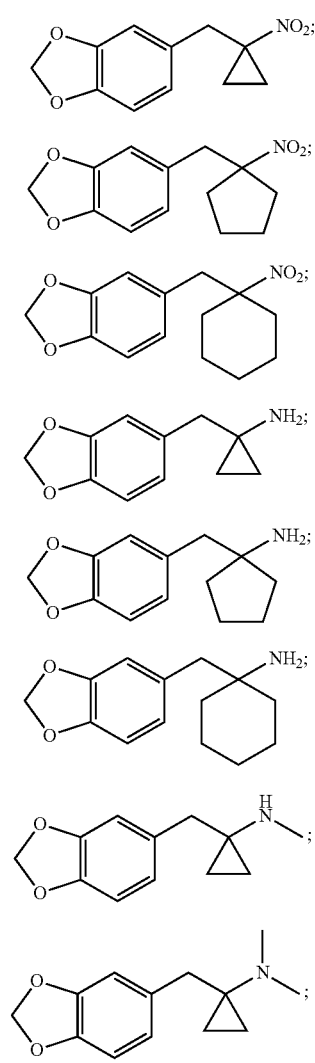

E(I)

E(II)

E(III)

E(IV)

E(V)

E(VI)

E(VII)

E(VIII)

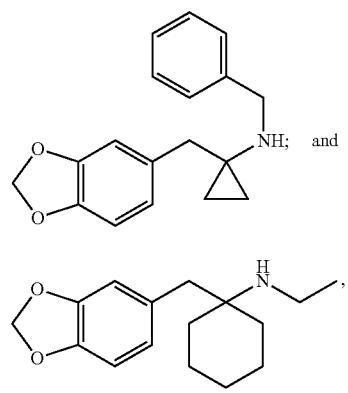

E(IX)

E(X)

wherein in each of compound E(IV) to E(X), optionally, the nitrogen atom of the ethylamine portion is protonated and E(IV) to E(X) includes a negatively charged anion balancing the positively charged nitrogen atom.

In another aspect, the present disclosure provides example compounds F(I); F(II); F(III); F(IV); F(V); and F(VI):

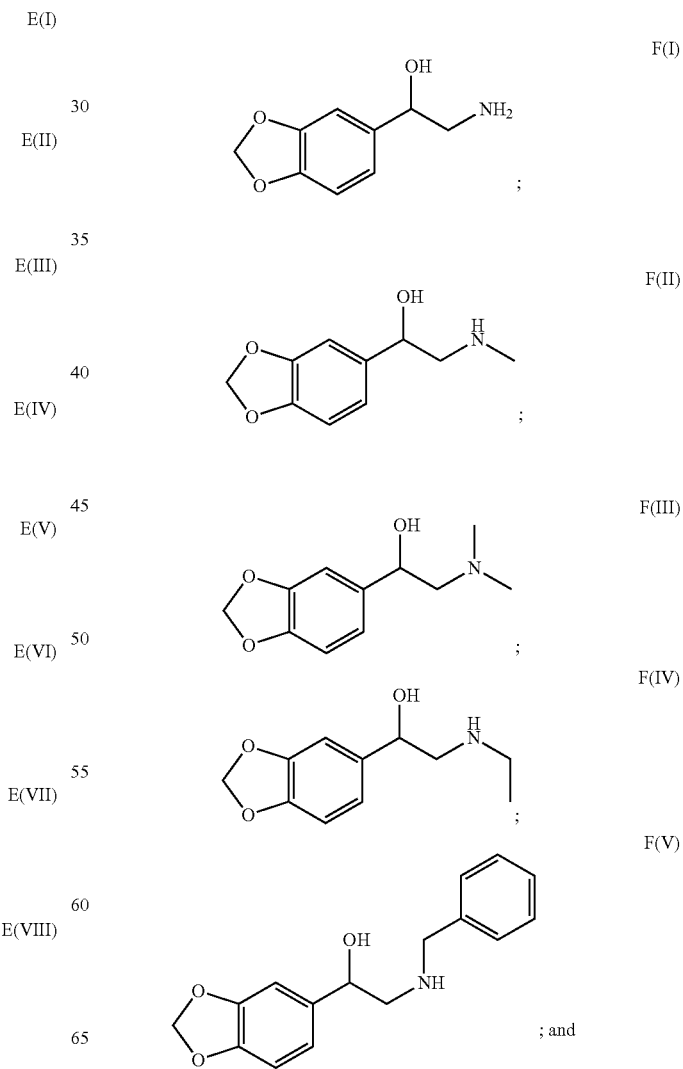

F(I)

F(II)

F(III)

F(IV)

F(V)

F(VI)

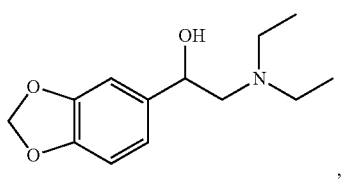

, wherein in each of compound F(I) to F(VI), optionally, the nitrogen atom of the ethylamine portion is protonated and F(I) to F(VI) includes a negatively charged anion balancing the positively charged nitrogen atom.

In another aspect, the present disclosure provides example compounds G(I)-G(V):

G(I)

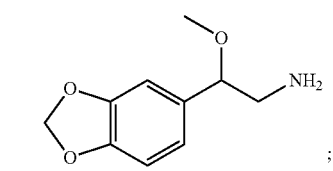

;

G(II)

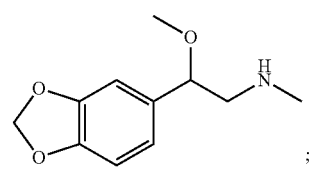

;

G(III)

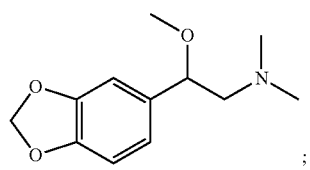

;

G(IV)

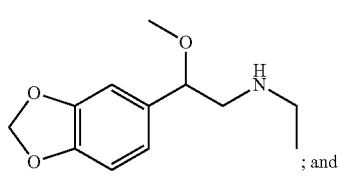

; and

G(V)

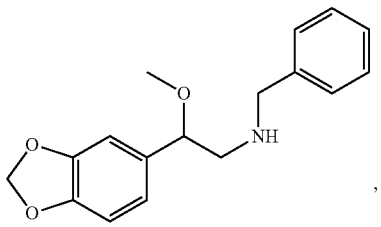

, wherein in each of compound G(I) to G(V), optionally, the nitrogen atom of the ethylamine portion is protonated and G(I) to G(V) includes a negatively charged anion balancing the positively charged nitrogen atom.

Negatively charged anions in each of the foregoing include, for example, a chloride ion, or sulfate ion.

In one embodiment, the compound can be a stereoisomeric compound corresponding with a chemical compound having formula $A_x(I)$-$A_z(XI)$, $B_x(I)$-$B_z(X)$, C(I), C(II), D(I)-D(IV), F(I)-F(VI), or G(I)-G(V), wherein the $C_2$ atom of the N-ethylamine portion of the chemical compound is a chiral carbon atom. Thus, for example, in one embodiment, the stereoisomeric compound can be selected from the compounds having the formula $A_x(II_a)$ or $A_x(II_b)$; $A_x(V_a)$ or $A_x(V_b)$; $B_x(II_a)$ or $B_x(II_b)$; or $B_x(V_a)$ or $B_x(V_b)$:

$A_x(II_a)$

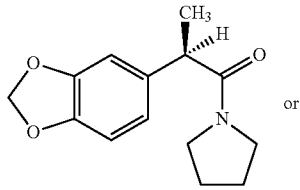

or $A_x(II_b)$

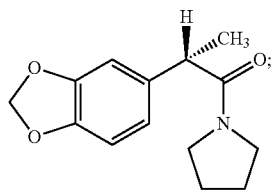

;

$A_x(V_a)$

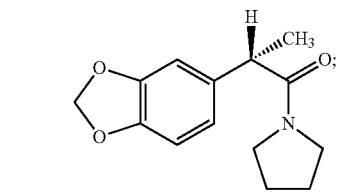

or $A_x(V_b)$

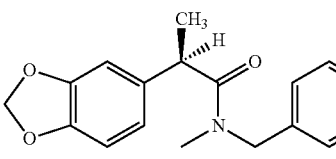

;

$B_x(II_a)$

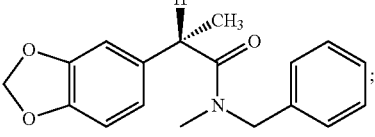

or $B_x(II_b)$

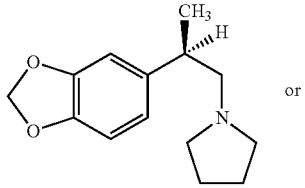

; or $B_x(V_a)$

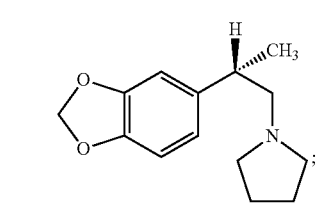

; or $B_x(V_b)$

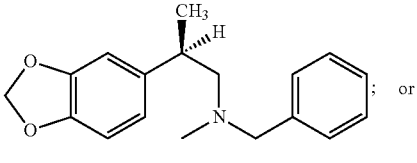

.

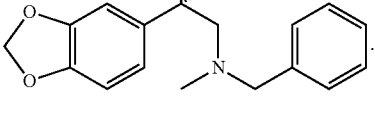

It will be understood, that similarly, stereoisomeric compounds corresponding with a chemical compound having formula $A_x(I)$, $A_x(III)$, $A_x(IV)$, $A_x(VI)$-$A_z(XI)$, $B_x(I)$, $B_x(III)$, $B_x(IV)$, $B_x(VI)$-$B_z(X)$, $C(I)$, $C(II)$, $D(I)$-$D(IV)$, $F(I)$-$F(VI)$, and $G(I)$-$G(V)$ wherein the $C_2$ atom of the N-ethylamine portion of the chemical compound is a chiral carbon atom, can be selected and are included herein.

In one embodiment, the compound can be included in a mixture of a pair of stereoisomeric compounds, the mixture comprising a pair of stereoisomeric compounds. The mixture can have varying relative molar quantities of a first and corresponding second counterpart stereoisomeric compound (e.g., $A_x(II_a)$ and $A_x(II_b)$; $A_x(V_a)$ and $A_x(V_b)$; $B_x(II_a)$ and $B_x(II_b)$; $B_x(V_a)$ and $B_x(V_b)$ etc.), for example, at least 10% (mole/mole) of a first stereoisomeric compound and 90% (mole/mole) of a second corresponding counterpart stereoisomeric compound, or 20% (mole/mole) of a first stereoisomeric compound and 80% (mole/mole) of a second corresponding counterpart stereoisomeric compound, or 30% (mole/mole) of a first stereoisomeric compound and 70% (mole/mole) of a second counterpart corresponding stereoisomeric compound, or 40% (mole/mole) of a first stereoisomeric compound and 60% (mole/mole) of a second counterpart corresponding stereoisomeric compound, or equimolar or approximately equimolar amounts of a first and of a second corresponding counterpart stereoisomeric compound.

Further included herein are the compounds of formula (I) or (II) in all their isolated or purified forms. For example, the compounds of formula (I) or (II) are intended to encompass all forms of the compounds, such as, any salts, solvates, hydrates, and stereoisomers.

Thus, to briefly summarize, in an aspect, the present disclosure provides novel chemical compounds which are derivatives of mescaline, fused mescaline derivatives, including in an example embodiment, fused dioxolane mescaline derivatives. The novel chemical compounds have chemical formula (I) or (II):

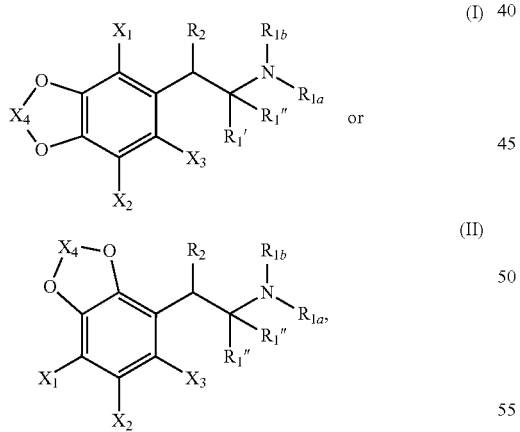

wherein, in chemical formula (I) or (II):
$X_1$, $X_2$, and $X_3$ are independently selected from a hydrogen atom, O-alkyl, acyl, N-(alkyl)$_2$, N-(alkyl)(H), OH, a halogen, or $NH_2$;
$X_4$ is an alkylene group or substituted alkylene group;
$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and
$R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring or $NR_{1a}R_{1b}$ is a nitro group;
and
when $R_1'$ and $R_1''$ are joined to form an oxo group, $R_2$ is an alkyl group, O-alkyl group, or hydroxy group.

The fused mescaline derivatives of the present disclosure may be used to prepare a pharmaceutical or recreational drug formulation. Thus, in one embodiment, the present disclosure further provides in another aspect, pharmaceutical and recreational drug formulations comprising fused mescaline derivatives. Accordingly, in one aspect, the present disclosure provides in a further embodiment a pharmaceutical or recreational drug formulation comprising a chemical compound a chemical compound selected from a first chemical compound having chemical formula (I), and (II):

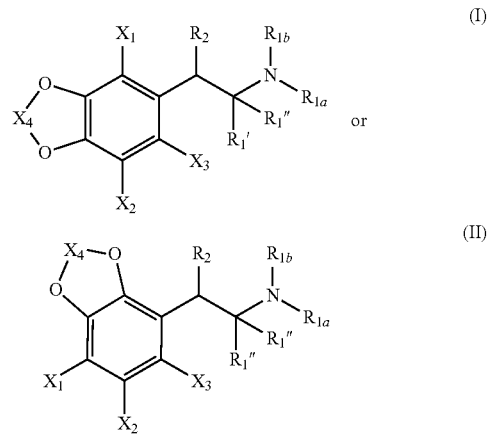

or a pharmaceutically acceptable salt or solvate thereof,
wherein, in chemical formula (I) or (II):
$X_1$, $X_2$, and $X_3$ are independently selected from a hydrogen atom, O-alkyl, acyl, N-(alkyl)$_2$, N-(alkyl)(H), OH, a halogen, or $NH_2$;
$X_4$ is an alkylene group or substituted alkylene group;
$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and $R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring or $NR_{1a}R_{1b}$ is a nitro group;

and when $R_1'$ and $R_1''$ are joined to form an oxo group, $R_2$ is an alkyl group, O-alkyl group, or hydroxy group, together with a diluent, carrier, or excipient.

The pharmaceutical or recreational drug formulations may be prepared as liquids, tablets, capsules, microcapsules, nanocapsules, trans-dermal patches, gels, foams, oils, aerosols, nanoparticulates, powders, creams, emulsions, micellar systems, films, sprays, ovules, infusions, teas, decoctions, suppositories, etc. and include a pharmaceutically acceptable salt or solvate of the fused mescaline derivative compound together with an excipient. The term "excipient" as used herein means any ingredient other than the chemical compound of the disclosure. As will readily be appreciated by those of skill in art, the selection of excipient may depend on factors such as the particular mode of administration, the effect of the excipient on solubility of the chemical compounds of the present disclosure and methods for their preparation will be readily apparent to those skilled in the art. Such compositions and methods for their preparation may be found, for example, in "Remington's Pharmaceutical Sciences", 22nd Edition (Pharmaceutical Press and Philadelphia College of Pharmacy at the University of the Sciences, 2012).

The pharmaceutical and drug formulations comprising the fused mescaline derivatives of the present disclosure may be administered orally. Oral administration may involve swallowing, so that the compound enters the gastrointestinal tract, or buccal or sublingual administration may be employed by which the compound enters the blood stream directly from the mouth. Formulations suitable for oral administration include both solid and liquid formulations.

Solid formulations include tablets, capsules (containing particulates, liquids, microcapsules, or powders), lozenges (including liquid-filled lozenges), chews, multi- and nano-particulates, gels, solid solutions, liposomal preparations, microencapsulated preparations, creams, films, ovules, suppositories, and sprays.

Liquid formulations include suspensions, solutions, syrups, and elixirs. Such formulations may be employed as fillers in soft or hard capsules and typically comprise a carrier, for example, water, ethanol, polyethylene glycol, propylene glycol, methylcellulose, or a suitable oil, and one or more emulsifying agents and/or suspending agents. Liquid formulations may also be prepared by the reconstitution of a solid, for example, from a sachet.

Binders are generally used to impart cohesive qualities to a tablet formulation. Suitable binders include microcrystalline cellulose, gelatin, sugars, polyethylene glycol, natural and synthetic gums, polyvinylpyrrolidone, pregelatinized starch, hydroxypropyl cellulose and hydroxypropyl methylcellulose.

Tablets may also contain diluents, such as lactose (monohydrate, spray-dried monohydrate, anhydrous and the like), mannitol, xylitol, dextrose, sucrose, sorbitol, microcrystalline cellulose, starch, and dibasic calcium phosphate dihydrate.

Tablets may also optionally comprise surface active agents, such as sodium lauryl sulfate and polysorbate 80. When present, surface active agents may comprise from 0.2% (w/w) to 5% (w/w) of the tablet.

Tablets may further contain lubricants such as magnesium stearate, calcium stearate, zinc stearate, sodium stearyl fumarate, and mixtures of magnesium stearate with sodium lauryl sulphate. Lubricants generally comprise from 0.25% (w/w) to 10% (w/w), from 0.5% (w/w) to 3% (w/w) of the tablet.

In addition to the fused heterocyclic mescaline derivative, tablets may contain a disintegrant. Examples of disintegrants include sodium starch glycolate, sodium carboxymethyl cellulose, calcium carboxymethyl cellulose, croscarmellose sodium, crospovidone, polyvinylpyrrolidone, methyl cellulose, microcrystalline cellulose, lower alkyl-substituted hydroxypropyl cellulose, starch, pregelatinized starch and sodium alginate. Generally, the disintegrant will comprise from 1% (w/w) to 25% (w/w) or from 5% (w/w) to 20% (w/w) of the dosage form.

Other possible auxiliary ingredients include antioxidants, colourants, flavouring agents, preservatives, and taste-masking agents.

For tablet dosage forms, depending on the desired effective amount of the chemical compound, the chemical compound of the present disclosure may make up from 1% (w/w) to 80% (w/w) of the dosage form, more typically from 5% (w/w) to 60% (w/w) of the dosage form.

Exemplary tablets contain up to about 80% (w/w) of the chemical compound, from about 10% (w/w) to about 90% (w/w) binder, from about 0% (w/w) to about 85% (w/w) diluent, from about 2% (w/w) to about 10% (w/w) disintegrant, and from about 0.25% (w/w) to about 10% (w/w) lubricant.

The formulation of tablets is discussed in "Pharmaceutical Dosage Forms: Tablets", Vol. 1-Vol. 3, by CRC Press (2008).

The pharmaceutical and recreational drug formulations comprising the fused heterocyclic mescaline derivatives of the present disclosure may also be administered directly into the blood stream, into muscle, or into an internal organ. Thus, the pharmaceutical and recreational drug formulations can be administered parenterally (for example, by subcutaneous, intravenous, intraarterial, intrathecal, intraventricular, intracranial, intramuscular, or intraperitoneal injection). Parenteral formulations are typically aqueous solutions which may contain excipients such as salts, carbohydrates, and buffering agents (in one embodiment, to a pH of from 3 to 9), but, for some applications, they may be more suitably formulated as a sterile non-aqueous solution or as a dried form to be used in conjunction with a suitable vehicle such as sterile water.

Formulations comprising the fused heterocyclic mescaline derivatives of the present disclosure for parenteral administration may be formulated to be immediate and/or modified release. Modified release formulations include delayed-, sustained-, pulsed-, controlled-, targeted and programmed release. Thus, the chemical compounds of the disclosure may be formulated as a solid, semi-solid, or thixotropic liquid for administration as an implanted depot providing modified release of the active compound.

Examples of such formulations include drug-coated stents and poly(dl-lactic-coglycolic)acid (PGLA) microspheres.

The pharmaceutical or recreational drug formulations of the present disclosure also may be administered topically to the skin or mucosa, i.e., dermally, or transdermally. Example pharmaceutical and recreational drug formulations for this purpose include gels, hydrogels, lotions, solutions, creams, ointments, dusting powders, cosmetics, oils, eye drops, dressings, foams, films, skin patches, wafers, implants, sponges, fibres, bandages and microemulsions. Liposomes may also be used. Example carriers include alcohol, water, mineral oil, liquid petrolatum, white petrolatum, glycerin, polyethylene glycol and propylene glycol. Penetration enhancers may be incorporated (see: for example, Finnin, B. and Morgan, T. M., 1999 J. Pharm. Sci, 88 (10), 955-958).

Other means of topical administration include delivery by electroporation, iontophoresis, phonophoresis, sonophoresis and microneedle or needle-free (e.g., Powderject™, Bioject™, etc.) injection.

Pharmaceutical and recreational drug formulations for inhalation or insufflation include solutions and suspensions in pharmaceutically acceptable, aqueous, or organic solvents, or mixtures thereof, and powders. The liquid or solid pharmaceutical compositions can contain suitable pharmaceutically acceptable excipients. In some embodiments, the pharmaceutical compositions are administered by the oral or nasal respiratory route for local or systemic effect. Pharmaceutical compositions in pharmaceutically acceptable solvents can be nebulized by use of inert gases. Nebulized solutions can be inhaled directly from the nebulizing device, or the nebulizing device can be attached to a face mask tent, or intermittent positive pressure breathing machine. Solution, suspension, or powder pharmaceutical compositions can be administered, e.g., orally, or nasally, from devices that deliver the formulation in an appropriate manner.

In further embodiments, in which the fused heterocycle mescaline compounds of present disclosure are used as a recreational drug, the compounds may be included in compositions such as a food or food product, a beverage, a food seasoning, a personal care product, such as a cosmetic, perfume or bath oil, or oils (both for topical administration as massage oil, or to be burned or aerosolized). The chemical compounds of the present disclosure may also be included in a "vape" product, which may also include other drugs, such as nicotine, and flavorings.

The pharmaceutical formulations comprising the chemical compounds of the present disclosure may be used to treat a subject, and in particular to treat a brain neurological disorder in a subject. Accordingly, the present disclosure includes in a further embodiment, a method for treating a brain neurological disorder, the method comprising administering to a subject in need thereof a pharmaceutical formulation comprising a chemical compound selected from a first chemical compound having chemical formula (I) and (II):

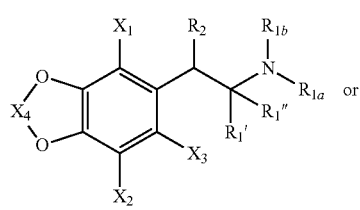

(I)

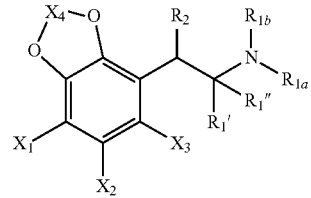

(II)

wherein, in chemical formula (I) or (II):
$X_1$, $X_2$, and $X_3$ are independently selected from a hydrogen atom, O-alkyl, acyl, N-(alkyl)$_2$, N-(alkyl)(H), OH, a halogen, or $NH_2$;
$X_4$ is an alkylene group or substituted alkylene group;
$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and
$R_2$ is an alkyl group, O-alkyl group, hydroxy group, or a hydrogen atom; and at least one of $R_1'$, $R_1''$ and $R_2$ is a substituent other than a hydrogen atom, and when $R_1''$ is not joined together with $R_{1b}$, $R_{1a}$ and $R_{1b}$ are each independently selected from an alkyl group, a hydroxylalkyl group, an optionally substituted alkyl-aryl group, or a hydrogen atom, or $R_{1a}$ and $R_{1b}$ are joined together, along with the nitrogen atom to which they are attached, to form a 3-10-membered optionally substituted heterocyclic ring or $NR_{1a}R_{1b}$ is a nitro group;
and
when $R_1'$ and $R_1''$ are joined to form an oxo group, $R_2$ is an alkyl group, O-alkyl group, or hydroxy group.

Brain neurological disorders, including psychiatric disorders, that may be treated include, for example, neurodevelopmental disorders such as intellectual disability, global development delay, communication disorders, autism spectrum disorder, and attention-deficit hyperactivity disorder (ADHD); bipolar and related disorders, such as mania, and depressive episodes; anxiety disorder, such as generalized anxiety disorder (GAD), agoraphobia, social anxiety disorder, specific phobias (natural events, medical, animal, situational, for example), panic disorder, and separation anxiety disorder; stress disorders, such as acute stress disorder, adjustment disorders, post-traumatic stress disorder (PTSD), and reactive attachment disorder; dissociative disorders, such as dissociative amnesia, dissociative identity disorder, and depersonalization/derealization disorder; somatoform disorders, such as somatic symptom disorders, illness anxiety disorder, conversion disorder, and factitious disorder; eating disorders, such as anorexia nervosa, bulimia nervosa, rumination disorder, pica, and binge-eating disorder; sleep disorders, such as narcolepsy, insomnia disorder, hypersomnolence, breathing-related sleep disorders, parasomnias, and restless legs syndrome; disruptive disorders, such as kleptomania, pyromania, intermittent explosive disorder, conduct disorder, and oppositional defiant disorder; depressive disorders, such as disruptive mood dysregulation disorder, major depressive disorder (MDD), persistent depressive disorder (dysthymia), premenstrual dysphoric disorder, substance/medication-induced depressive disorder, postpartum depression, and depressive disorder caused by another medical condition, for example, psychiatric and existential distress within life-threatening cancer situations (ACS Pharmacol. Transl. Sci. 4: 553-562; J. Psychiatr. Res. 137: 273-282); substance-related disorders, such as alcohol-related disorders, cannabis related disorders, inhalant-use related disorders, stimulant use disorders, and tobacco use disorders; neurocognitive disorders, such as delirium; schizophrenia; compulsive disorders, such as obsessive compulsive disorders (OCD), body dysmorphic disorder, hoarding disorder, trichotillomania disorder, excoriation disorder, substance/medication induced obsessive-compulsive disorder, and obsessive-compulsive disorder related to another medical condition; and personality disorders, such as antisocial personality disorder, avoidant personality disorder, borderline personality disorder, dependent personality disorder, histrionic personality disorder, narcissistic personality disorder, obsessive-compulsive personality disorder, paranoid personality disorder, schizoid personality disorder, and schizotypal personality disorder. Brain neurological disorders that may be treated further include headache disorders, including migraines, including, for example, aural migraine, non-aural migraine, menstrual migraine, chronic migraine, vestibular migraine, abdominal migraine, hemiplegic migraine, and other headache disorders.

In an aspect, the compounds of the present disclosure may be used to be contacted with a receptor to thereby modulate the receptor. Such contacting includes bringing a compound of the present disclosure and receptor together under in vitro conditions, for example, by introducing the compounds in a sample containing a receptor, for example, a sample containing purified receptors, or a sample containing cells comprising receptors. In vitro conditions further include the conditions described in Example 4 hereof. Contacting further includes bringing a compound of the present disclosure and receptor together under in vivo conditions. Such in vivo conditions include the administration to an animal or human subject, for example, of a pharmaceutically effective amount of the compound of the present disclosure, when the compound is formulated together with a pharmaceutically active carrier, diluent, or excipient, as hereinbefore described, to thereby treat the subject. Upon having contacted the receptor, the compound may activate the receptor or inhibit the receptor.

In an aspect, receptors with which the compounds of the present disclosure may be contacted include, for example, the 5-HT$_{1A}$ receptor, the 5-HT$_{2A}$ receptor, the 5-HT$_{2B}$ receptor, the 5-HT$_{2C}$ receptor, the $\alpha_{2A}$ receptor, the D$_2$ receptor, the D$_3$ receptor, or the MT$_1$ receptor.

Thus, in a further aspect, the condition that may be treated in accordance herewith can be any receptor mediated disorder, including, for example, a 5-HT$_{1A}$ receptor-mediated disorder, a 5-HT$_{2A}$ receptor-mediated disorder, a 5-HT$_{2B}$ receptor-mediated disorder, a 5-HT$_{2C}$ receptor-mediated disorder, a $\alpha_{2A}$ receptor-mediated disorder, a D$_2$ receptor-mediated disorder, a D$_3$ receptor-mediated disorder, or a MT$_1$ receptor-mediated disorder. Such disorders include, but are not limited to schizophrenia, psychotic disorder, attention deficit hyperactivity disorder, autism, and bipolar disorder.

In some embodiments, upon having contacted a receptor and a receptor, the compound may modulate the receptor. However, at the same time other receptors may not be modulated, e.g., a compound may activate or inhibit a first receptor, e.g., a 5-HT$_{1A}$ receptor, however the compound may at the same time not modulate a second receptor, e.g., a 5-HT$_{2A}$ receptor, or upon having contacted a first 5-HT$_{2A}$ receptor and a second 5-HT$_{1A}$ receptor, the compound may modulate the first 5-HT$_{2A}$ receptor, e.g., activate or inhibit the 5-HT$_{2A}$ receptor, however the compound may at the same time not modulate the second 5-HT$_{1A}$ receptor.

In one embodiment, in an aspect, upon administration the compounds of the present disclosure can interact with transmembrane transport protein in the subject to thereby modulate transmembrane transport protein and exert a pharmacological effect. Such contacting includes bringing a compound of the present disclosure transmembrane transport protein together under in vitro conditions, for example, by introducing the compounds in a sample containing a transmembrane transport protein, for example, a sample containing a purified transmembrane transport protein, or a sample containing cells comprising a transmembrane transport protein. Contacting further includes bringing a compound of the present disclosure and a transmembrane transport protein together under in vivo conditions. Such in vivo conditions include the administration to an animal or human subject, for example, of a pharmaceutically effective amount of the compound of the present disclosure, when the compound is formulated together with a pharmaceutically active carrier, diluent, or excipient, as hereinbefore described, to thereby treat the subject.

In one embodiment, in an aspect, the transmembrane transport protein can be a dopamine active transporter (DAT), a norephedrine transporter (NET), or a serotonin transporter (SERT) transmembrane transport protein.

Turning now to methods of making the fused heterocyclic mescaline derivatives of the present disclosure, it is initially noted, by way of general comment that the fused heterocyclic mescaline derivatives of the present disclosure may be prepared in any suitable manner, including by any organic chemical synthesis methods, biosynthetic methods, or a combination thereof.

Figure 3A:
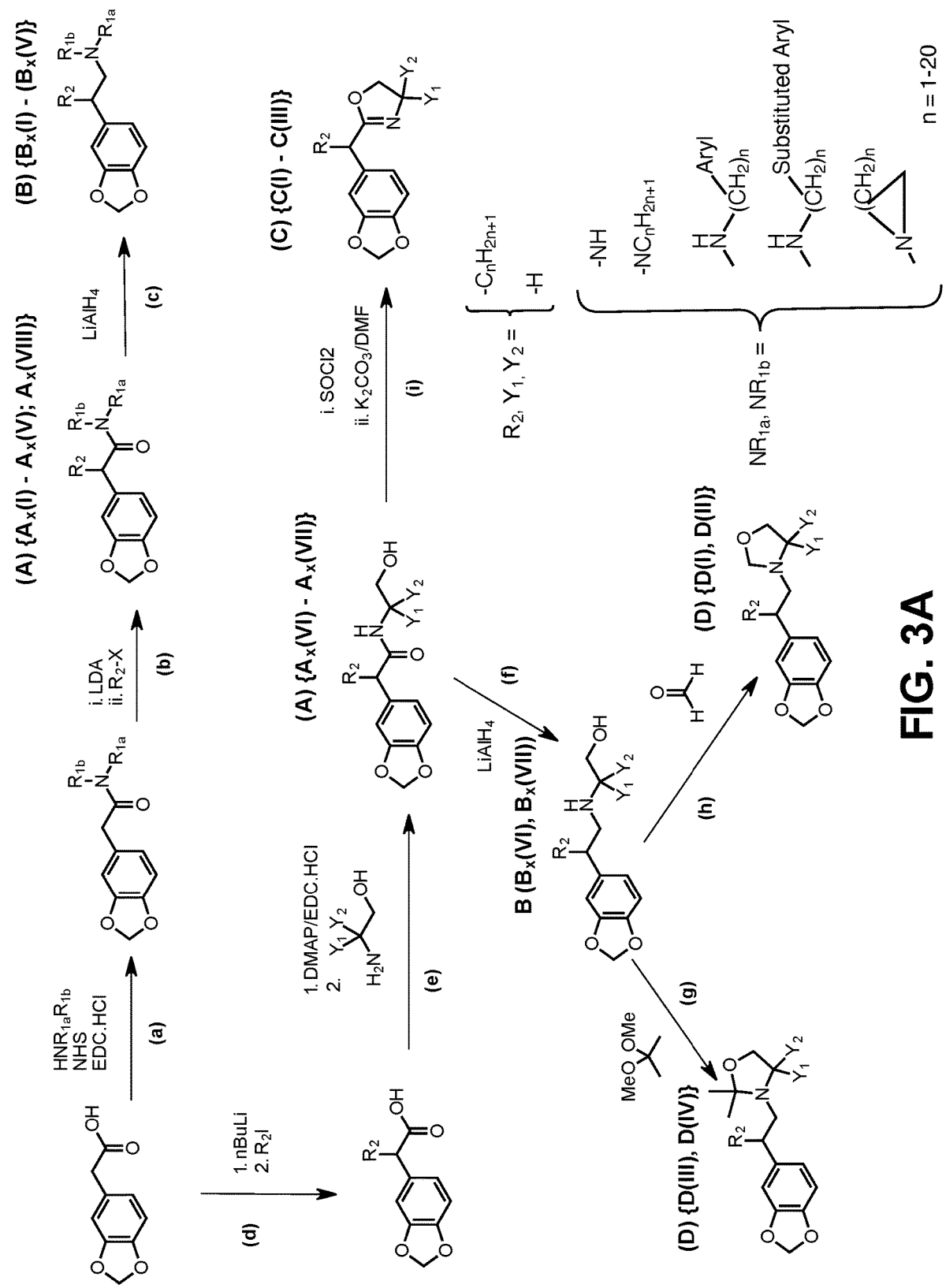
FIGS. 3A, 3B, 3C(i), 3C(ii), 3D, 3E, 3F, and 3G show example synthesis pathways and chemical reactions comprising such pathways for certain example mescaline compounds of the present disclosure, notably example mescaline derivative compounds (A) ({$A_x$}), (B) ({$B_x$}), (C), and (D) (FIG. 3A); compounds (E) (FIG. 3B); compounds (F) (FIG. 3C(i)); compounds (G) (FIGS. 3C(i) and 3C(ii)); compounds (A) ({$A_x$}) (FIG. 3D); compounds (A) ({$A_x$}); (B) ({$B_x$}) and (C) (FIG. 3E); compounds (A) ({$A_y$}) and (B) ({$B_y$}) (FIG. 3F); and compounds (A) ({$A_z$}) and (B) ({$B_z$}) (FIG. 3G). Individual chemical reactions are denoted as (a), (b), (c), (d), (e), (f), (g) (h), and (i) in FIG. 3A; (a), (b), (c), (d), and (e) in FIG. 3B; (a), (b), (c), (d), (e), (f), (g) and (h) in FIGS. 3C(i) and 3C(ii); (a), (b), (c), and (d) in FIG. 3D; (a), (b), (c), (d), (e), and (f) in FIG. 3E; (a), (b), (c), and (d) in FIG. 3F; and (a), (b), and (c) in FIG. 3G.
Figure 3B:
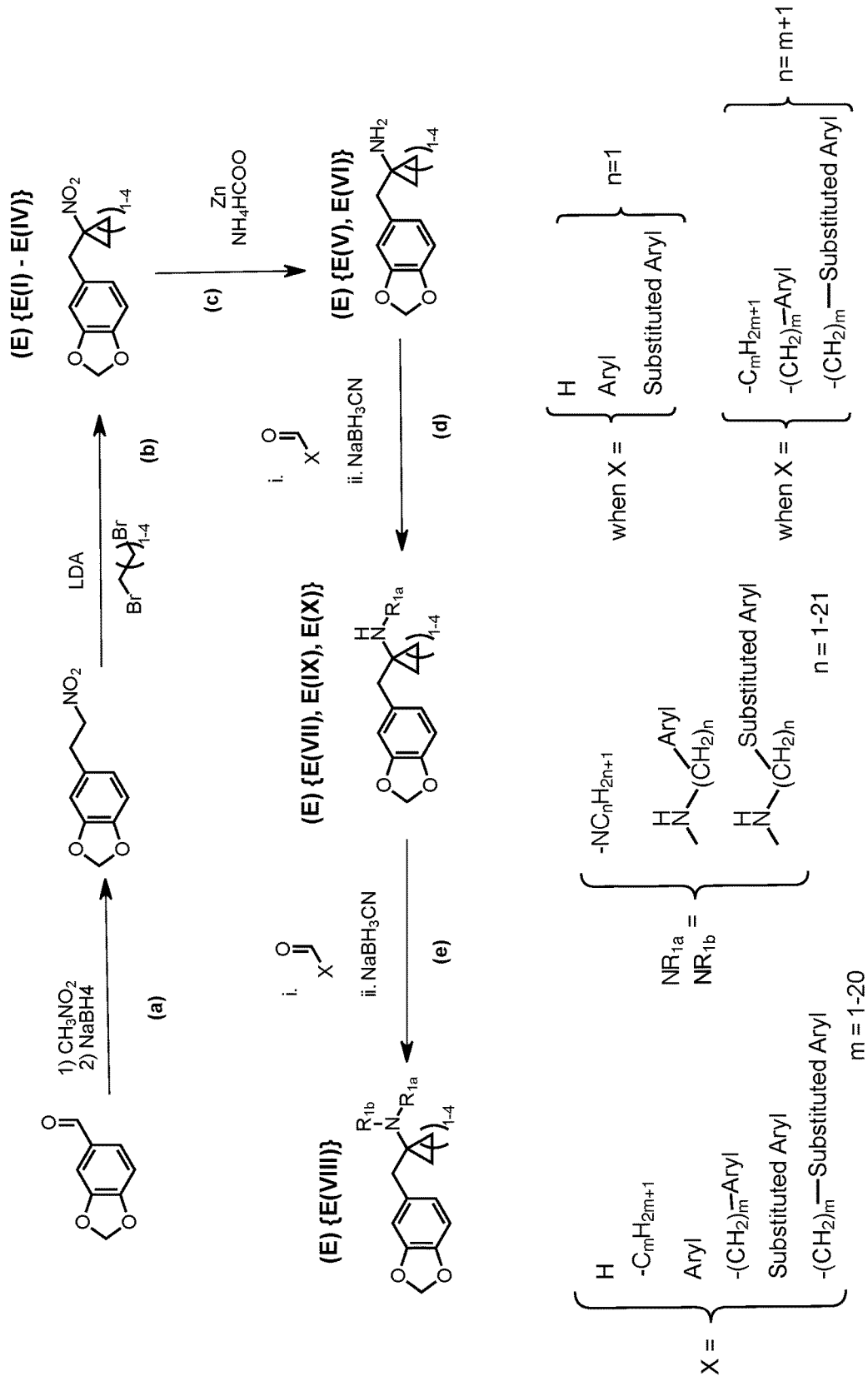
Figure 3C:
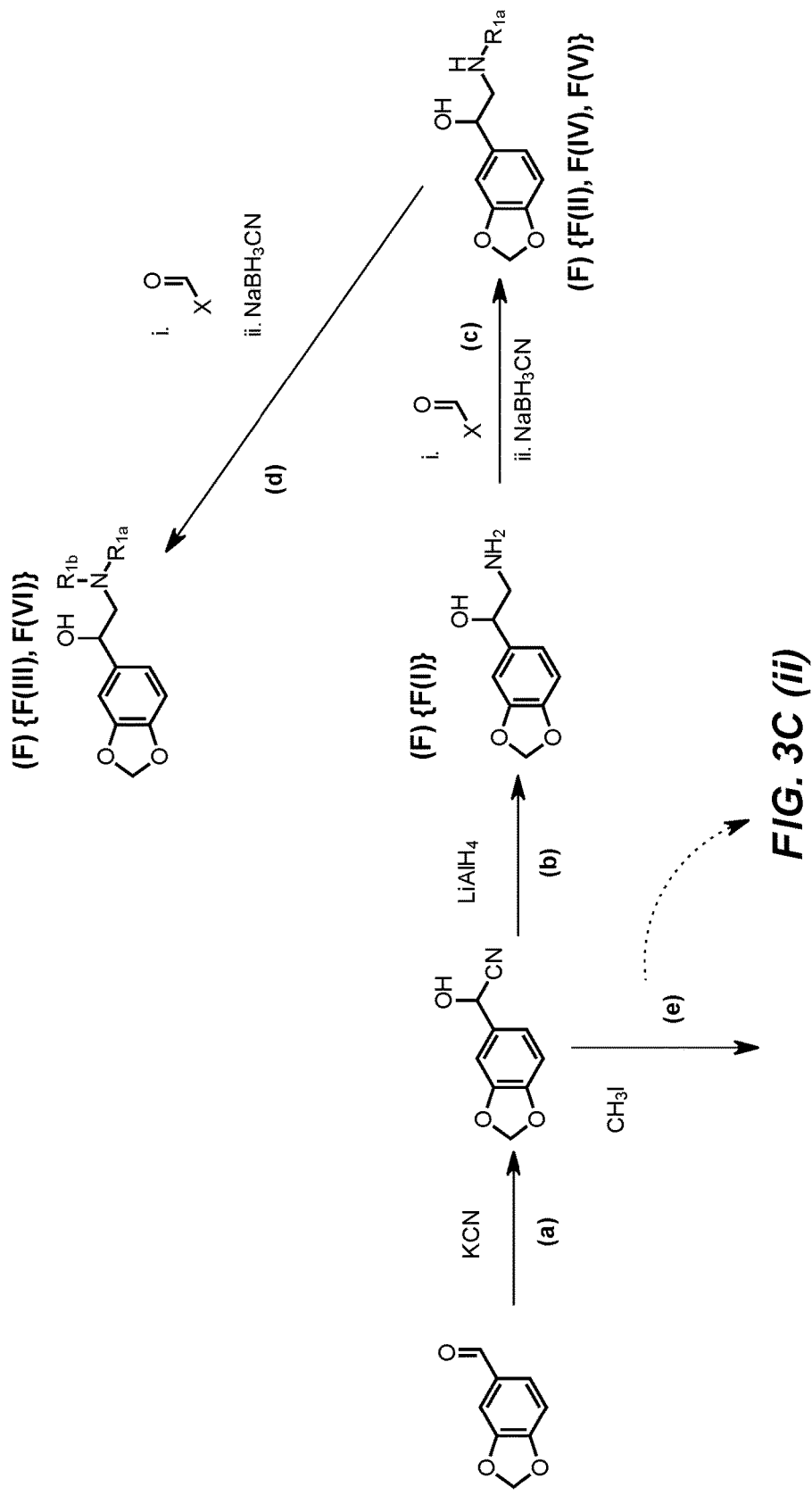
Figure 3C:
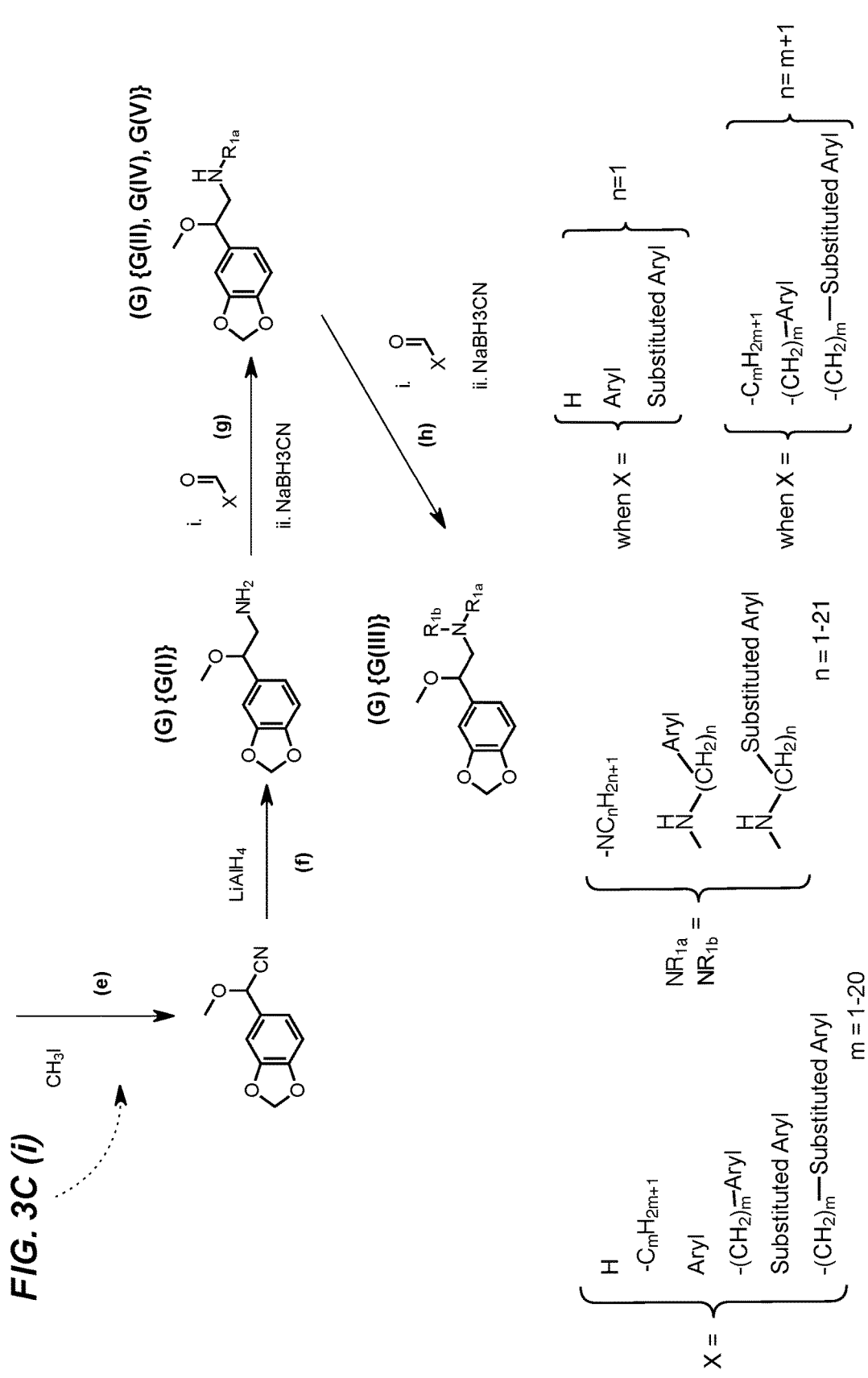

Examples of suitable chemical reactions that may be performed in accordance herewith are depicted in FIGS. 3A, 3B, 3C(i), 3C(ii), 3D, 3E, 3F, and 3G, and are further additionally detailed hereinafter in the Example section.

In general, as is known to those of skill in the art, in order to perform chemical synthetic reactions selected reactants are reacted under reaction conditions which permit the reactants to chemically react with each other and form a product, i.e., the heterocyclic mescaline derivatives of the present disclosure. Such reactions conditions may be selected, adjusted, and optimized as known by those of skill in the art. The reactions may be conducted in any suitable reaction vessel (e.g., a tube, bottle). Suitable solvents that may be used are polar solvents such as, for example, dichloromethane, dichloroethane, toluene, and so-called participating solvents such as acetonitrile and diethyl ether. Suitable temperatures may range from, for example, e.g., from about −78° C. to about 60° C. Furthermore, catalysts, also known as promoters, may be included in the reaction such as iodonium dicollidine perchlorate (IDCP), any silver or mercury salts, trimethylsilyl trifluoromethanesulfonate (TMS-triflate, TMSOTf), or trifluoronmethanesulfonic acid (triflic acid, TfOH), N-iodosuccinimide, methyl triflate. Furthermore, reaction times may be varied. As will readily be appreciated by those of skill in the art, the reaction conditions may be optimized, for example, by preparing several reactant preparations and reacting these in separate reaction vessels under different reaction conditions, for example, different temperatures, using different solvents etc., evaluating the obtained fused heterocyclic mescaline derivative reaction product, adjusting reaction conditions, and selecting a desired reaction condition. Further general guidance regarding appropriate reaction conditions for performing the reactions may be found in for example: Y. Zou et al., Eur. J. Med. Chem., 138, 199-211 (2017). K. N. Campbell et al., J. Org. Chem., 16, 1736-1740 (1951). D. Ghosh, et al., Tetrahedr. Lett., 58, 2014-2018 (2017). M. G. Cabiddu et al., Tetrahedron 59, 4383-4387 (2003).

In accordance with the foregoing, in an aspect, included herein, in accordance with at least one embodiment, is a method of making a first chemical compound having chemical formula (I), or (II):

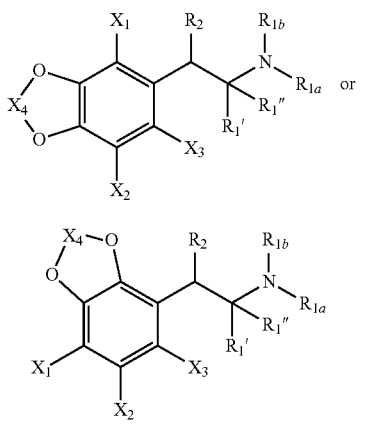

wherein, in chemical formula (I) or (II):
$X_1$, $X_2$, and $X_3$ are independently selected from a hydrogen atom, O-alkyl, acyl, N-(alkyl)$_2$, N-(alkyl)(H), OH, a halogen, or NH$_2$;
$X_4$ is an alkylene group or substituted alkylene group;
$R_1'$ and $R_1''$ are independently or simultaneously an alkyl group, or a hydrogen atom, wherein at least one of $R_1'$ and $R_1''$ is hydrogen, or $R_1'$ and $R_1''$ are joined together to form an oxo group (C=O) or a cycloalkyl group;
or $R_1''$ is joined together with $R_{1b}$, together with the carbon atom to which $R_1''$ is attached and the nitrogen atom to which $R_{1b}$ is attached, to form an optionally substituted saturated or unsaturated 3-10-membered heterocyclic ring, and when the heterocyclic ring is unsaturated, $R_1'$ and $R_{1a}$ are optionally absent; and
$R_2$ is an alkyl group, O-alkyl group, hydroxy group, or a hydrogen atom;
and at least one of $R_1'$, $R_1''$ and $R_2$ is a substituent other than a hydrogen atom,
and when $R_1''$ is not joined together with $R_{1b}$, $R_{1a}$ and $R_{1b}$ are each independently selected from an alkyl group, a hydroxylalkyl group, an optionally substituted alkyl-aryl group, a hydrogen atom, or $R_{1a}$ and $R_{1b}$ are joined together, along with the nitrogen atom to which they are attached, to form a 3-10-membered optionally substituted heterocyclic ring or $NR_{1a}R_{1b}$ is a nitro group;
and
when $R_1'$ and $R_1''$ are joined to form an oxo group, $R_2$ is an alkyl group, O-alkyl group, or hydroxy group, wherein the method involves the performance of at least one chemical synthesis reaction selected from the reactions depicted in FIGS. 3A, 3B, 3C(i), 3C(ii), 3D, 3E, 3F, and 3G.

Figure 3D:
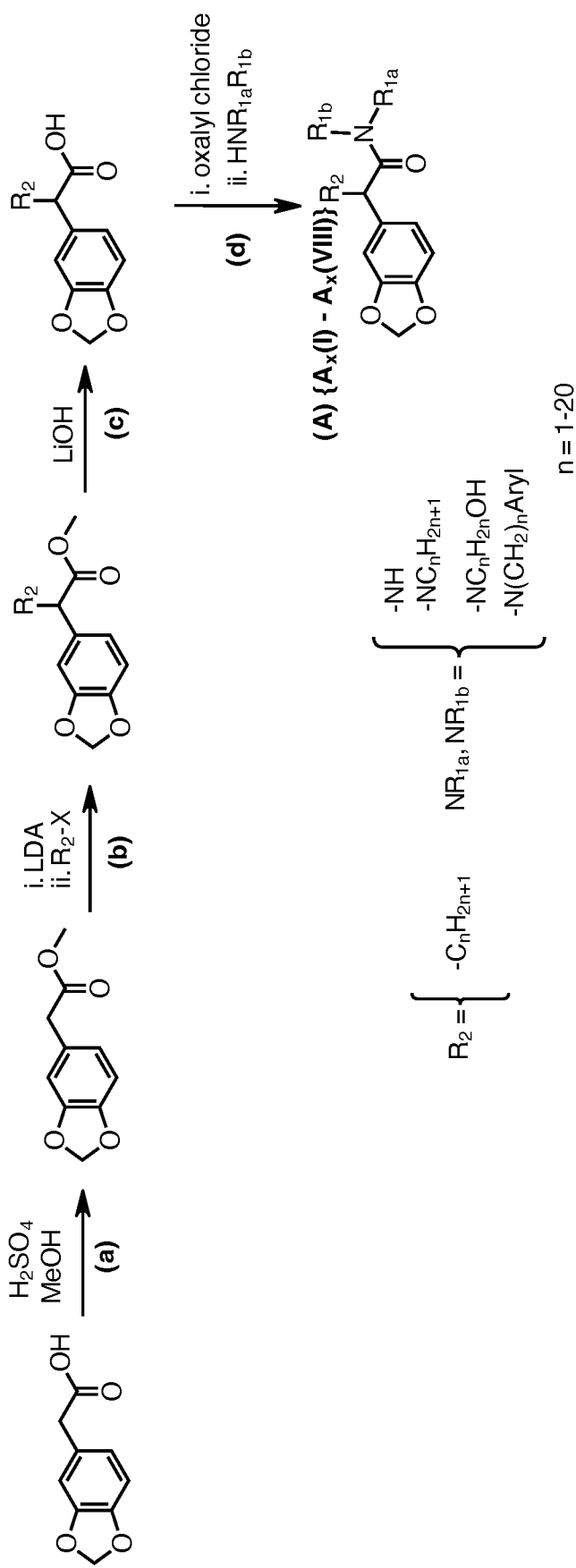
Figure 3E:
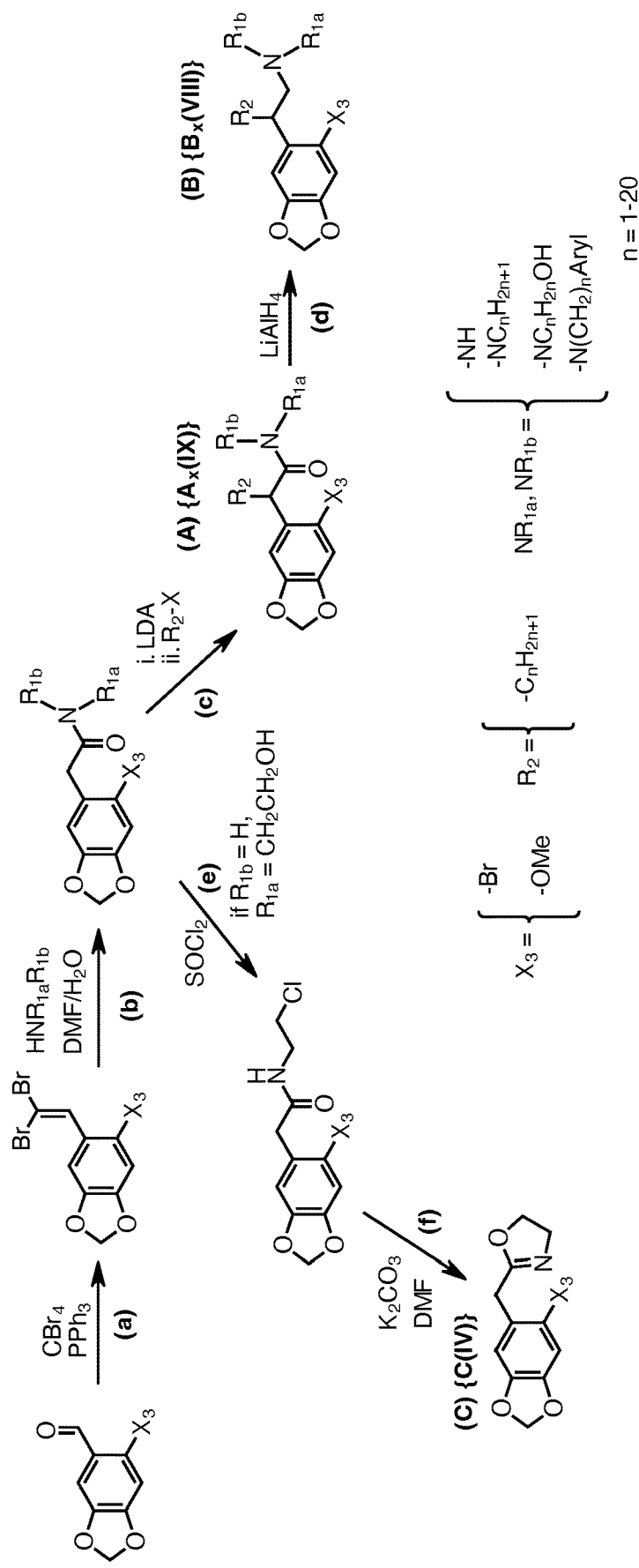

Referring to FIGS. 3A, 3D, and 3E, in one embodiment, the compound having chemical formula (I) can be a compound having formula ($A_x$):

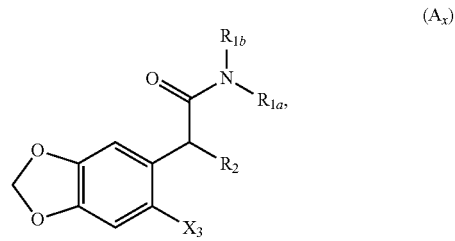

wherein $X_3$ is a hydrogen atom or a methoxy group (—OCH$_3$), wherein $R_2$ is a hydrogen atom, a methyl group, or an ethyl group, and $R_{1a}$ and $R_{1b}$ are each independently or both simultaneously selected from a methyl group, a CH$_2$CH$_2$OH group, a CH$_2$-phenyl group, or a hydrogen atom, or $R_{1a}$ and $R_{1b}$ are joined together, along with the nitrogen atom to which they are attached, to form a 5-membered heterocyclic ring,
and at least one chemical synthesis reaction is a reaction selected from (b); (a) and (b); (e); and (d) and (e), depicted in FIG. 3A, or from (d); (c) and (d); (b), (c) and (d); and (a), (b), (c), and (d), depicted in FIG. 3D or from (c); (b) and (c); and (a), (b), and (c), depicted in FIG. 3E. For example, to make the compounds having chemical formula $A_x$(I), $A_x$(II)), $A_x$(III), $A_x$(IV), $A_x$(V), or $A_x$(VIII) in FIG. 3A may be selected, or, for example, to make the compounds having chemical formula $A_x$(I), $A_x$(II)), $A_x$(III), $A_x$(IV), $A_x$(V), $A_x$(VI), $A_x$(VII), or $A_x$(VIII) chemical reactions (d); (c) and (d); (b), (c), and (d); and (a), (b), (c), and (d), depicted in FIG. 3D may be selected, or, for example, to make the compounds having chemical formula $A_x$(VI) or $A_x$(VII), chemical reactions (e); or (d) and (e) depicted in FIG. 3A may be selected, or, for example, to make the compound having chemical formula $A_x$(IX), chemical reactions (c); (b) and (c); and (a), (b), and (c), depicted in FIG. 3E may be selected.

Figure 3F:
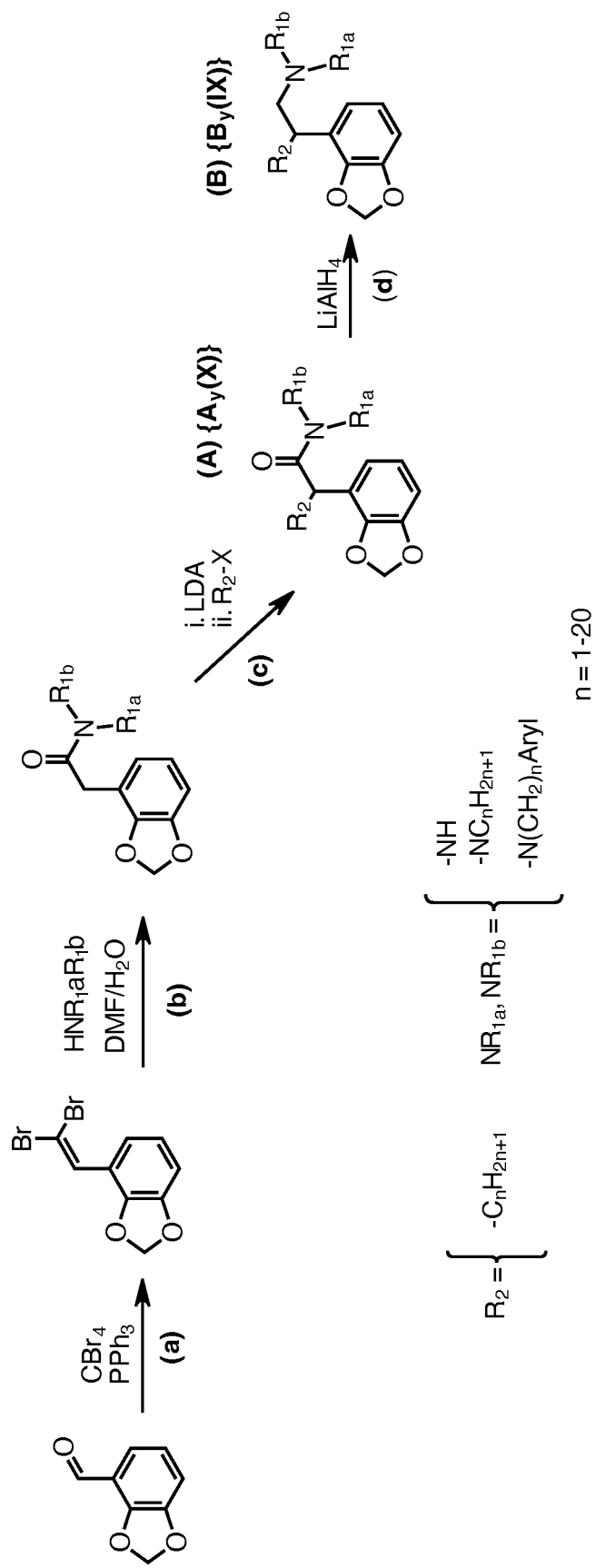

Referring to FIG. 3F, in one embodiment, the compound having chemical formula (II) can be a compound having formula ($A_y$):

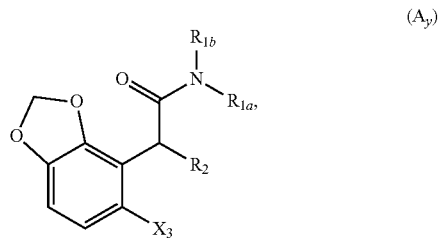

wherein $X_3$ is a hydrogen atom, wherein $R_2$ is a methyl group, and $R_{1a}$ and $R_{1b}$ are each independently or both simultaneously selected from a methyl group, a CH$_2$CH$_2$OH group, a CH$_2$-phenyl group, or a hydrogen atom, or $R_{1a}$ and $R_{1b}$ are joined together, along with the nitrogen atom to which they are attached, to form a 5-membered heterocyclic ring, and the at least one chemical synthesis reaction is a reaction selected from (c); (b) and (c); and (a), (b), and (c) depicted in FIG. 3F. For example, to make the compound having chemical formula $A_y(X)$, chemical reactions (c); (b) and (c); and (a), (b) and (c), depicted in FIG. 3F may be selected.

Figure 3G:
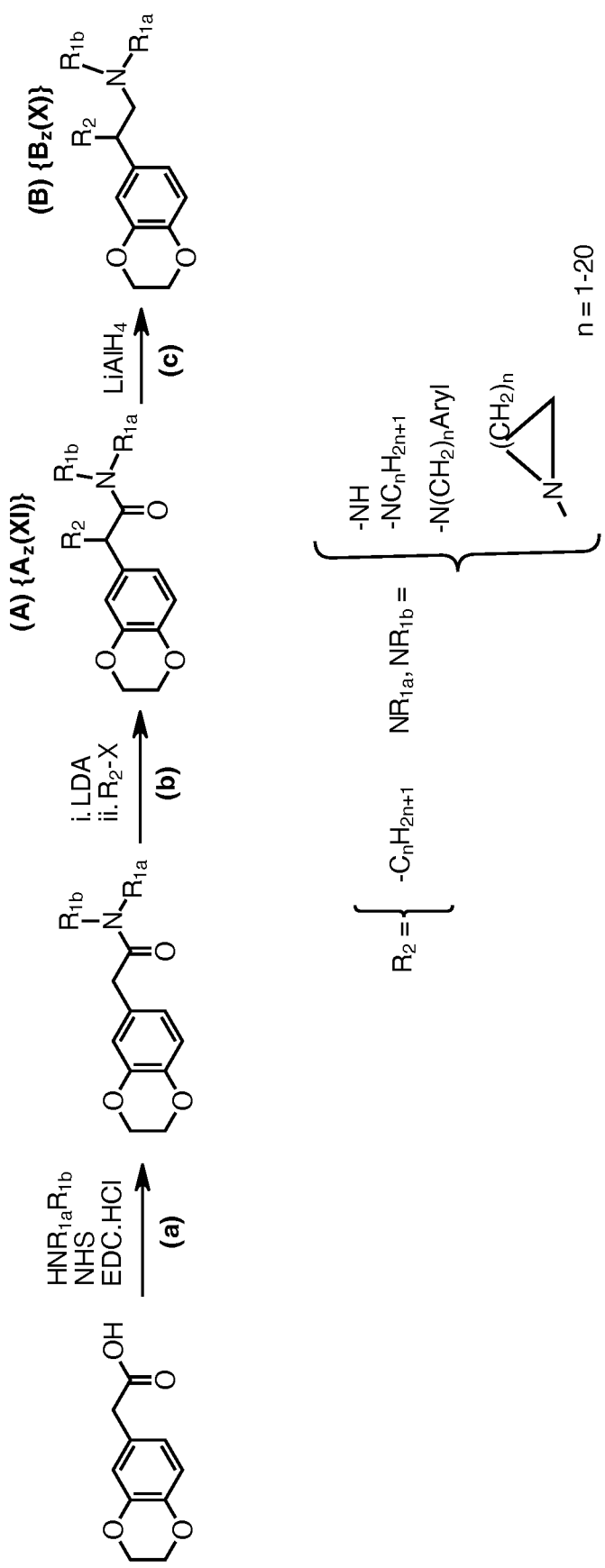

Referring to FIG. 3G, in one embodiment, the compound having chemical formula (I) can be a compound having formula ($A_z$):

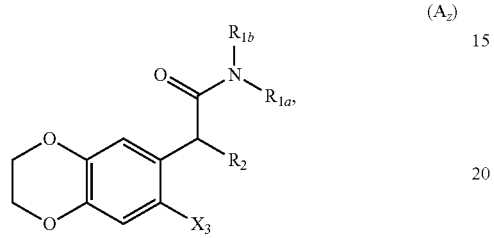

(A$_z$)

wherein $X_3$ is a hydrogen atom, wherein $R_2$ is a methyl group, and $R_{1a}$ and $R_{1b}$ are each independently or both simultaneously selected from a methyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring, and the at least one chemical synthesis reaction is a reaction selected from (b); and (a) and (b), depicted in FIG. 3G. For example, to make the compounds having chemical formula $A_z(XI)$, chemical reactions (b); and (a) and (b), depicted in FIG. 3G may be selected.

Referring again to FIGS. 3A, and 3E, in one embodiment, the compound having chemical formula (I) can be a compound having formula ($B_x$):

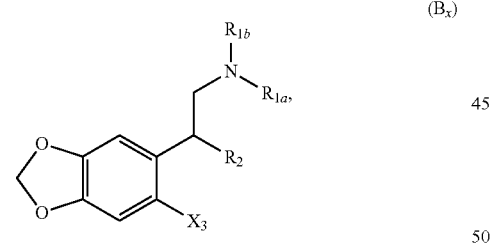

(B$_x$)

wherein $X_3$ is a hydrogen atom or a methoxy group (—OCH$_3$), wherein $R_2$ is a methyl group, or an ethyl group, and $R_{1a}$ and $R_{1b}$ each independently or both simultaneously are selected from a methyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring, and the at least one chemical synthesis reaction is a reaction selected from (c); (b) and (c); (a), (b), and (c); (f); (e) and (f); and (d), (e), and (f) depicted in FIG. 3A, or from (d); (c) and (d); (b), (c), and (d); and (a), (b), (c), and (d), depicted in FIG. 3E. For example, to make the compounds having chemical formula B(I), B(II)), B(III), B(IV), or B(V), chemical reactions (c); (b) and (c); or (a), (b), and (c) depicted in FIG. 3A may be selected, or, for example, to make the compounds having chemical formula B(VI) or B(VII), chemical reactions (f); (e) and (f); and (d), (e), and (f) depicted in FIG. 3A may be selected, or for example, to make the compound having chemical formula $B_x(VIII)$ chemical reactions (d); (c) and (d); (b), (c), and (d); and (a), (b), (c), and (d) depicted in FIG. 3E may be selected Referring again to FIG. 3F, the compound having chemical formula (II) can be a compound having formula ($B_y$):

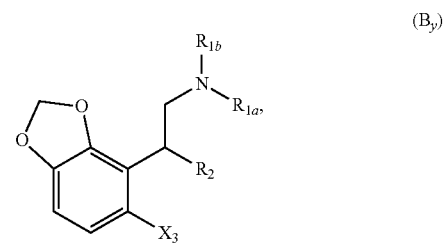

(B$_y$)

wherein $X_3$ is a hydrogen atom, wherein $R_2$ is a methyl group, and $R_{1a}$ and $R_{1b}$ are each independently or both simultaneously selected from a methyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring, and the at least one chemical synthesis reaction is a reaction selected from (d); (c) and (d); (b), (c), and (d); and (a), (b), (c), and (d) depicted in FIG. 3F. For example, to make the compounds having chemical formula $B_y(IX)$, chemical reactions (d); (c) and (d); (b), (c), and (d); and (a), (b), (c), and (d) depicted in FIG. 3F may be selected.

Referring again to FIG. 3G, in an aspect, the compound having chemical formula (I) can be a compound having formula ($B_z$):

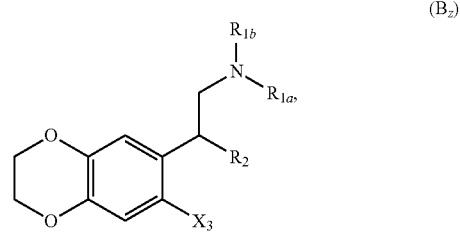

(B$_z$)

wherein $X_3$ is a hydrogen atom, wherein $R_2$ is a methyl group, and $R_{1a}$ and $R_{1b}$ are each independently or both simultaneously selected from a methyl group, a $CH_2CH_2OH$ group, a $CH_2$-phenyl group, or a hydrogen atom, or $R_{1a}$ and $R_{1b}$ are joined together, along with the nitrogen atom to which they are attached, to form a 5-membered heterocyclic ring, and the at least one chemical synthesis reaction is a reaction selected from (c); (b) and (c); and (a), (b), and (c), depicted in FIG. 3G. For example, to make the compounds having chemical formula $B_z(X)$, chemical reactions (c); (b) and (c); and (a), (b), and (c), depicted in FIG. 3G may be selected.

Referring again to FIGS. 3A and 3E, in one embodiment, the compound having chemical formula (I) can be a compound having formula (C):

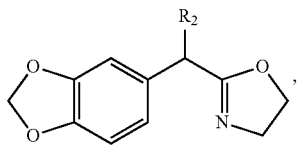

(C)

wherein $R_2$ is a hydrogen atom, a methyl group or an ethyl group, and at least one chemical synthesis reaction is a reaction selected from (i); (e) and (i); and (d), (e), and (i), depicted in FIG. 3A or from (f); (e) and (f); (b), (e), and (f); and (a), (b), (e), and (f), depicted in FIG. 3E. For example, to make the compounds having chemical formula C(I), C(II), or C(III), chemical reactions (c); (b) and (c); or (a), (b), and (c) depicted in FIG. 3A may be selected, or, for example, to make compound C(IV), chemical reactions (f); (e) and (f); (b), (e), and (f); and (a), (b), (e), and (f), depicted in FIG. 3E may be selected.

Continuing to refer to FIG. 3A, in one embodiment, the compound having chemical formula (I) can be a compound having formula (D):

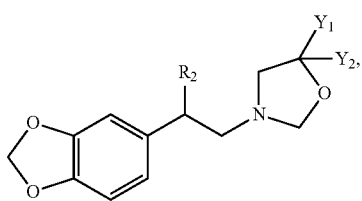

(D)

wherein $R_2$ is a methyl group or an ethyl group, and $Y_1$ and $Y_2$ each independently or simultaneously are a hydrogen atom or a methyl group, and at least one chemical synthesis reaction is a reaction selected from (h); (f) and (h); (e), (f), and (h); (d), (e), (f), and (h); (g); (f) and (g); (e), (f), and (g); and (d), (e), (f), and (g), depicted in FIG. 3A. For example, to make the compounds having chemical formula D(I), or D(II), chemical reactions (h); (f) and (h); (e), (f), and (h); (d), (e), (f), and (h) depicted in FIG. 3A may be selected, or, for example, to make the compounds having chemical formula D(III) or D(IV), chemical reactions (g); (f) and (g); (e), (f), and (g); and (d), (e), (f), and (g) depicted in FIG. 3A may be selected.

Referring next to FIG. 3B, in one embodiment, the compound having chemical formula (I) can be a compound having formula (E):

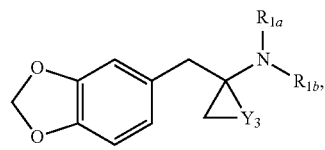

(E)

wherein $Y_3$ can be methylene, ethylene, propylene, or butylene, and $R_{1a}$ and $R_{1b}$ are each independently or both simultaneously selected from a methyl group, an ethyl group, a $CH_2$-phenyl group, a hydrogen atom, or $R_{1a}$ and $R_{1b}$ are both simultaneously an oxygen atom, and at least one chemical synthesis reaction is a reaction selected from:
(i) (e); (d) and (e); (c), (d), and (e); (b), (c), (d), and (e); and (a), (b), (c), (d), and (e);
(ii) (d); (c) and (d); (b), (c), and (d); and (a), (b), (c), and (d);
(iii) (c); (b) and (c); and (a), (b), and (c); and
(iv) (b); and (a) and (b), depicted in FIG. 3B. For example, to make the compound having chemical formula E(VIII), chemical reactions (e); (d) and (e); (c), (d), and (e); (b), (c), (d), and (e); or (a), (b), (c), (d), and (e), depicted in FIG. 3B may be selected, or, for example, to make the compounds having chemical formula E(VII), E(IX), or E(X), chemical reactions (d); (c) and (d); (b), (c), and (d); or (a), (b), (c), and (d) depicted in FIG. 3B may be selected, or, for example, to make the compounds having chemical formula E(V) or E(VI), chemical reactions (c); (b) and (c); or (a), (b), and (c) depicted in FIG. 3B may be selected, or, for example, to make the compounds having chemical formula E(I), E(II), E(III), or E(IV), chemical reactions (b); or (a) and (b), depicted in FIG. 3B may be selected.

Referring next to FIG. 3C(i), in one embodiment, the compound having chemical formula (I) can be a compound having formula (F):

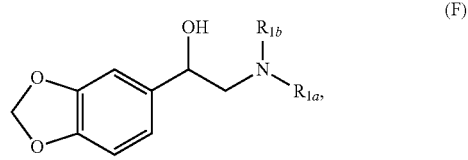

(F)

wherein $R_{1a}$ and $R_{1b}$ are each independently or both simultaneously selected from a methyl group, ethyl group, a $CH_2$-phenyl group, or a hydrogen atom, and at least one chemical synthesis reaction is a reaction selected from
(i) (d); (c) and (d); (b), (c), and (d); and (a), (b), (c), and (d);
(ii) (c); (b) and (c); and (a), (b), and (c); and
(iii) (b); and (a) and (b), depicted in FIG. 3C(i). For example, to make the compounds having chemical formula F(III) or F(VI), chemical reactions (d); (c) and (d); (b), (c), and (d); and (a), (b), (c), and (d) depicted in FIG. 3C(i) may be selected, or, for example, to make the compounds having chemical formula F(II), F(IV), or F(V), chemical reactions (c); (b) and (c); and (a), (b), and (c) depicted in FIG. 3C(i) may be selected, or, for example, to make the compound having chemical formula F(I) chemical reactions (b); and (a) and (b) depicted in FIG. 3C(i) may be selected.

Referring to FIGS. 3C(i) and 3C(ii), in one embodiment, the compound having chemical formula (I) can be a compound having formula (G):

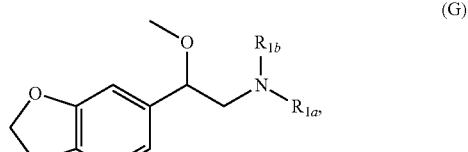

(G)

wherein R$_{1a}$ and R$_{1b}$ are each independently or both simultaneously selected from a methyl group, ethyl group, a CH$_2$-phenyl group, or a hydrogen atom, and at least one chemical synthesis reaction is a reaction selected from:
(i) (h); (g) and (h); (f), (g), and (h); (e), (f), (g), and (h); and (a), (e), (f), (g), and (h);
(ii) (g); (f) and (g); (e), (f), and (g); and (a), (e), (f), and (g); and
(iii) (f); (e) and (f); and (a), (e) and (f),
depicted in FIGS. 3C(i) and 3C(ii). For example, to make the compound having chemical formula G(III), chemical reactions (h); (g) and (h); (f), (g), and (h); (e), (f), (g), and (h); and (a), (e), (f), (g), and (h), depicted in FIGS. 3C(i) and 3C(ii) may be selected, or, for example, to make the compounds having chemical formula G(II), G(IV), or G(V), chemical reactions (g); (f) and (g); (e), (f), and (g); and (a), (e), (f), and (g) depicted in FIGS. 3C(i) and 3C(ii) may be selected, or, for example, to make the compound having chemical formula G(I) chemical reactions (f); (e) and (f); and (a), (e) and (f) in FIGS. 3C(i) and 3C(ii) may be selected.

It will now be clear from the foregoing that novel heterocyclic mescaline derivatives are disclosed herein. The heterocyclic mescaline derivatives may be formulated for use as a pharmaceutical drug or recreational drug. Example embodiments and implementations of the present disclosure are further illustrated by the following examples.

EXAMPLES

Figure 4A:
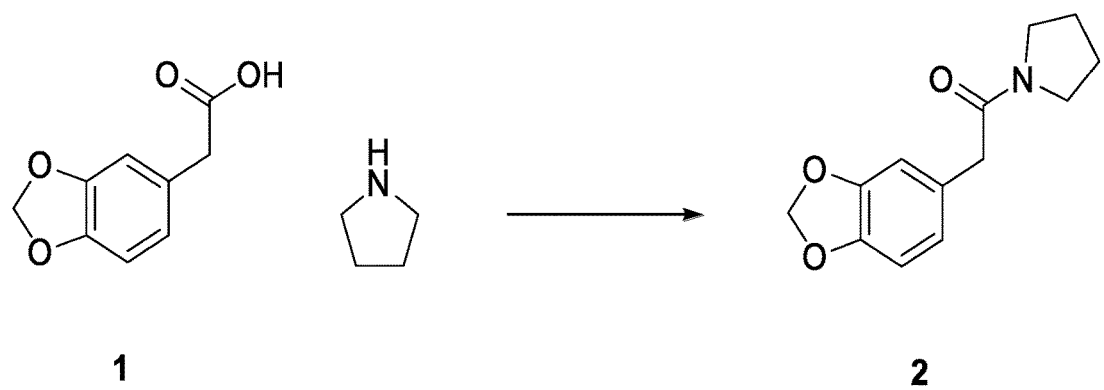
FIGS. 4A and 4B depict example reactions in an example chemical synthesis pathway for the synthesis of a certain example compound according to the present disclosure.

Example 1—Preparation of a First Substituted Ethylamine Fused Heterocyclic Mescaline Derivative Referring to FIG. 4A, 3,4-(methylenedioxy)phenylacetic acid 1 (2.00 g, 11.1 mmol), N-hydroxysuccinimide (2.61 g, 22.2 mmol) and EDC·HCl (4.48 g, 22.2 mmol) were added to a reaction vial, followed by the addition of anhydrous THF (22.2 mL) and DMF (5.55 mL). The resulting mixture was stirred for an hour (material slowly dissolved) before the addition of pyrrolidine (1.86 mL, 22.2 mmol). The reaction was stirred at room temperature overnight. The reaction mixture was concentrated in vacuo; the residue was re-suspended in half sat'd aq. NaHCO$_3$ and EtOAc, and the layers were separated after extraction. The organic layer was washed with sat'd aq. NH$_4$Cl and brine, dried over anhydrous Na$_2$SO$_4$, filtered and concentrated to afford the crude product. The crude residue was purified by FC on silica gel (40 g, EA/hex 0:100 to 100:0, 8 CV, product eluting at 95% EA) to afford the pure product (2) as a clear colorless oil (2.18 g, 84%). $^1$H NMR (400 MHz, CDCl$_3$) δ 6.79-6.77 (m, 1H), 6.72 (d, J=0.5 Hz, 1H), 6.69-6.66 (m, 1H), 5.90 (s, 2H), 3.53 (s, 2H), 3.45 (t, J=6.9 Hz, 2H), 3.40 (t, J=6.7 Hz, 2H), 1.94-1.86 (m, 2H), 1.85-1.77 (m, 2H). (FIG. 4A, chemical reaction; see: further also chemical reaction (a), FIG. 3A).

Figure 4B:
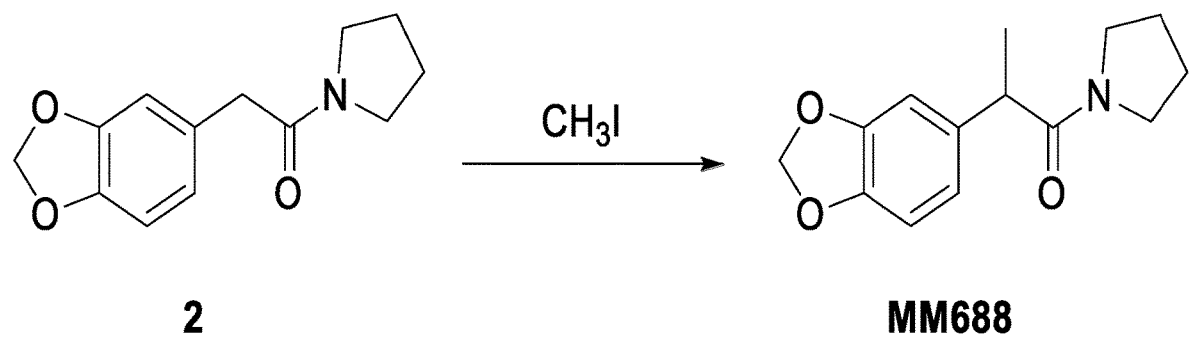

Referring next to FIG. 4B, A solution of diisopropylamine (346 μL, 2.47 mmol) in THF (6.86 mL) was cooled down to −78° C. To this solution was added n-butyllithium (2.5 M in hexanes, 943 μL, 2.36 mmol) dropwise, and the resulting mixture was stirred at −78° C. for 1 h. A solution of 2 (500 mg, 2.14 mmol) in THF (1.71 mL) was added dropwise, and the reaction mixture was warmed up to 0° C. and stirred for 1 h. At this time, iodomethane (201 μL, 3.22 mmol) was added and the reaction was warmed up to RT and stirred for 3 h (or until completion). The reaction was quenched by adding sat'd aq. NH$_4$Cl and the volatiles were removed under reduced pressure. The residue was taken up in H$_2$O and extracted with EtOAc three times. The combined organic layers were washed with brine, dried over anhydrous Na$_2$SO$_4$, filtered and concentrated to afford the crude product (MM688). The crude material was purified by FC on silica gel (12 g, EA/hex 0:100 to 100:0, 8 CV, product eluting at 55% EA) to afford the a purified product (racemic mixture) as an off-white solid (392 mg, 74%). HRMS-HESI: calc'd for C$_{14}$H$_{18}$NO$_3$ [M+H]$^+$ 248.1281 m/z, observed 248.1276. $^1$H NMR (400 MHz, CDCl$_3$) δ 6.83 (t, J=1.1 Hz, 1H), 6.77-6.68 (m, 2H), 5.92 (s, 2H), 3.65 (q, J=6.9 Hz, 1H), 3.56-3.48 (m, 1H), 3.47-3.37 (m, 2H), 3.29-3.16 (m, 1H), 1.95-1.84 (m, 1H), 1.83-1.74 (m, 2H), 1.41 (d, J=6.9 Hz, 3H). (FIG. 4B, see: further also chemical reaction (b), FIG. 3A).

It is noted that MM688 corresponds with chemical compound A$_x$(II):

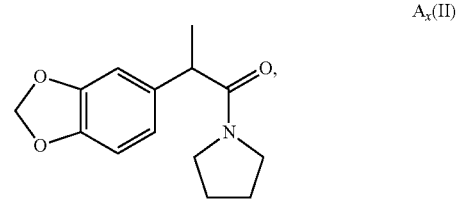 [SMILES: CC(C(=O)N1CCCC1)c1ccc2c(c1)OCO2]

A$_x$(II)

set forth herein.

5-HT receptor radioligand competition assays. Activity at 5-HT$_{1A}$ and 5-HT$_{2A}$ receptors were assessed as described for Example 4, except the compound with formula A$_x$(II) was evaluated in place of the compound with formula B$_x$(V). Table 1 shows radioligand competition assay results for positive controls, negative controls, and compound with formula A$_x$(II), in the form of K$_i$ values. In view of results for both positive and negative controls, wherein negative controls yield data insufficient for reliable K$_i$ calculations (i.e., K$_i$>1000 μM), the K$_i$ value obtained for the compound with formula A$_x$(II) at the 5-HT$_{1A}$ receptor (108 μM, Table 1) indicates ligand-receptor binding at elevated ligand concentrations. Similarly, the K$_i$ value obtained for the compound with formula A$_x$(II) at the 5-HT$_{2A}$ receptor (591 μM, Table 1) indicates ligand-receptor binding at elevated ligand concentrations.

In Vitro Survey of Pharmacological Interaction Profiles at Receptors and Transporters Linked to Targeted Health Conditions.

The compound with formula A$_x$(II) was evaluated with respect to binding and/or interaction at 11 different receptors and transporters with known or suspected connections to mental health conditions and/or neurological pathologies. This study was conducted by the contracted research organization (CRO) Eurofins Cerep (Cell L'Evescault, France) using standard assay procedures (https://www.eurofinsdiscovery.com/solution/target-based-assays). Data was generated regarding interaction of derivative molecules with the following 8 GPCR receptors: HTR1A (5-HTR$_{1A}$), HTR2A (5-HT$_{2A}$), HTR2B (5-HT$_{2B}$), HTR2C (5-HT$_{2C}$), alpha2A (α$_{2A}$), D2 (D$_2$), D3 (D$_3$), MT1 (MT$_1$)) and 3 transporters (SERT, DAT, NET). Assays were conducted using the same materials and procedures outlined in Example 4, except the compound with formula A$_x$(II) was used in place of the compound with formula B$_x$(V). Overall assay conditions are summarized in Tables 2 and 3 for GPCR and transporters, respectively. Results for all calibrator compounds, control compounds, and test compounds including the compound with formula $A_x(II)$ are summarized in Table 4.

Figure 5A:
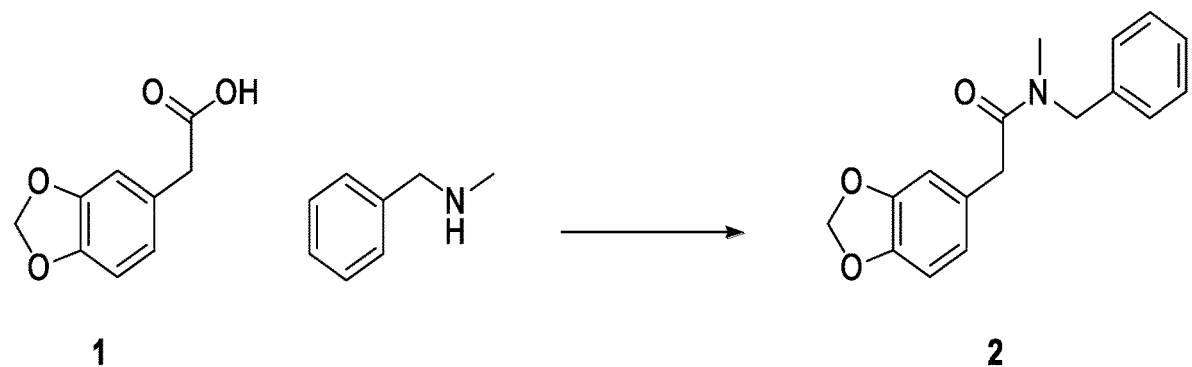
FIGS. 5A and 5B depict further example reactions in another example chemical synthesis pathway for the synthesis of another example compound according to the present disclosure.

Example 2—Preparation of a Second Substituted Ethylamine Fused Heterocyclic Mescaline Derivative Referring to FIG. 5A, 3,4-(methylenedioxy)phenylacetic acid 1 (2.00 g, 11.1 mmol), N-hydroxysuccinimide (2.61 g, 22.2 mmol) and EDC·HCl (4.48 g, 22.2 mmol) were added to a reaction vial, followed by the addition of anhydrous THF (22.2 mL) and DMF (5.55 mL). The resulting mixture was stirred for an hour (material slowly dissolved) before the addition of N-benzylmethylamine (2.87 mL, 22.2 mmol). The reaction was stirred at room temperature overnight. The reaction mixture was concentrated in vacuo, the residue was re-suspended in half sat'd aq. $NaHCO_3$ and EtOAc, and the layers were separated after extraction. The organic layer was washed with sat'd aq. $NH_4Cl$ and brine, dried over anhydrous $Na_2SO_4$, filtered and concentrated to afford the crude product. The crude residue was purified by FC on silica gel (40 g, EA/hex 0:100 to 100:0, 8 CV, product eluting at 60% EA) to afford the pure product (2) as a clear colorless oil (2.95 g, 94%). $^1H$ NMR (400 MHz, $CDCl_3$) δ 7.38-7.23 (m, 4H), 7.12 (ddq, J=7.0, 1.6, 0.8 Hz, 1H), 6.83-6.62 (m, 3H), 5.94 (s, 1.14H), 5.93 (s, 0.84H), 4.60 (s, 1.14H), 4.54 (s, 0.84H), 3.69 (s, 1.15H), 3.66 (s, 0.85H), 2.96 (s, 1.1H), 2.91 (s, 1.5H). Note: on the timescale of the NMR experiment, rotameric equilibration of the amido functional group is observed. The chemical shifts in bold belong to the same rotamer. (FIG. 5A, chemical reaction, see: further also chemical reaction (a), FIG. 3A).

Figure 5B:
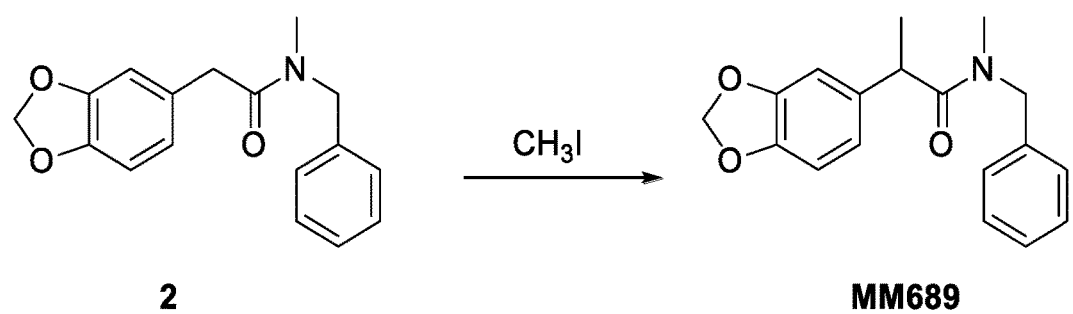

Referring next to FIG. 5B, a solution of diisopropylamine (427 μL, 3.04 mmol) in THF (8.47 mL) was cooled down to −78° C. To this solution was added n-butyllithium solution (2.5 M in hexanes, 1.16 mL, 2.91 mmol) dropwise, and the resulting mixture was stirred at −78° C. for 1 h. A solution of 2 (750 mg, 2.65 mmol) in THF (2.12 mL) was added dropwise, and the reaction mixture was warmed up to 0° C. and stirred for 1 h. At this time, iodomethane (248 μL, 3.97 mmol) was added and the reaction was warmed up to RT and stirred for 3 h (or until completion). The reaction was quenched by adding sat'd aq. $NH_4Cl$. The volatiles were removed under reduced pressure. The residue was taken up in $H_2O$ and extracted with EtOAc three times. The combined organic layers were washed with brine, dried over anhydrous $Na_2SO_4$, filtered and concentrated to afford the crude product. The crude material was purified by FC on silica gel (12 g, EA/hex 0:100 to 80:20, 8 CV, product eluting at 27% EA) to afford the pure, racemic product MM689 as a yellow oil (582 mg, 74%). HRMS-HESI: calc'd for $C_{18}H_{20}NO_3$ $[M+H]^+$ 298.1438 m/z, observed 298.1435. $^1H$ NMR (400 MHz, $CDCl_3$) δ 7.36-7.20 (m, 5H), 7.20-7.15 (m, 2H), 7.08-7.01 (m, 2H), 6.85-6.78 (m, 2H), 6.78-6.63 (m, 3H), 5.92 (s, 2H), 5.91 (s, 2H), 4.72-4.52 (m, 3H), 3.84 (q, J=6.8 Hz, 1H), 3.78 (q, J=6.8 Hz, 1H), 2.94 (s, 2H), 2.82 (s, 3H), 1.45 (d, J=6.8 Hz, 3H), 1.41 (d, J=6.8 Hz, 2H). Note: on the timescale of the NMR experiment, rotameric equilibration of the amido functional group is observed. (FIG. 5B, see: further also chemical reaction (b), FIG. 3A).

It is noted that MM689 corresponds with chemical compound $A_x(V)$:

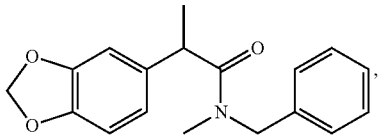

$A_x(V)$

Set forth herein.

5-HT receptor radioligand competition assays. Activity at $5-HT_{1A}$ and $5-HT_{2A}$ receptors were assessed as described for Example 4, except the compound with formula $A_x(V)$ was evaluated in place of the compound with formula $B_x(V)$. Table 1 shows radioligand competition assay results for positive controls, negative controls, and compound with formula $A_x(V)$, in the form of $K_i$ values. In view of results for both positive and negative controls, wherein negative controls yield data insufficient for reliable $K_i$ calculations (i.e., $K_i$>1000 μM), the $K_i$ value obtained for the compound with formula $A_x(V)$ at the $5-HT_{1A}$ receptor (186 μM, Table 1) indicates ligand-receptor binding at elevated ligand concentrations. Similarly, the $K_i$ value obtained for the compound with formula $A_x(V)$ at the $5-HT_{2A}$ receptor (83 μM, Table 1) indicates ligand-receptor binding at elevated ligand concentrations.

In Vitro Survey of Pharmacological Interaction Profiles at Receptors and Transporters Linked to Targeted Health Conditions.

The compound with formula $A_x(V)$ was evaluated with respect to binding and/or interaction at 11 different receptors and transporters with known or suspected connections to mental health conditions and/or neurological pathologies. This study was conducted by the contracted research organization (CRO) Eurofins Cerep (Cell L'Evescault, France) using standard assay procedures (https://www.eurofinsdiscovery.com/solution/target-based-assays). Data was generated regarding interaction of derivative molecules with the following 8 GPCR receptors: HTR1A ($5-HTR_{1A}$), HTR2A ($5-HT_{2A}$), HTR2B ($5-HT_{2B}$), HTR2C ($5-HT_{2C}$), alpha2A ($\alpha_{2A}$), D2 ($D_2$), D3 ($D_3$), MT1 ($MT_1$)) and 3 transporters (SERT, DAT, NET). Assays were conducted using the same materials and procedures outlined in Example 4, except the compound with formula $A_x(V)$ was used in place of the compound with formula $B_x(V)$. Overall assay conditions are summarized in Tables 2 and 3 for GPCR and transporters, respectively. Results for all calibrator compounds, control compounds, and test compounds including the compound with formula $A_x(V)$ are summarized in Table 4.

Figure 6:
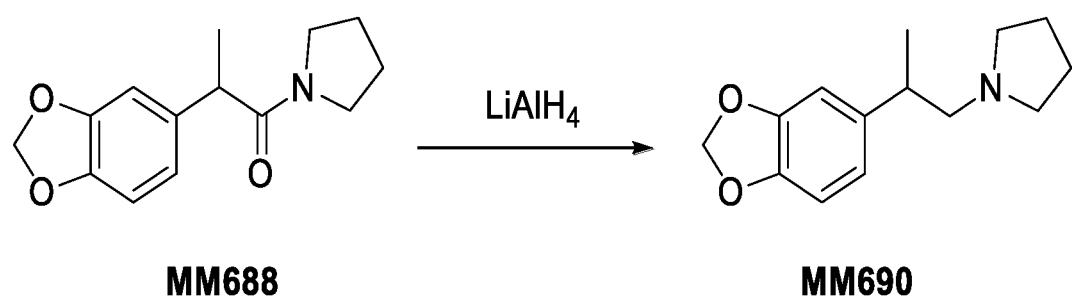
FIG. 6 depicts further example reactions in another example chemical synthesis pathway for the synthesis of another example compound according to the present disclosure.

Example 3—Preparation of a Third Substituted Ethylamine Fused Heterocyclic Mescaline Derivative Referring to FIG. 6, Into a dry round bottomed flask was added compound MM688 (250 mg, 1.01 mmol) (prepared as described in Example 1) and dry THF (9.16 mL). the reaction mixture was cooled to 0° C. and lithium aluminum hydride (758 μL, 1.52 mmol) (2 M in THF) was carefully added. The mixture was warmed up to room temperature and left to react overnight. The mixture was cooled to 0° C. and the excess $LiAlH_4$ was quenched with cold water. The resulting solution was poured into a separatory funnel containing water, and the aqueous phase was extracted with EtOAc (×4). All organic layers were combined, washed with brine, dried over $Na_2SO_4$, filtered and concentrated. The crude residue was purified by FC on silica gel (12 g, MeOH/DCM 0:100 to 20:80, 10 CV, product eluting at 12% MeOH) to afford the purified product MM690 (racemic mixture) as a colorless oil (186 mg, 79%). HRMS-HESI: calc'd for $C_{14}H_{20}NO_2$ [M+H]$^+$ 234.1489 m/z, observed 234.1485. $^1$H NMR (400 MHz, CDCl$_3$) δ 6.75-6.72 (m, 2H), 6.67 (ddd, J=7.9, 1.8, 0.5 Hz, 1H), 5.91 (s, 2H), 2.84 (dp, J=8.3, 6.9 Hz, 1H), 2.62 (dd, J=11.9, 8.2 Hz, 1H), 2.55-2.37 (m, 4H), 1.77-1.71 (m, 4H), 1.24 (d, J=6.9 Hz, 3H). (FIG. 6, see: further also chemical reaction (c) in FIG. 3A).

It is noted that MM690 corresponds with chemical compound $B_x$(II):

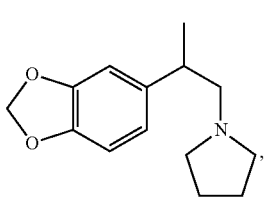

$B_x$(II)

set forth herein.

5-HT receptor radioligand competition assays. Activity at the 5-HT$_{1A}$ receptor was assessed as described for Example 4, except the compound with formula $B_x$(II) was evaluated in place of the compound with formula $B_x$(V). Table 1 shows radioligand competition assay results for positive controls, negative controls, and compound with formula $B_x$(II), in the form of $K_i$ values. In view of results for both positive and negative controls, wherein negative controls yield data insufficient for reliable $K_i$ calculations (i.e., $K_i$>1000 μM), the $K_i$ value obtained for the compound with formula $B_x$(II) at the 5-HT$_{1A}$ receptor (14 μM, Table 1) indicates ligand-receptor binding.

In Vitro Survey of Pharmacological Interaction Profiles at Receptors and Transporters Linked to Targeted Health Conditions.

The compound with formula $B_x$(II) was evaluated with respect to binding and/or interaction at 11 different receptors and transporters with known or suspected connections to mental health conditions and/or neurological pathologies. This study was conducted by the contracted research organization (CRO) Eurofins Cerep (Cell L'Evescault, France) using standard assay procedures (https://www.eurofinsdiscovery.com/solution/target-based-assays/). Data was generated regarding interaction of derivative molecules with the following 8 GPCR receptors: HTR1A (5-HTR$_{1A}$), HTR2A (5-HT$_{2A}$), HTR2B (5-HT$_{2B}$), HTR2C (5-HT$_{2C}$), alpha2A ($α_{2A}$), D2 (D$_2$), D3 (D$_3$), MT1 (MT$_1$)) and 3 transporters (SERT, DAT, NET). Assays were conducted using the same materials and procedures outlined in Example 4, except the compound with formula $B_x$(II) was used in place of the compound with formula $B_x$(V). Overall assay conditions are summarized in Tables 2 and 3 for GPCR and transporters, respectively. Results for all calibrator compounds, control compounds, and test compounds including the compound with formula $B_x$(II) are summarized in Table 4.

Figure 7:
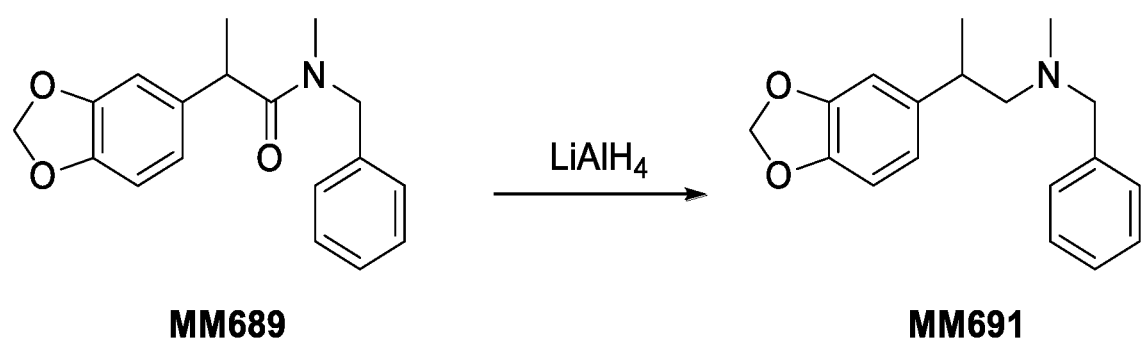
FIG. 7 depicts a further example reaction for the synthesis of another example compound according to the present disclosure.

Example 4—Preparation of a Fourth Substituted Ethylamine Fused Heterocyclic Mescaline Derivative Referring to FIG. 7, into a dry round bottomed flask was added MM689 (300 mg, 1.01 mmol) (prepared as described in Example 2) and dry THF (9.14 mL). The reaction mixture was cooled to 0° C., and lithium aluminum hydride (757 μL, 1.51 mmol) (2 M in THF) was carefully added. The mixture was warmed to room temperature and left to react overnight. The mixture was cooled to 0° C. and the excess LiAlH$_4$ was quenched with cold water. The resulting solution was poured into a separatory funnel containing water, and the aqueous phase was extracted with EtOAc (×4). All organic layers were combined, washed with brine, dried over anhydrous Na$_2$SO$_4$, filtered and concentrated. The crude residue was purified by FC on silica gel (12 g, MeOH/DCM 0:100 to 15:85, 10 CV, product MM691 eluting at 1% MeOH) to afford the purified product (racemic mixture) as a colorless oil (200 mg, 70%). HRMS-HESI: calc'd for $C_{18}H_{22}NO_2$ [M+H]$^+$ 284.1645 m/z, observed 284.1634. $^1$H NMR (400 MHz, CDCl$_3$) δ 7.34-7.19 (m, 5H), 6.74 (d, J=7.9 Hz, 1H), 6.66 (d, J=1.7 Hz, 1H), 6.63 (dd, J=7.9, 1.8 Hz, 1H), 5.93 (s, 2H), 3.49 (d, J=2.7 Hz, 2H), 2.91 (h, J=7.1 Hz, 1H), 2.52-2.35 (m, 2H), 2.21 (s, 3H), 1.22 (d, J=6.9 Hz, 3H). (FIG. 7, see: further also chemical reaction (c) in FIG. 3A).

It is noted that MM691 corresponds with chemical compound $B_x$(V):

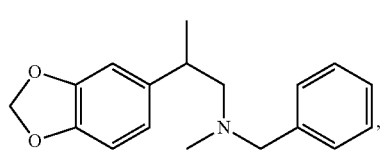

$B_x$(V)

set forth herein.

5-HT Receptor Radioligand Competition Assays.

Figure 22A:
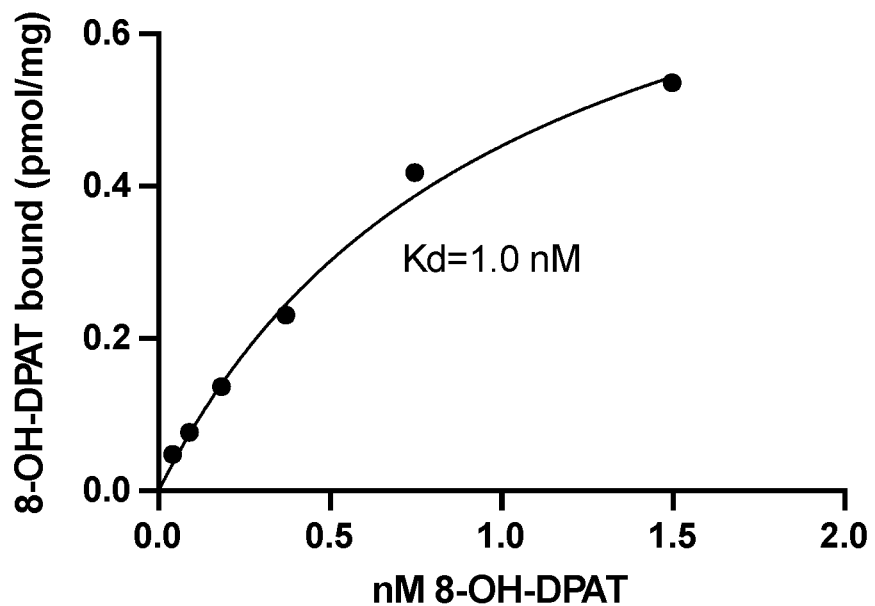
FIGS. 22A, 22B, 22C, 22D, 22E, 22F, 22G, 22H, 22I, 22J, 22K, and 22L depict various graphs representing certain experimental results, notably graphs obtained in the performance of experimental assays to evaluate the pharmaceutical efficacy of an example compound having chemical formula $B_x(V)$, notably a radioligand 5-$HT_{1A}$ receptor saturation binding assay using radiolabeled 8-hydroxy-DPAT [propyl-2,3-ring-1,2,3-$^3$H] (binding curve) (FIG. 22A); a 5-$HT_{1A}$ receptor competition assay using DMSO (negative control) (FIG. 22B); a 5-$HT_{1A}$ receptor competition assay using tryptophan (negative control) (FIG. 22C); a 5-$HT_{1A}$ receptor competition assay using serotonin (positive control) (FIG. 22D); a 5-$HT_{1A}$ receptor competition assay using mescaline (positive control) (FIG. 22E); a 5-$HT_{1A}$ receptor competition assay using 2C-B (positive control) (FIG. 22F); a 5-$HT_{1A}$ receptor competition assay using MDMA (positive control) (FIG. 22G); a 5-$HT_{1A}$ receptor competition assay using escaline (FIG. 22H); a 5-$HT_{1A}$ receptor competition assay using proscaline (FIG. 22I); a 5-$HT_{1A}$ receptor competition assay using fluoxetine (positive control) (FIG. 22J); a 5-$HT_{1A}$ receptor competition assay using vortioxetine (positive control) (FIG. 22K); a 5-$HT_{1A}$ receptor competition assay using the compound with formula $B_x(V)$ (FIG. 22L).
Figure 22B:
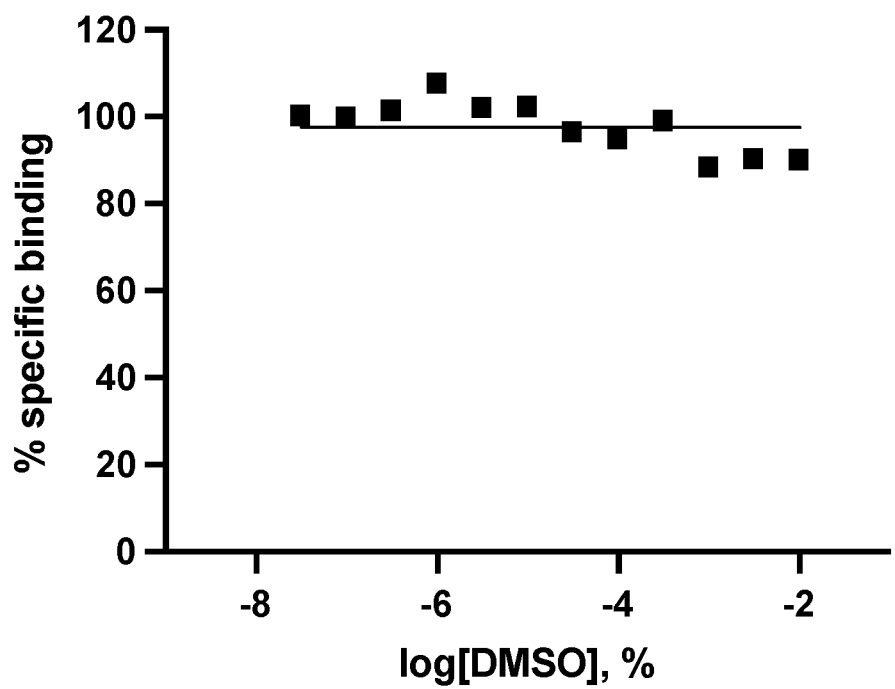
Figure 22C:
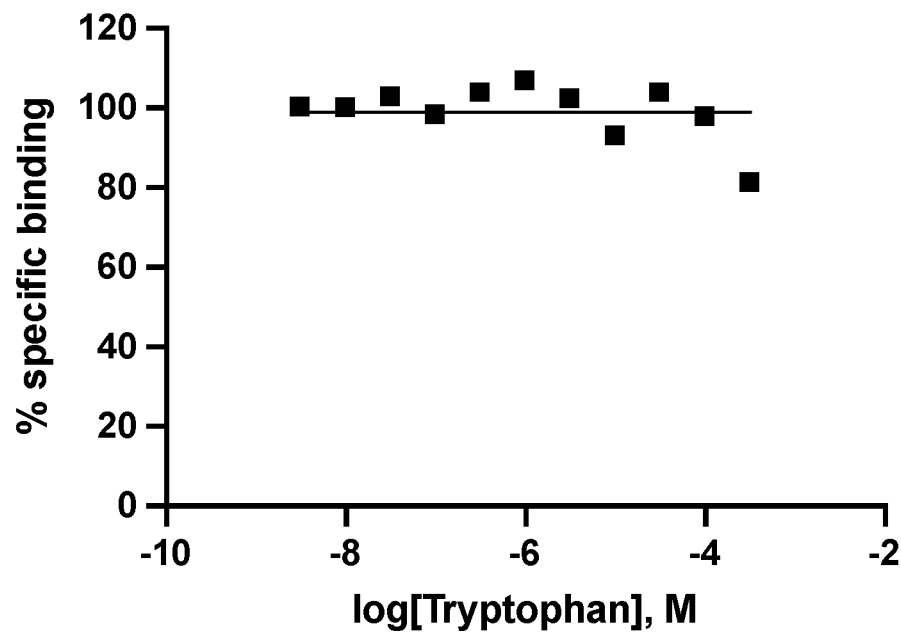
Figure 22D:
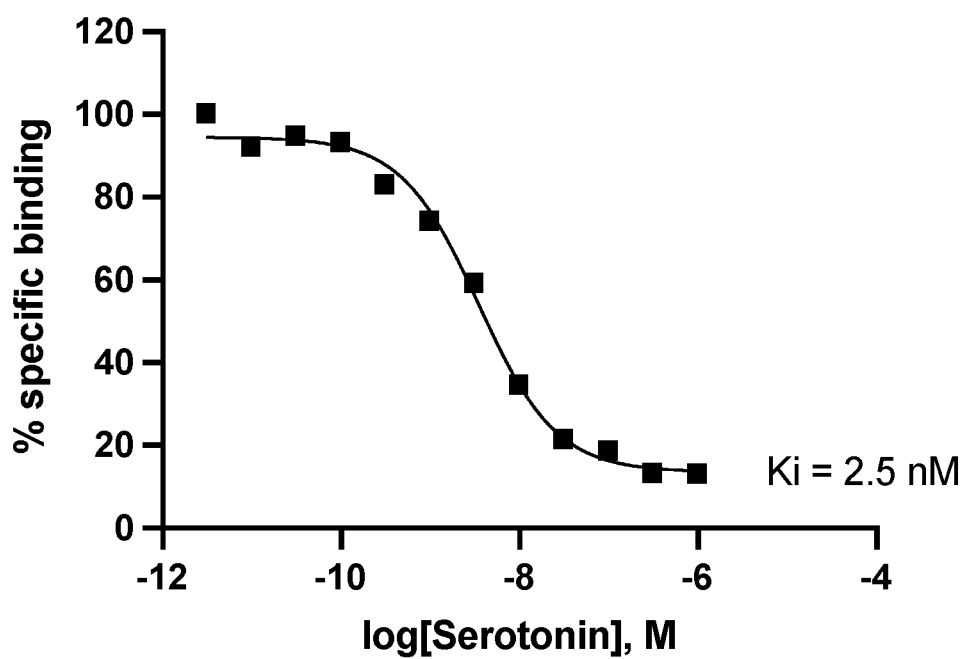
Figure 22E:
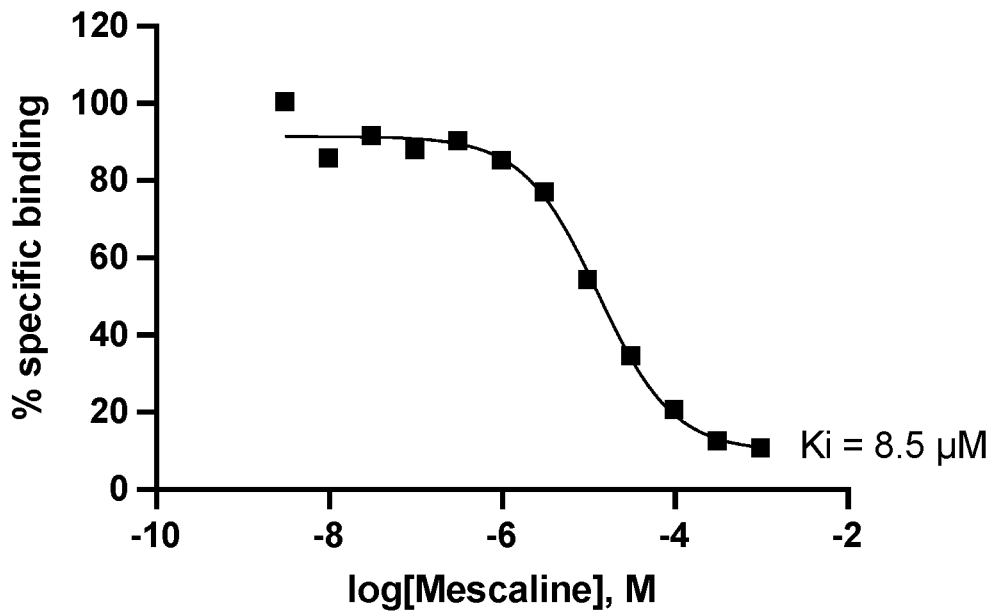
Figure 22F:
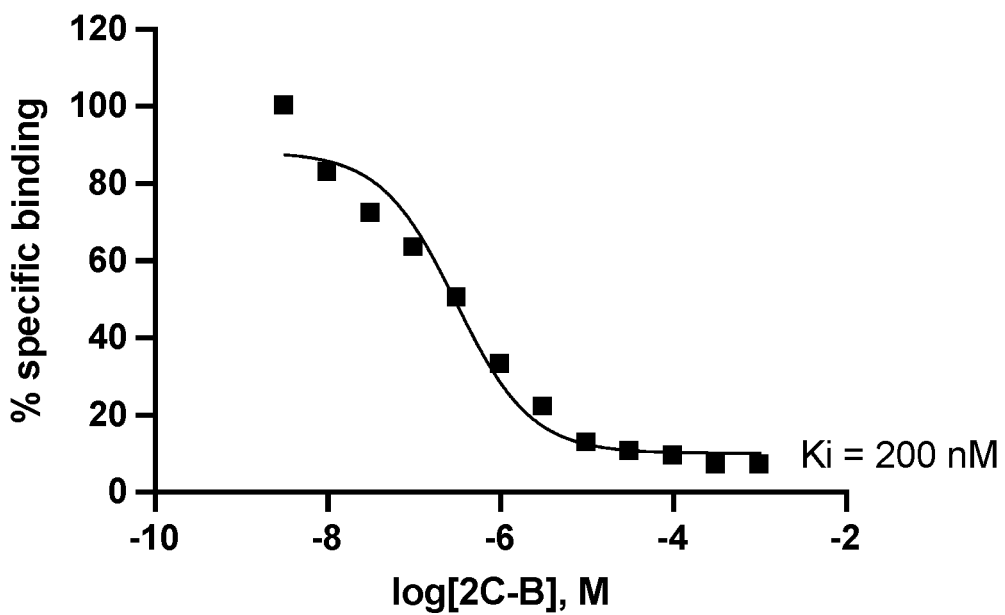
Figure 22G:
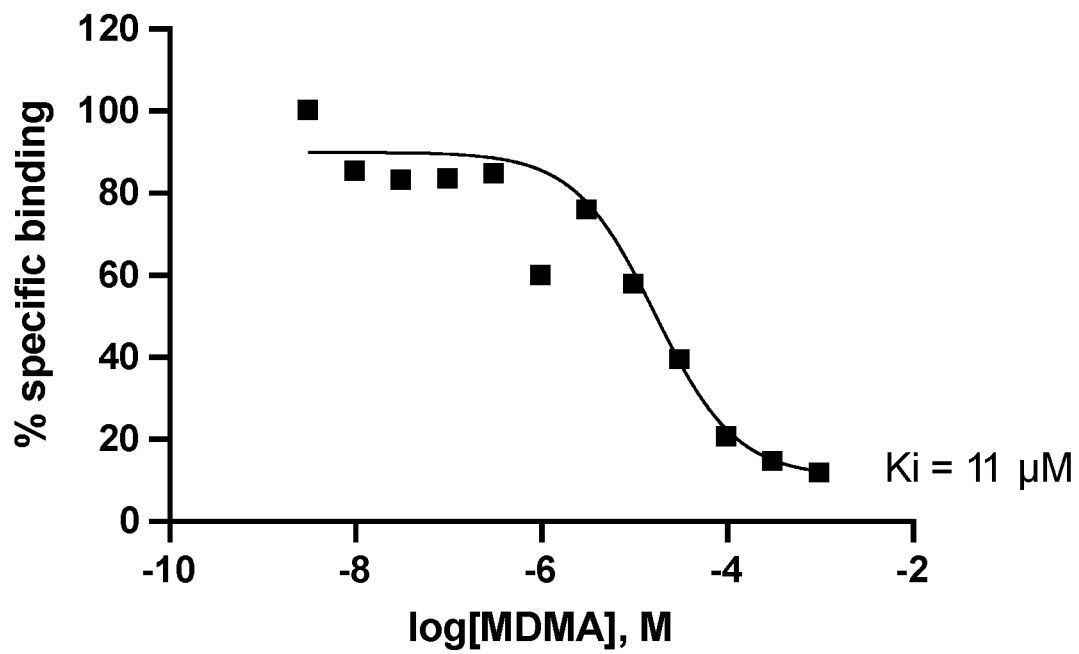
Figure 22H:
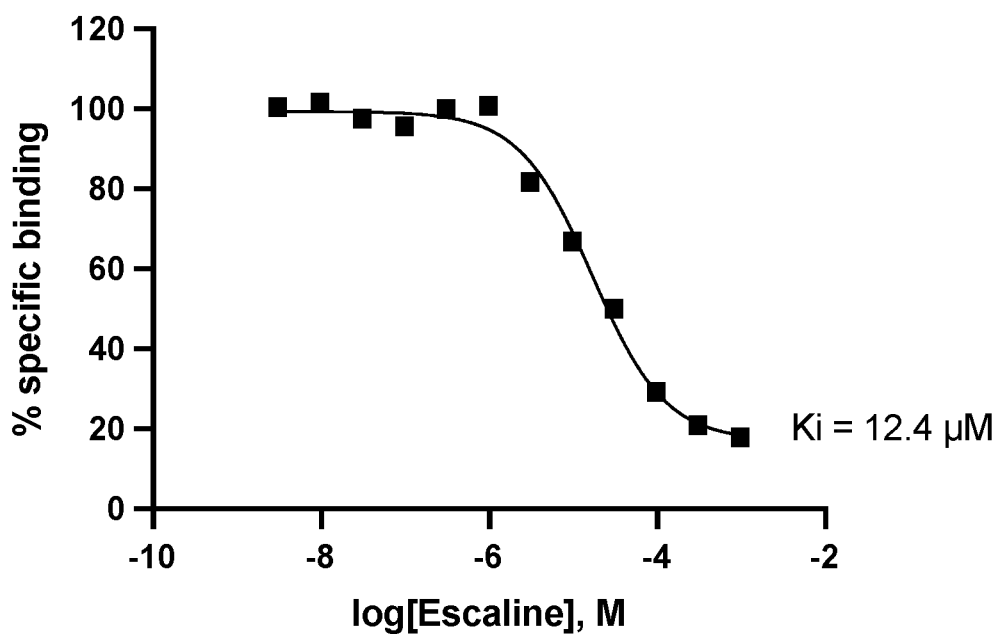
Figure 22I:
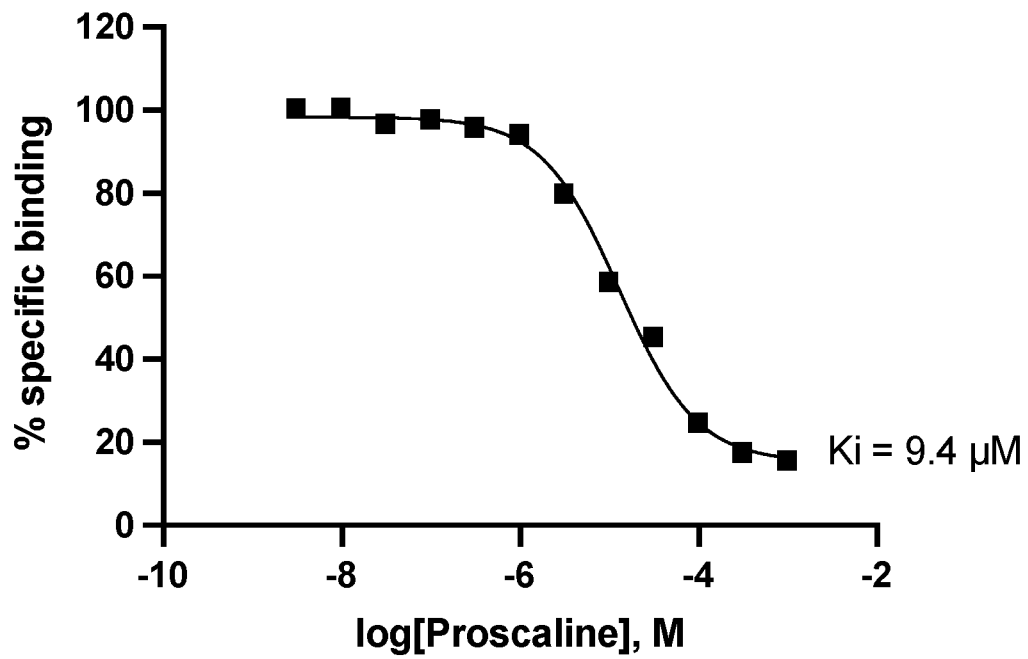
Figure 22J:
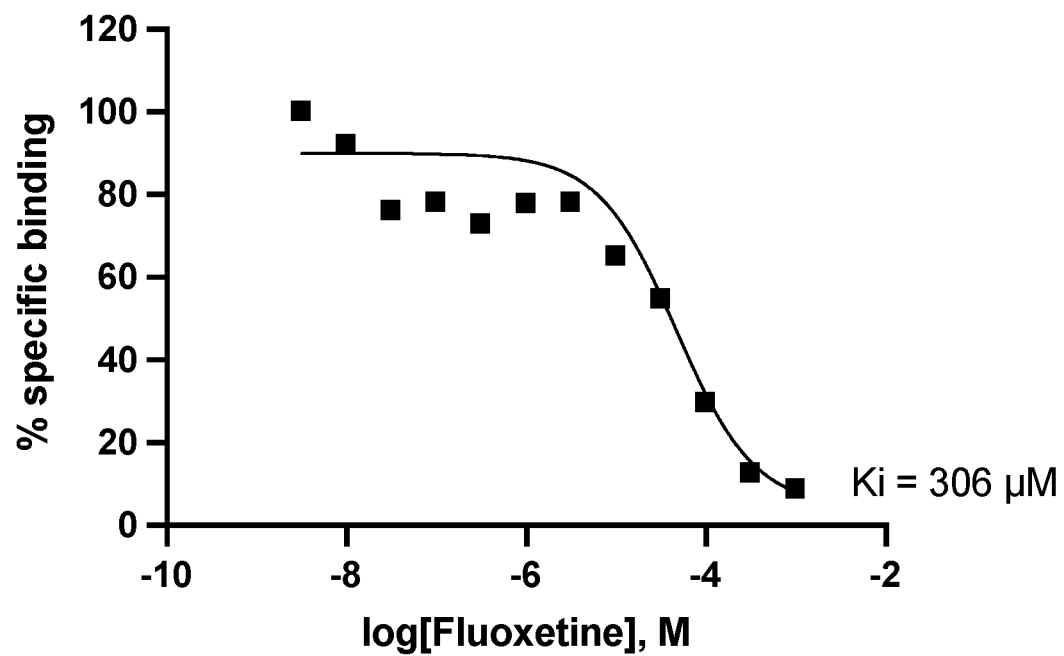
Figure 22K:
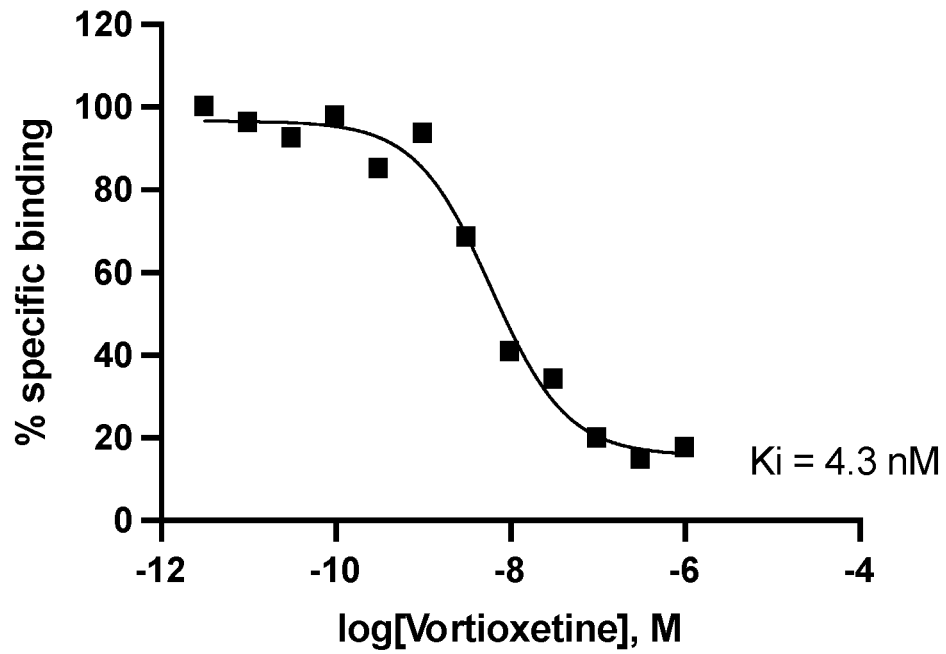
Figure 22L:
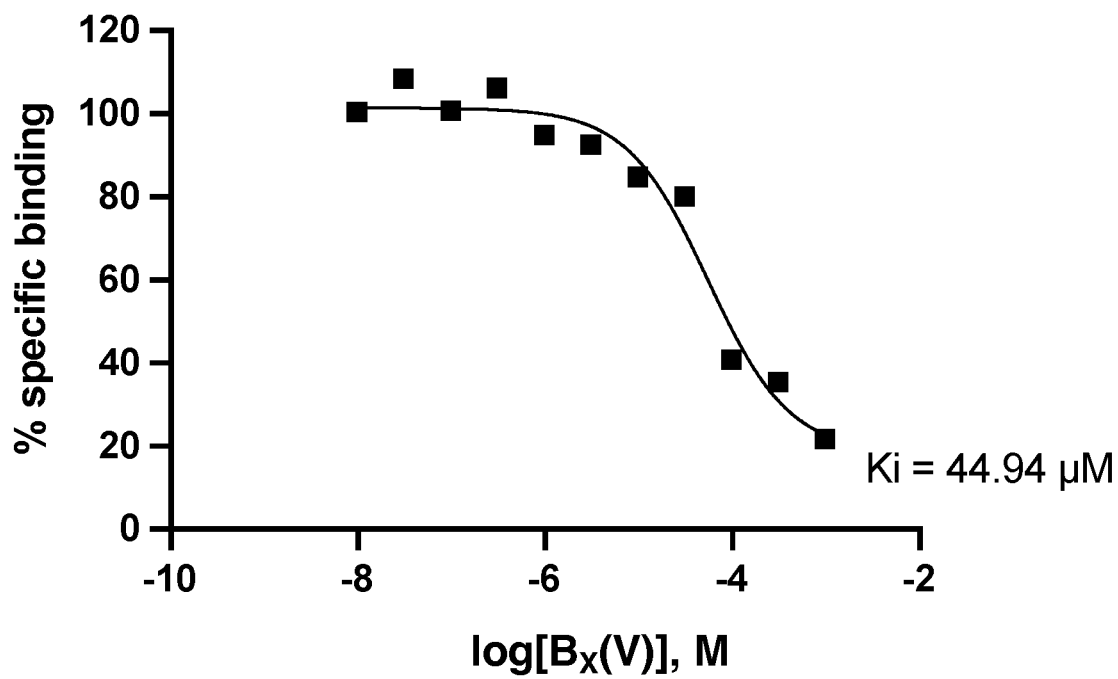

5-HT$_{1A}$ receptor. Competition assays were performed as follows: SPA beads (RPNQ0011), radiolabeled 8-hydroxy-DPAT [propyl-2,3-ring-1,2,3-$^3$H](labelled 7-(dipropylamino)-5,6,7,8-tetrahydronaphthalen-1-ol; NET929250UC), membranes containing 5-HT$_{1A}$ (6110501400UA), and isoplate-96 microplate (6005040) were from Perkin Elmer (perkinelmer.com). Radioactive binding assays were carried out using a scintillation proximity assay (SPA; Maguire et al., 2012, Methods in Molecular Biology 897:31-77). For saturation binding assays, mixtures of 10 μg of membrane containing HT$_{1A}$ receptor was pre-coupled to 1 mg of SPA beads at room temperature in a tube rotator for 1 h in binding buffer [50 mM Tris-HCl pH 7.4, 10 mM magnesium sulfate, 0.5 mM EDTA, 3.7% (v/v) glycerol, 1 mM ascorbic acid, 10 μM pargyline HCl]. After pre-coupling, the beads and membrane were aliquoted in an isoplate-96 microplate with increasing amounts of 8-hydroxy-DPAT [propyl-2,3-ring-1,2,3-$^3$H] (0.1525 nM to 5 nM) and incubated for two hours at room temperature in the dark with shaking. After incubation, the samples were read on a MicroBeta 2 Microplate Counter (perkinelmer.com). Non-specific binding was carried out in the presence of 100 μM of metergoline (M3668-500MG, Sigma-Aldrich). Equilibrium binding constant for 8-hydroxy-DPAT (K$_D$) was determined from a saturation binding curve using one-site saturation binding analysis from GraphPad PRISM software (Version 9.2.0). Test compound was dissolved to 100 mM in dimethylsulfoxide (DMSO), and dilutions were carried out in assay buffer. Competition binding assays were performed using 0.5 nM hot 8-hydroxy-DPAT and different concentrations of DMSO (up to 1%), tryptophan (3 nM to 1 mM), or unlabelled test compounds (3 nM to 1 mM) similar to the saturation binding assay. $K_i$ values were calculated from the competition displacement data using the competitive binding analysis from GraphPad PRISM software. Serotonin was used as a positive control, as it is the natural, endogenous ligand for all serotonergic receptors. 2C-B, MDMA and mescaline were used as positive controls since they are phenylalkylamine-type molecules with relatively strong (2C-B; Rickli et al., 2015, Neuropharmacology 99: 546) or more moderate (MDMA, Simmler et al., 2013, British J. Pharmacol. 168: 458; mescaline, Rickli et al., 2016, Eur. Neuropharm. 26: 1327) 5-$HT_{1A}$ receptor binding activities, respectively. Escaline and proscaline were included in this study for comparative purposes, for although their 5-$HT_{1A}$ receptor binding mode(s) are understudied they are established mescaline-type hallucinogens with therapeutic potential (Shulgin and Shulgin, 1990. *PIHKAL: A Chemical Love Story*. 1$^{st}$ ed., Transform Press). Fluoxetine and vortioxetine were included as positive controls as they are widely prescribed pharmaceuticals with established binding to the 5-$HT_{1A}$ receptor (Owens et al., 1997, Journal of Pharmacology and Experimental Therapeutics 283:1305-1322; Celada et al., 2013, CNS Drugs 27:703-716). FIG. 22A illustrates the binding curve used to determine the $K_D$ of 8-hydroxy-DPAT. FIGS. 22B and 22C illustrate binding curves of negative controls DMSO and tryptophan, respectively. As seen in FIGS. 22B and 22C, data precluded $K_i$ determination (i.e., $K_i$>1000 µM) which indicated no binding for these negative controls. Binding curves illustrated in FIGS. 22D, 22E, 22F, and 22G reveal data permitting $K_i$ determinations for the positive controls: serotonin, mescaline, 2C-B, and MDMA respectively. The sigmoidal curves and $K_i$ values (i.e., $K_i$<1000 µM) in 22D, 22E, 22F, and 22G reveal 5-$HT_{1A}$ receptor binding at indicated ligand concentrations. Data in FIGS. 22H and 22I suggest binding to 5-$HT_{1A}$ receptor of escaline and proscaline respectively, at the indicated concentrations. Data in FIGS. 22J and 22K indicate binding to the 5-$HT_{1A}$ receptor of fluoxetine and vortioxetine respectively. Data in FIG. 22L indicates binding to the 5-$HT_{1A}$ receptor of the compound with formula $B_x(V)$ above levels observed for negative controls (FIGS. 22A and 22B). Resulting $K_i$ data for controls and test compounds in 5-$HT_{1A}$ receptor binding assays is summarized in Table 1.

Figure 23A:
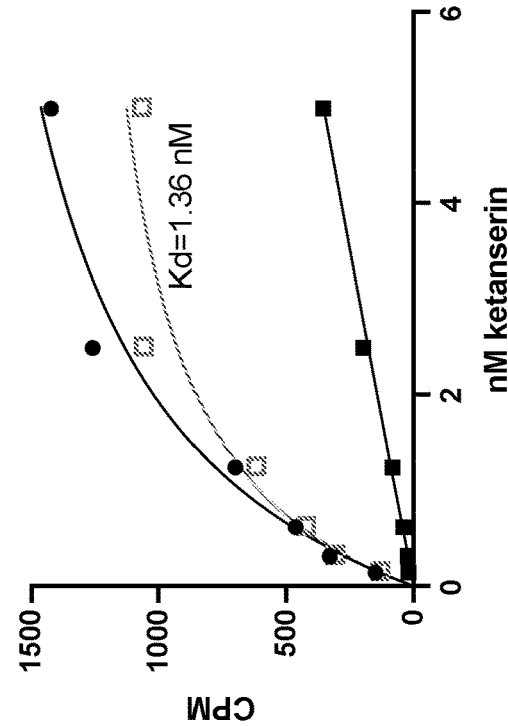
FIGS. 23A, 23B, 23C, 23D, 23E, 23F, 23G, and 23H depict various graphs representing certain experimental results, notably graphs obtained in the performance of experimental assays to evaluate the pharmaceutical efficacy of an example compound having chemical formula $B_x(V)$, notably a radioligand 5-$HT_{2A}$ receptor saturated binding assay using radiolabeled [$^3$H-ketanserin] (binding curves) (FIG. 23A); a 5-$HT_{2A}$ receptor competition assay using psilocin (positive control) (FIG. 23B); a 5-$HT_{2A}$ receptor competition assay using tryptophan (negative control) (FIG. 23C); a 5-$HT_{2A}$ receptor competition assay using escaline (FIG. 23D); a 5-$HT_{2A}$ receptor competition assay using proscaline (FIG. 23E); a 5-$HT_{2A}$ receptor competition assay using 2C-B (positive control) (FIG. 23F); and a 5-$HT_{2A}$ receptor competition assay using MDMA (positive control) (FIG. 23G), and; a 5-$HT_{2A}$ receptor competition assay using the compound with formula $B_x(V)$ (FIG. 23H).
Figure 23A:
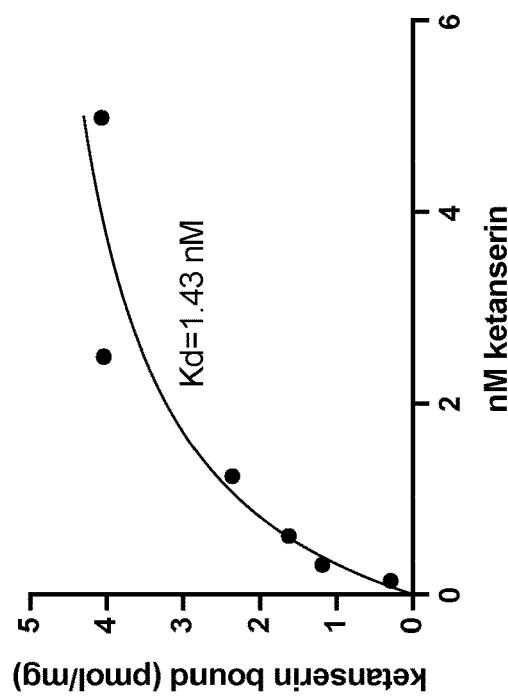
Figure 23B:
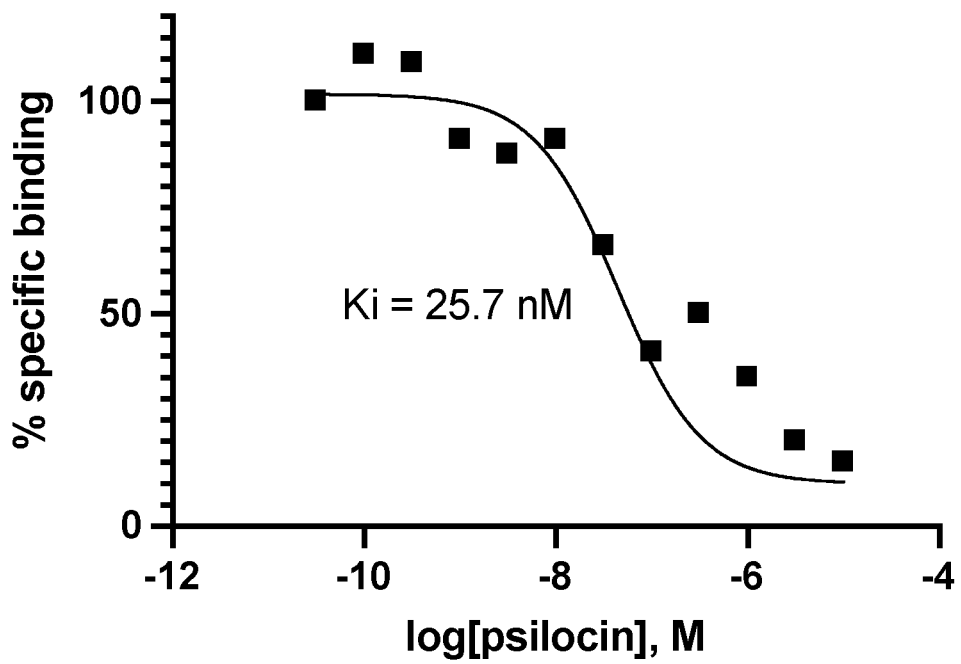
Figure 23C:
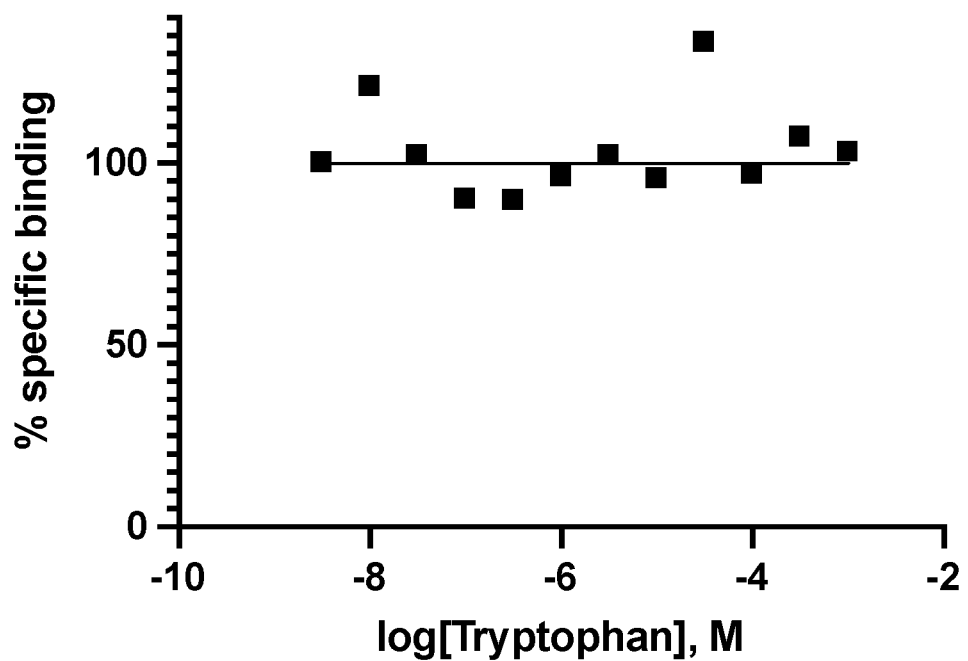
Figure 23D:
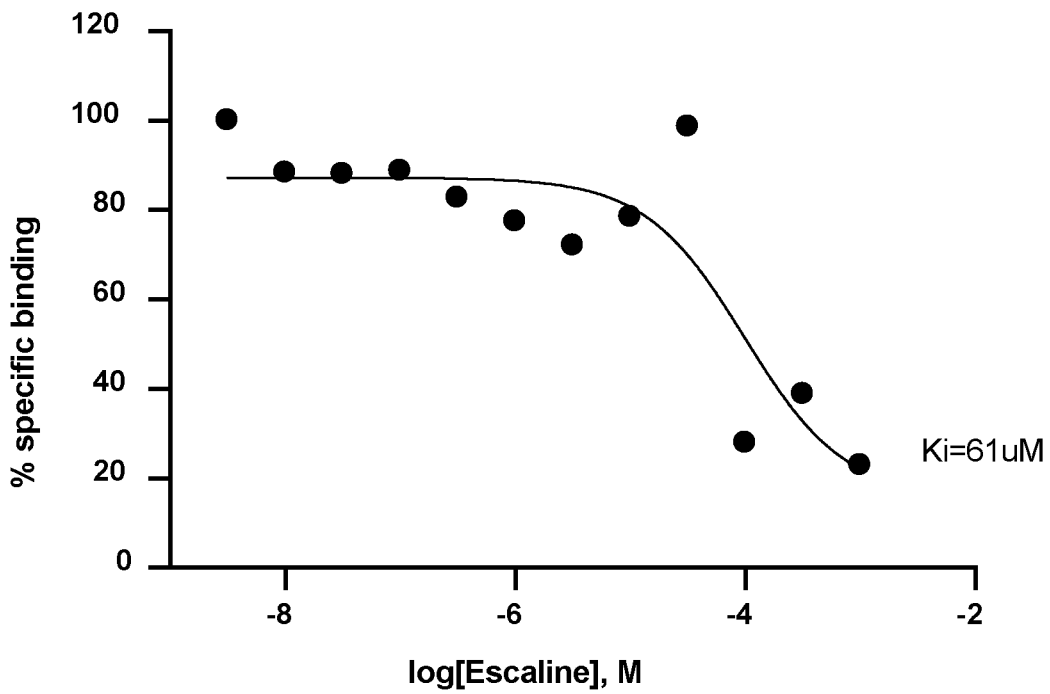
Figure 23E:
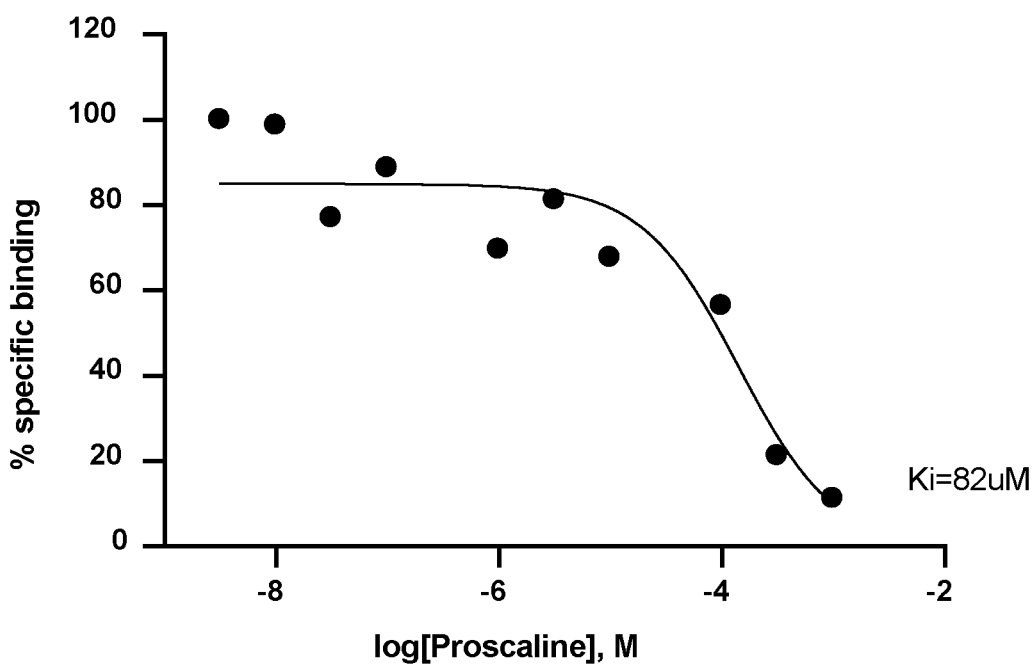
Figure 23F:
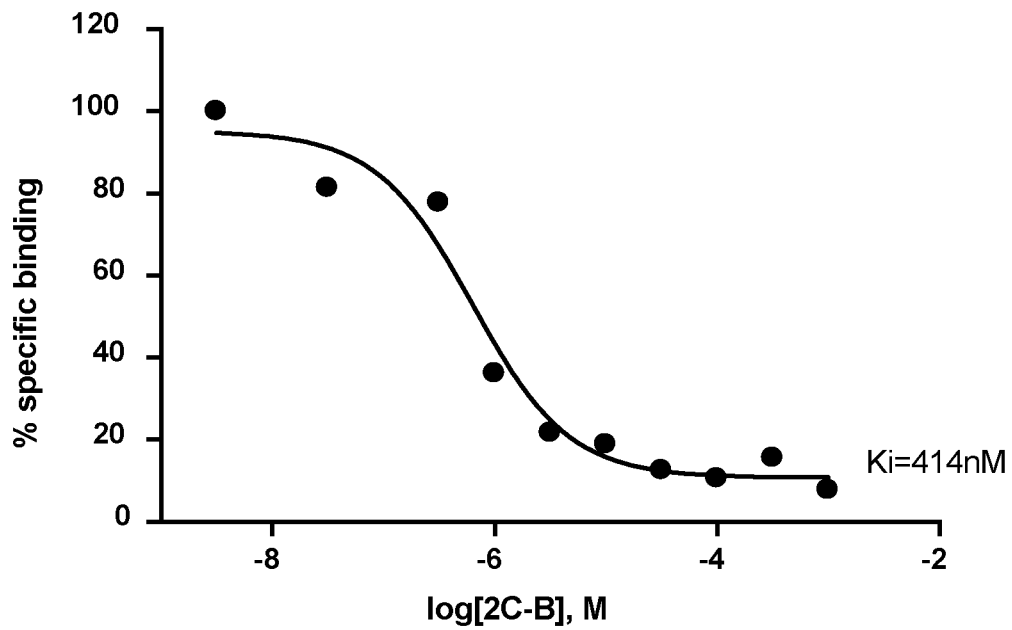
Figure 23G:
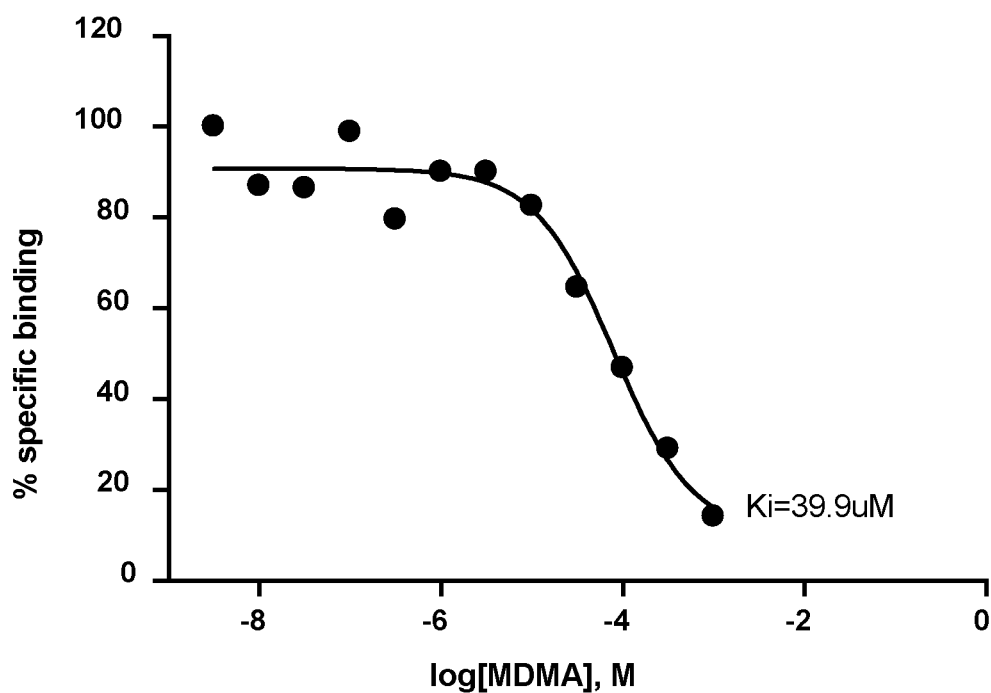
Figure 23H:
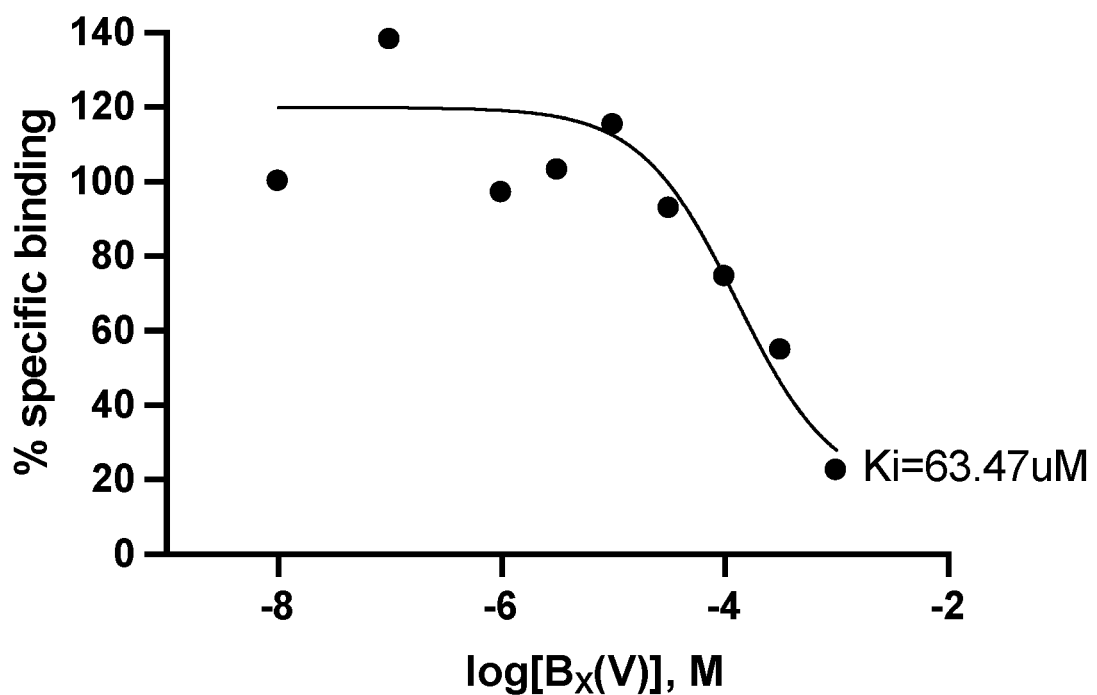

5-$HT_{2A}$ receptor. Competition assays were performed as for 5-$HT_{1A}$ assays with the following differences. SPA beads (RPNQ0010), [$^3$H]ketanserin (NET1233025UC), and membranes containing 5-$HT_{2A}$ (ES-313-M400UA) were from PerkinElmer. After pre-coupling, the beads and membrane were aliquoted in an isoplate-96 microplate with increasing amounts of [$^3$H]ketanserin (0.1525 nM to 5 nM). Determination of non-specific binding was carried out in the presence of 20 mM of spiperone (S7395-250MG, Sigma-Aldrich). Equilibrium binding constant for ketanserin ($K_d$) was determined from saturation binding curves using the 'one-site saturation binding analysis' method in GraphPad PRISM software (Version 9.2.0). Competition binding assays were performed using fixed (1 nM) [$^3$H]ketanserin and different concentrations of unlabeled test compounds (3 nM to 1 mM) similar to the saturation binding assay. Tryptophan was included as a negative control as it has no activity at the 5-$HT_{2A}$ receptor. In contrast, 2C-B and MDMA were used as positive controls since they are phenylalkylamine-type molecules with relatively strong (Marcher-Rørsted et al., 2020, ACS Chem. Neurosci. 11: 1238) or more moderate (Simmler et al., 2013, British J. Pharmacol. 168: 458) 5-$HT_{2A}$ receptor binding activities, respectively. Escaline and proscaline were included in this study for comparative purposes, for although their 5-$HT_{2A}$ receptor binding mode is understudied they are established mescaline-type hallucinogens known to induce head-twitch responses in mice (Halberstadt et al., 2019, J. Psychopharm. 33: 406-414). Mouse head-twitch response has been correlated with 5-$HT_{2A}$ receptor engagement (Halberstadt, 2015, Behav. Brain Res. 277: 99). Psilocin is included as an additional positive control as it exhibits well-established binding to 5-$HT_{2A}$ receptor as a partial agonist. FIG. 23A illustrates data in support of overall $K_D$ determination for ketanserin (Panel 1), in addition to the $K_D$ owed to specific binding (Panel 2). FIG. 23B illustrates data obtained for psilocin and supports binding at the 5-$HT_{2A}$ receptor for this positive control. FIG. 23C illustrates data obtained for tryptophan and supports a lack of binding at the 5-$HT_{2A}$ receptor for this negative control. FIGS. 23D and 23E reveal binding data for escaline and proscaline, respectively, and resulting $K_i$ values (i.e., <1000 µM) reveal binding at the 5-$HT_{2A}$ receptor at indicated concentrations. FIG. 23F reveals binding data for 2C-B and the resulting $K_i$ value (i.e., <1000 µM) reveals binding at the 5-$HT_{2A}$ receptor. FIG. 23G reveals binding data for MDMA and the resulting $K_i$ value (i.e., <1000 µM) reveals binding at the 5-$HT_{2A}$ receptor at the indicated concentrations. Data in FIG. 23H indicates binding to the 5-$HT_{2A}$ receptor of the compound with formula $B_x(V)$ above levels observed for negative control (FIG. 23C). Resulting $K_i$ data for controls and test compounds in 5-$HT_{2A}$ receptor binding assays is summarized in Table 1.

TABLE 1

Data summary for 5-$HT_{1A}$ and 5-$HT_{2A}$ receptors radioligand competition assays.

| Molecule | 5-$HT_{1A}$, $K_i$ (µM) | 5-$HT_{2A}$, $K_i$ (µM) |
|---|---|---|
| DMSO | >1000 | >1000 |
| tryptophan | >1000 | >1000 |
| serotonin | 0.0025 | N.D. |
| psilocin | N.D. | 0.0257 |
| mescaline | 8.5 | N.D. |
| 2C-B | 0.200 | 0.414 |
| MDMA | 11 | 39.9 |
| escaline | 12.4 | 61 |
| proscaline | 9.4 | 82 |
| fluoxetine | 0.306 | N.D. |
| vortioxetine | 0.0043 | N.D. |
| $A_X$(II) | 108 | 591 |
| $A_X$(V) | 186 | 83 |
| $B_X$(II) | 14 | N.D. |
| $B_X$(V) | 45 | 63 |
| C(III) | 31 | N.D. |

N.D. = not determined

In Vitro Survey of Pharmacological Interaction Profiles at Receptors and Transporters Linked to Targeted Health Conditions.

To expand pharmacological profiling to include a broader range of targets with known involvement in, or connection to, brain neurological disorders, the compound with formula $B_x(V)$ was evaluated with respect to binding and/or interaction at 11 different receptors and transporters. This study was conducted by the contracted research organization (CRO) Eurofins Cerep (Cell L'Evescault, France) using standard assay procedures (https://www.eurofinsdiscovery.com/solution/target-based-assays). Data was generated regarding interaction of derivative molecules with the following 8 G-protein coupled receptors (GPCR) receptors: HTR1A (5-$HTR_{1A}$), HTR2A (5-$HTR_{2A}$), HTR2B (5-$HT_{2B}$), HTR2C (5-$HT_{2C}$), alpha2A ($\alpha_{2A}$), MT1 ($MT_1$), D2 ($D_2$), D3 ($D_3$)) and 3 transporters (SERT, DAT, NET). Assay conditions are summarized in Tables 2 and 3 for GPCR and transporters, respectively. On-site positive controls are routinely applied as part of standard industry practice at Eurofins Cerep (https://www.eurofins.com/contact-us/world-wide-interactive-map/france/eurofins-cerep-france/) to ensure functionality of each assay. To further calibrate each assay specifically for compounds bearing the phenylalkylamine (PAA) structural scaffold, a suite of six, PAA-type calibrator compounds were additionally submitted for assays: MDMA, mescaline, 2C-B, escaline, proscaline, and DOB. Additional tryptamine-type calibrators employed in these assays included serotonin and melatonin. Tryptophan was submitted as a negative control for all assays, as tryptophan is not known to interact with any of the target receptors or transporters. Seven widely marketed pharmaceuticals used in the treatment of mental health disorders with long-established pharmacological profiles were additionally submitted for assay calibration purposes: vortioxetine, trazodone, duloxetine, imipramine, agomelatine, bupropion, and vilazodone. Results for all calibrator compounds, control compounds, and test compounds including the compound with formula $B_x(V)$ are summarized in Table 4.

scintillation counting. Results were expressed as a percent of control-specific binding ([measured specific binding/control-specific binding]*100). Results for the compound with formula $B_x(V)$ are shown in Table 4.

ii. Competition Assay to Measure Binding Affinity at $D_2$ Receptor.

Assays were conducted according to methodology described by Hall and Strange [Brit. J. Pharmacol. 121:731-736, 1997] using conditions summarized in Table 2. As the purpose of this experiment was to gauge general binding potential of test ligand, rather than obtain detailed binding information yielding $K_i$ values, only a single concentration of test ligand was used (10 µM). Briefly, HEK-293 cells were used to express recombinant receptor, and membrane preparation was conducted at 4° C. Binding experiments were conducted using 100 µL membrane suspension (~25 µg membrane protein) incubated with 100 mM NaCl, 100 µM GTP, radioligand, cold ligand to ensure specific binding by test ligand, and test molecule (10 µM) in a final volume of 250 µL. Bound and free radioligand were separated by

TABLE 2

Conditions summary for GPCR (receptor) binding assays. Cold ligand is included in assays to ensure only specific binding is evaluated.

| Receptor | Hot ligand Name | Hot ligand Type | Concentration nM | $K_d$ nM | Cold ligand* Name | Cold ligand* µM | Incubation min/° C. |
|---|---|---|---|---|---|---|---|
| alpha2A | [$^3$H]RX 821002 | Antagonist | 1 | 0.8 | (−)epinephrine | 100 | 60/20 |
| $D_2$ | [$^3$H]methylspiperon | Antagonist | 0.3 | 0.1 | butaclamol | 10 | 60/20 |
| $D_3$ | [$^3$H]methylspiperone | Antagonist | 0.25 | 0.25 | (+)butaclamol | 10 | 60/RT |
| MT1 (ML1A) | [$^{125}$I]2-iodomelatonin | Agonist | 0.01 | 0.04 | melatonin | 1 | 240/20 |
| 5-HT$_{1A}$ | [$^3$H]8-OH-DPAT | Agonist | 0.5 | 0.5 | 8-OH-DPAT | 10 | 60/RT |
| 5-HT$_{2A}$ | [$^{125}$I](±)DOI | Agonist | 0.1 | 0.3 | (±)DOI | 1 | 60/RT |
| 5-HT$_{2B}$ | [$^3$H]mesulergine | Antagonist | 2 | 2.4 | SB206553 | 10 | 60/20 |
| 5-HT$_{2C}$ | [$^{125}$I](±)DOI | Agonist | 0.1 | 0.9 | (±)DOI | 10 | 60/37 |

TABLE 3

Conditions summary for transporter binding assays. Cold ligand is included in assays to ensure only specific binding is evaluated.

| Transporter | Hot ligand Name | Hot ligand Type | Concentration nM | $K_d$ nM | Cold ligand* Name | Cold ligand* µM | Incubation min/° C. |
|---|---|---|---|---|---|---|---|
| SERT | [$^3$H]imipramine | Antagonist | 2 | 1.7 | imipramine | 10 | 60/RT |
| NET | [$^3$H]nisoxetine | Antagonist | 1 | 2.9 | desipramine | 1 | 120/4 |
| DAT | [$^3$H]BTCP | Antagonist | 4 | 4.5 | BTCP | 10 | 120/4 | i. Competition Assay to Measure Binding Affinity at alpha2A Receptor.

Assays were conducted according to methodology described by Langin et al., [Eur. J. Pharmacol. 167:95-104, 1989] using conditions summarized in Table 2. As the purpose of this experiment was to gauge general binding potential of test ligand, rather than obtain detailed binding information yielding $K_i$ values, only a single concentration of test ligand was used (10 µM). Briefly, CHO cells were used to express recombinant receptor, and membrane preparation was conducted at 4° C. Binding experiments were conducted using 100 µL membrane suspension incubated with radioligand, cold ligand to ensure specific binding by test ligand, and test molecule (10 µM) in 400 µL final volume of Tris-Mg$^{2+}$ buffer. Incubations were quenched with the addition of 4 mL ice cold washing buffer (10 mM Tris-HCl, 0.5 mM MgCl$_2$). Bound and free radioligand were separated by filtration through GF/C Whatman filters under vacuum. The filters were then washed and subjected to filtration through GF/C Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

iii. Competition Assay to Measure Binding Affinity at $D_3$ Receptor.

Assays were conducted according to methodology described by Mackenzie et al., [Eur. J. Pharmacol. 266:79-85, 1994] using conditions summarized in Table 2. As the purpose of this experiment was to gauge general binding potential of test ligand, rather than obtain detailed binding information yielding $K_i$ values, only a single concentration of test ligand was used (10 µM). Briefly, CHO cells were used to express recombinant receptor, and membrane preparation was conducted at 4° C. Binding experiments were conducted using 100 µL membrane suspension, radioligand, cold ligand to ensure specific binding by test ligand, and test molecule (10 µM) in a final volume of 400 µL. Bound and free radioligand were separated by filtration through GF/C Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

iv. Competition Assay to Measure Binding Affinity at $MT_1$ Receptor.

Assays were conducted according to methodology described by Witt-Endersby and Dubocovich [Mol. Pharmacol. 50:166-174, 1996] using conditions summarized in Table 2. As the purpose of this experiment was to gauge general binding potential of test ligand, rather than obtain detailed binding information yielding $K_i$ values, only a single concentration of test ligand was used (10 µM). Briefly, CHO cells were used to express recombinant receptor, and membrane preparation was conducted at 4° C. Binding experiments were conducted using 100 µL membrane suspension, radioligand, cold ligand to ensure specific binding by test ligand, and test molecule (10 µM) in a final volume of 500 µL. Bound and free radioligand were separated by filtration through GF/C Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

v. Competition Assay to Measure Binding Affinity at $5\text{-}HT_{1A}$ Receptor.

Assays were conducted according to methodology described by Mulheron et al., [J. Biol. Chem. 269: 12954-12962, 1994] using conditions summarized in Table 2. As the purpose of this experiment was to gauge general binding potential of test ligand, rather than obtain detailed binding information yielding $K_i$ values, only a single concentration of test ligand was used (10 µM). Briefly, HEK-293 cells were used to express recombinant receptor, and membrane preparation was conducted at 4° C. Binding experiments were conducted using radioligand, 30 µg protein (membrane suspension), cold ligand to ensure specific binding by test ligand, and test molecule (10 µM) to final volume of 200 µL. Bound and free radioligand were separated by filtration through glass fiber Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

vi. Competition Assay to Measure Binding Affinity at $5\text{-}HT_{2A}$ Receptor.

Assays were conducted according to the methodology described by Bryant et al., [Life Sci. 15:1259-1268, 1996] using conditions summarized in Table 2. Briefly, HEK-293 cells were used to express recombinant receptor, and membrane preparation was conducted at 4° C. Binding experiments were conducted using radioligand, 30 µg protein (membrane suspension), cold ligand to ensure specific binding by test ligand, and test molecule (10 µM) to final volume of 300 µL. Bound and free radioligand were separated by filtration through glass fiber Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

vii. Competition Assay to Measure Binding Affinity at $5\text{-}HT_2B$ Receptor.

Assays were conducted according to methodology described by Kursar et al., [Mol. Pharmacol. 46: 227-234, 1994] using conditions summarized in Table 2. As the purpose of this experiment was to gauge general binding potential of test ligand, rather than obtain detailed binding information yielding $K_i$ values, only a single concentration of test ligand was used (10 µM). Briefly, CHO cells were used to express recombinant receptor, and membrane preparation was conducted at 4° C. Binding experiments were conducted using radioligand, 0.2 mL (~100 µg protein) membrane suspension, cold ligand to ensure specific binding by test ligand, and test molecule (10 µM) in 50 mM Tris pH 7.4. Bound and free radioligand were separated by filtration through glass fiber Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

viii. Competition Assay to Measure Binding Affinity at $5\text{-}HT_{2C}$ Receptor.

Assays were conducted according to methodology described by Bryant et al., [Life Sci. 15: 1259-1268, 1996] using conditions summarized in Table 2. As the purpose of this experiment was to gauge general binding potential of test ligand, rather than obtain detailed binding information yielding $K_i$ values, only a single concentration of test ligand was used (10 µM). Briefly, HEK-293 cells were used to express recombinant receptor, and membrane preparation was conducted at 4° C. Binding experiments were conducted using radioligand, 0.2 mL (~100 µg protein) membrane suspension, cold ligand to ensure specific binding by test ligand, and test molecule (10 µM) to final volume of 800 µL with 3 mM $CaCl_2$), 0.1% sodium ascorbate, and 50 mM Tris pH 7.4. Bound and free radioligand were separated by filtration through glass fiber Whatman filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

ix. Competition Assay to Measure Binding Affinity at Serotonin Transporter (SERT).

Assays were conducted according to methodology described by Tatsumi et al., [Eur. J. Pharmacol. 368: 277-283, 1999] using conditions summarized in Table 3. As the purpose of this experiment was to gauge general binding potential of test ligand, rather than obtain detailed binding information yielding $K_i$ values, only a single concentration of test ligand was used (10 µM). Briefly, CHO cells were used to express recombinant transporter, and membrane preparation was conducted at 4° C. Binding experiments were conducted using radioligand, 30 µg protein (membrane suspension), cold ligand to ensure specific binding by test ligand, and test molecule (10 µM) to final volume of 200 µL. Bound and free radioligand were separated by filtration through Whatman glass fibre filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

x. Competition Assay to Measure Binding Affinity at Norepinephrine Transporter (NET).

Assays were conducted according to methodology described by Pacholczyk et al., [Nature 350: 350-354, 1991] using conditions summarized in Table 3. As the purpose of this experiment was to gauge general binding potential of test ligand, rather than obtain detailed binding information yielding $K_i$ values, only a single concentration of test ligand was used (10 μM). Briefly, CHO cells were used to express recombinant transporter, and membrane preparation was conducted at 4° C. Binding experiments were conducted using radioligand, 30 μg protein (membrane suspension), cold ligand to ensure specific binding by test ligand, and test molecule (10 μM) to final volume of 200 μL. Bound and free radioligand were separated by filtration through Whatman glass fibre filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

xi. Competition Assay to Measure Binding Affinity at Dopamine Transporter (DAT).

Assays were conducted according to methodology described by Pristupa et al., [Mol. Pharmacol. 45: 125-135, 1994] using conditions summarized in Table 3. As the purpose of this experiment was to gauge general binding potential of test ligand, rather than obtain detailed binding information yielding $K_i$ values, only a single concentration of test ligand was used (10 μM). Briefly, CHO cells were used to express recombinant transporter, and membrane preparation was conducted at 4° C. Binding experiments were conducted using radioligand, 50 μg protein (membrane suspension), cold ligand to ensure specific binding by test ligand, and test molecule (10 μM) to final volume of 200 μL. Bound and free radioligand were separated by filtration through Whatman glass filters under vacuum. The filters were then washed and subjected to scintillation counting. Results were expressed as a percent of control-specific binding ([measured specific binding/control-specific binding]*100). Results for the compound with formula $B_x(V)$ are shown in Table 4.

Figure 8:
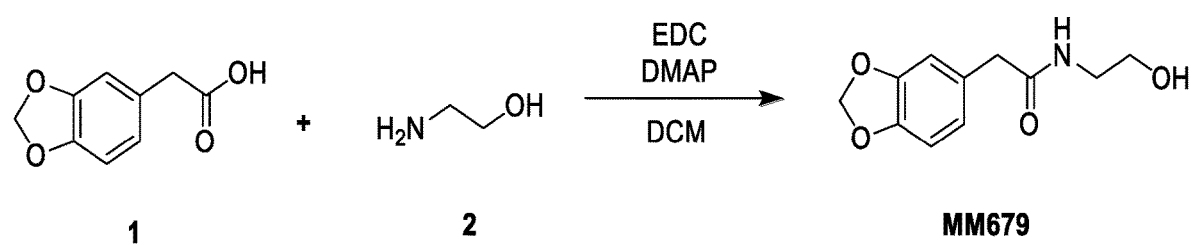
FIG. 8 depicts a further example reaction for the synthesis of another example compound according to the present disclosure.

Example 5—Preparation of a Fifth Substituted Ethylamine Fused Heterocyclic Mescaline Derivative Referring to FIG. 8, compound 1 (500 mg, 2.78 mmol) was dissolved in DCM (10.0 mL). Added to this solution was 1-(3-dimethylaminopropyl)-3-ethylcarbodiimide hydrochloride (EDC·HCl) (616 mg, 3.05 mmol), triethylamine (778 μL, 5.55 mmol) and 4-dimethylaminopyridine (DMAP) (34 mg, 278 μmol). The mixture was left to stir for 20 minutes and then 2 (186 μL, 3.05 mmol) was added. After stirring overnight, a new spot was observed by TLC (UV, DCM:MeOH 9:1) and the reaction mixture was poured into a separatory funnel containing 25 mL water and 25 mL EtOAc. The aqueous phase was extracted with EtOAc (3×25 mL), all organic layers were combined, washed with saturated sodium bicarbonate solution (2×50 mL), brine, dried over magnesium sulfate and concentrated under vacuum. The resulting crude material was purified by FC on silica gel (12 g, MeOH/DCM 0:100 to 10:90) to provide MM679 (140 mg, 23%) as a white solid. HRMS-HESI: calc'd for $C_{11}H_{14}NO_4$ $[M+H]^+$ 224.0917; observed: 224.0919. $^1$H NMR (400 MHz, CDCl$_3$) δ 6.79 (d, J=7.8 Hz, 1H), 6.75 (d, J=1.8 Hz, 1H), 6.70 (dd, J=7.8 Hz, 1.8 Hz, 1H), 5.96 (s, 2H), 5.92 (br s, 1H), 3.70-3.67 (m, 2H), 3.51 (s, 2H), 3.40-3.37 (m, 2H). (FIG. 8, see: further also chemical reaction (e) in FIG. 3A).

Figure 9A:
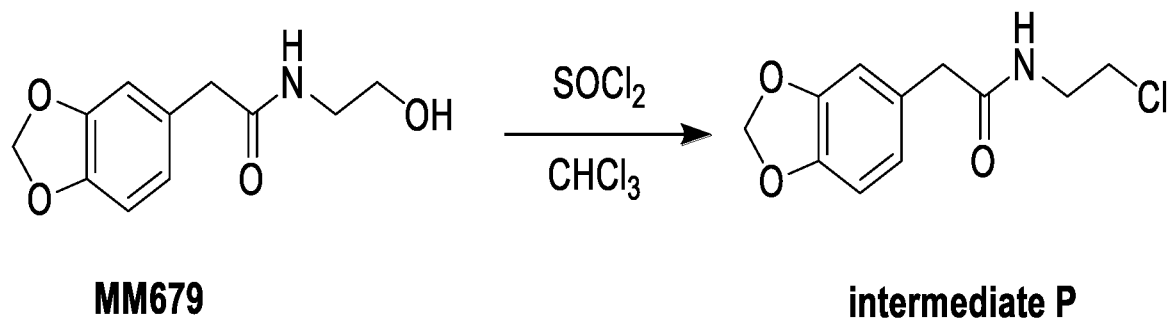
FIGS. 9A and 9B depict further example chemical reactions for the synthesis of another example compound according to the present disclosure.

Referring to FIG. 9A, compound MM679 (200 mg, 896 μmol) was suspended in CHCl$_3$ (4.5 mL). Added to this was thionyl chloride (198 μL, 2.69 mmol), and the resulting mixture was left to stir at room temperature overnight. TLC (UV, DCM:MeOH 9:1) showed complete conversion of the starting material to a new material. The remaining thionyl chloride was quenched with the addition of 1 mL of water and the entire mixture was poured into a separatory funnel containing 15 mL of water. The aqueous phase was extracted with DCM (3×15 mL). All organic layers were combined, washed with brine, dried (MgSO$_4$), filtered and concentrated. The resulting white solid, intermediate P (163 mg, 75%), was used in the next step without further purification. $^1$H NMR (400 MHz, CDCl$_3$) δ 6.80 (d, J=7.8 Hz, 1H), 6.75 (d, J=1.8 Hz, 1H), 6.71 (dd, J=7.8 Hz, 1.8 Hz, 1H), 5.97 (s,

TABLE 4

Results for GPCR and transporter competition-based binding assays.
Data is shown as percent of control-specific binding.

| Compound | HT1A | HT2A | HT2B | HT2C | α-2A | $D_2$ | $D_3$ | MT1 | SERT | DAT | NET |
|---|---|---|---|---|---|---|---|---|---|---|---|
| MDMA | 68 | 74 | 85 | 96 | 27 | −10 | 18 | 1 | 46 | 28 | 3 |
| Mescaline | 65 | 79 | 80 | 95 | 57 | 3 | −13 | 6 | −6 | −1 | −9 |
| 2C-B | 96 | 98 | 99 | 98 | 88 | 42 | 43 | 86 | 42 | 5 | 13 |
| Escaline | 44 | 84 | 81 | 95 | 45 | 5 | 0 | 0 | 0 | 0 | 6 |
| Proscaline | 71 | 91 | 85 | 97 | 40 | −11 | 4 | 3 | 23 | −2 | −9 |
| DOB | 75 | 100 | 97 | 98 | 66 | 9 | 25 | −3 | 53 | 3 | 6 |
| Serotonin | 100 | 100 | 96 | 102 | 18 | 15 | 73 | 7 | 80 | 8 | −3 |
| Melatonin | 46 | −1 | 52 | 19 | −7 | −20 | 2 | 98 | 7 | 4 | −2 |
| Tryptophan | 6 | −1 | 0 | 25 | −4 | −19 | −23 | −2 | 1 | 1 | 1 |
| Vortioxetine | 99 | 90 | 97 | 99 | 62 | 51 | 88 | 26 | 101 | 90 | 99 |
| Trazodone | 97 | 100 | 97 | 93 | 91 | 61 | 89 | 14 | 93 | 24 | −1 |
| Duloxetine | 95 | 95 | 95 | 92 | 54 | 24 | 66 | 23 | 100 | 94 | 99 |
| Imipramine | 34 | 97 | 94 | 98 | 57 | 82 | 92 | 29 | 98 | 23 | 99 |
| Agomelatine | 58 | 61 | 93 | 92 | 2 | −4 | 6 | 99 | 30 | 1 | 1 |
| Bupropion | −1 | 12 | −2 | 1 | 2 | −5 | 3 | 83 | 25 | 92 | 12 |
| Vilazodone | 99 | 94 | 96 | 92 | 65 | 97 | 99 | 84 | 100 | 98 | 99 |
| $A_x(II)$ | 3 | 0 | 5 | 0 | 0 | 0 | 0 | 5 | 2 | 5 | 0 |
| $A_x(V)$ | 2 | 2 | 30 | 16 | 0 | 0 | 8 | 55 | 0 | 71 | 13 |
| $B_x(II)$ | 36 | 10 | 38 | 52 | 19 | 6 | 14 | 0 | 81 | 79 | 9 |
| $B_x(V)$ | 17 | 13 | 41 | 42 | 24 | 12 | 19 | 9 | 46 | 78 | 47 |
| $C(III)$ | 24 | 0 | 19 | 12 | 19 | 0 | 10 | 12 | 0 | 19 | 0 |

2H), 5.83 (br s, 1H), 3.61-3.53 (m, 4H), 3.51 (s, 2H). (FIG. 9A, see: further also chemical reaction (i) in FIG. 3A).

Figure 9B:
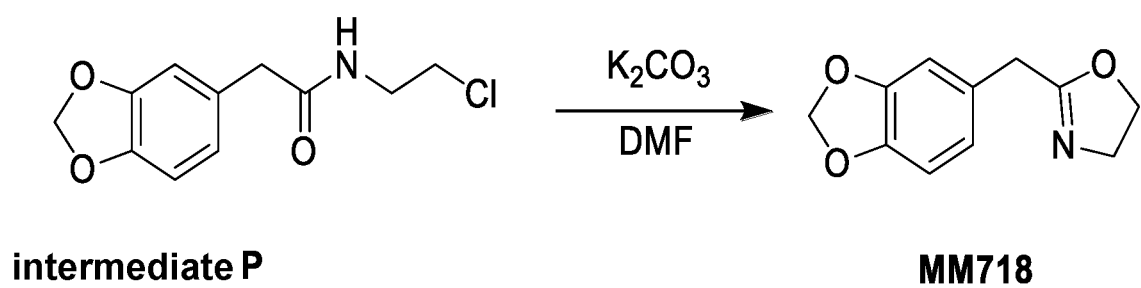

Referring next to FIG. 9B, added to a vial was intermediate P (50.0 mg, 207 µmol) and potassium carbonate (28.6 mg, 207 µmol) followed by DMF (1.0 mL). The mixture was left to stir at room temperature overnight and in the morning was checked (TLC-UV, DCM:MeOH 9:1). No conversion had occurred, and the temperature was increased to 50° C. for 8 hours. At the end of this period a new spot was observed on TLC (UV, DCM:MeOH 9:1). Conversion was estimated to be ~50% and so the mixture was cooled back to room temperature and left to stir for 72 h. The mixture was poured into a separatory funnel containing 15 mL of water and 15 mL of EtOAc, the aqueous layer was extracted with EtOAc (3×15 mL), washed with water, brine, dried (MgSO$_4$), filtered and concentrated. The resulting crude material was subjected to purification by FC on silica gel (4 g, DCM/MeOH 100:0 to 90:10) to provide MM718 (25.0 mg, 59%) as a light brown oil. LRMS-HESI: calc'd for C$_{11}$H$_{12}$NO$_3$ [M+H]$^+$ 206.08 m/z; observed 206.09. $^1$H NMR (400 MHz, CDCl$_3$) δ 6.80 (br s, 1H), 6.75-6.74 (m, 2H), 5.93 (s, 2H), 4.24 (t, J=9.5 Hz, 2H), 3.86-3.81 (m, 2H), 3.52 (br s, 2H). (FIG. 9A), see: further also chemical reaction (i) in FIG. 3A).

It is noted that MM718 corresponds with chemical compound C(III):

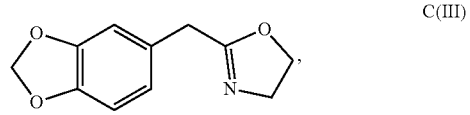 [SMILES: c1cc2c(cc1CC1=NCCO1)OCO2]

C(III)

set forth herein.

5-HT receptor radioligand competition assays. Activity at the 5-HT$_{1A}$ receptor was assessed as described for Example 4, except the compound with formula C(III) was evaluated in place of the compound with formula B$_x$(V). Table 1 shows radioligand competition assay results for positive controls, negative controls, and compound with formula C(III), in the form of K$_i$ values. In view of results for both positive and negative controls, wherein negative controls yield data insufficient for reliable K$_i$ calculations (i.e., K$_i$>1000 µM), the K$_i$ value obtained for the compound with formula C(III) at the 5-HT$_{1A}$ receptor (31 µM, Table 1) indicates ligand-receptor binding.

In Vitro Survey of Pharmacological Interaction Profiles at Receptors and Transporters Linked to Targeted Health Conditions.

The compound with formula C(III) was evaluated with respect to binding and/or interaction at 11 different receptors and transporters with known or suspected connections to mental health conditions and/or neurological pathologies. This study was conducted by the contracted research organization (CRO) Eurofins Cerep (Cell L'Evescault, France) using standard assay procedures (https://www.eurofinsdiscovery.com/solution/target-based-assays). Data was generated regarding interaction of derivative molecules with the following 8 GPCR receptors: HTR1A (5-HT$_{1A}$), HTR2A (5-HT$_{2A}$), HTR2B (5-HT$_{2B}$), HTR2C (5-HT$_{2C}$), alpha2A ($\alpha_{2A}$), D2 (D$_2$), D3 (D$_3$), MT1 (MT$_1$)) and 3 transporters (SERT, DAT, NET). Assays were conducted using the same materials and procedures outlined in Example 4, except the compound with formula C(III) was used in place of the compound with formula B$_x$(V). Overall assay conditions are summarized in Tables 2 and 3 for GPCR and transporters, respectively. Results for all calibrator compounds, control compounds, and test compounds including the compound with formula C(III) are summarized in Table 4.

Figure 10:
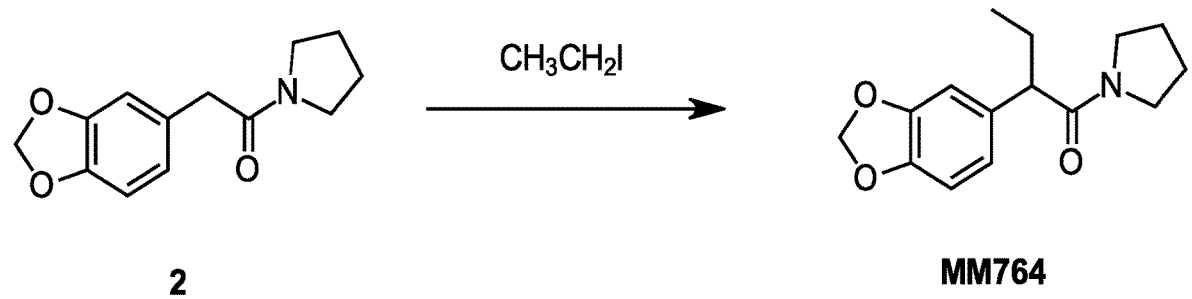
FIG. 10 depicts a further example reaction for the synthesis of another example compound according to the present disclosure.

Example 6—Preparation of a Sixth Substituted Ethylamine Fused Heterocyclic Mescaline Derivative Referring to FIG. 10, a solution of 2 (250 mg, 1.07 mmol) (prepared as described in Example 1) in THF (857 µL) was added in dropwise manner to a −78° C. solution of freshly prepared lithium diisopropyl amide (prepared in this manner: A solution of diisopropylamine (173 µL, 1.23 mmol) in THF (3.43 mL) was cooled down to −78° C. followed by dropwise addition of 2.5 M n-butyllithium solution (472 µL, 1.18 mmol) this was stirred at −78° C. for one hour). After addition of 2 the resulting mixture was warmed to 0° C. and stirred for 1 hour. Finally, iodoethane (131 µL, 1.61 mmol) was added and the reaction was warmed up to rt and stirred overnight. The reaction was quenched by adding sat NH$_4$Cl. The reaction mixture was then concentrated in vacuo, redissolved in EtOAc and water, and the aqueous phase was extracted with EtOAc. The combined organic layers were washed with brine, dried over Na$_2$SO$_4$, filtered, and concentrated in vacuo. The material was purified on silica gel using 6:4 Hex:EtOAc to afford MM764 (158 mg, 56%) (racemic mixture) as a light brown oil. LRMS-HESI: calc'd for C$_{15}$H$_{20}$NO$_3$ [M+H]$^+$ 262.14 m/z, observed 262.11. $^1$H NMR (400 MHz, CDCl$_3$) δ 6.87 (t, J=1.1 Hz, 1H), 6.73 (d, J=1.0 Hz, 2H), 5.92 (q, J=14 Hz, 2H), 3.56-3.44 (m, 2H), 3.39 (dt, J=20.0, 7.4 Hz, 2H), 3.29 (ddd, J=10.1, 7.2, 5.7 Hz, 1H), 2.12-1.99 (m, 1H), 1.98-1.63 (m, 5H), 0.85 (t, J=7.4 Hz, 3H). (FIG. 10, see: further also chemical reaction (b) in FIG. 3A).

It is noted that MM764 corresponds with chemical compound A$_x$(IV):

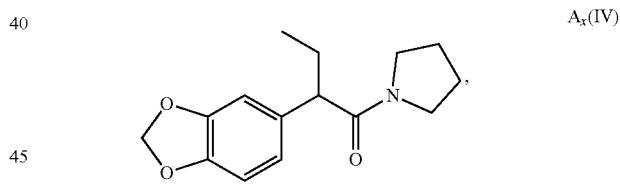

A$_x$(IV)

set forth herein.

Figure 11:
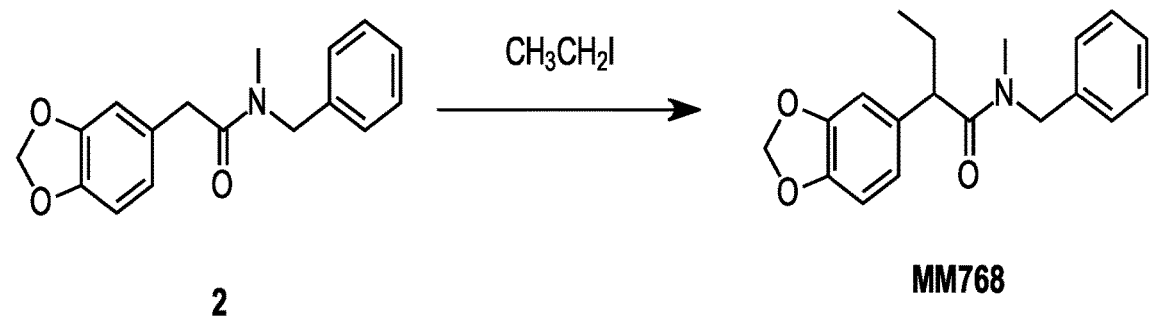
FIG. 11 depicts a further example reaction for the synthesis of another example compound according to the present disclosure.

Example 7—Preparation of a Seventh Substituted Ethylamine Fused Heterocyclic Mescaline Derivative Referring to FIG. 11, a solution of 2 (650 mg, 2.29 mmol) (prepared as described in Example 2) in THF (1.84 mL) was added in dropwise manner to a −78° C. solution of freshly prepared lithium diisopropyl amide (prepared in this manner: A solution of diisopropylamine (370 µL, 1.23 mmol) in THF (7.34 mL) was cooled down to −78° C. followed by dropwise addition of 2.5 M n-butyllithium solution (1.01 mL, 2.52 mmol) this was stirred at −78° C. for one hour). After addition of 2 the resulting mixture was warmed to 0° C. and stirred for 1 hour. Finally, iodoethane (279 µL, 3.44 mmol) was added and the reaction was warmed up to rt and stirred overnight. The reaction was quenched by adding sat NH$_4$Cl. The reaction mixture was then concentrated in vacuo, redissolved in EtOAc and water, and the aqueous phase was extracted with EtOAc. The combined organic layers were washed with brine, dried over Na$_2$SO$_4$, filtered, and concentrated in vacuo. The material was purified on silica gel using 6:4 Hex:EtOAc to afford MM768 (520 mg, 73%) (racemic mixture) as a light brown oil. LRMS-HESI: calc'd for C$_{19}$H$_{22}$NO$_3$ [M+H]$^+$ 312.16 m/z, observed 312.15. $^1$H NMR (400 MHz, CDCl$_3$) δ 7.37-7.19 (m, 3H), 7.18-7.11 (m, 1H), 710-7.03 (m, 1H), 6.89-6.81 (m 1H), 679-6.63 (m, 2H), 5.93 (d, J=4.3 Hz, 2H), 4.76-4.61 (m, 1H), 4.58-4.19 (m, 1H), 3.52 (dt, J=31.5, 7.3 Hz, 1H), 2.90 (d, J=31.0 Hz, 3H), 2.20-2.00 (m, 1H), 1.72 (dtd, J=18.9, 14.2, 7.2 Hz, 1H), 0.86 (dt, J=27.4, 7.3 Hz, 3H). NOTE the peak reporting includes observations of rotameric isomers for this compound. (FIG. 11, see: further also chemical reaction (b) in FIG. 3A).

It is noted that MM768 corresponds with chemical compound A$_x$(VIII):

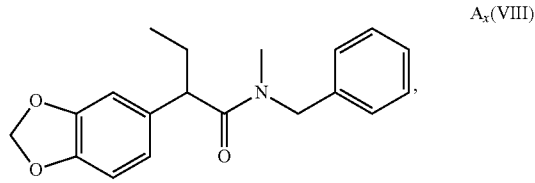 [SMILES: CCC(C(=O)N(C)Cc1ccccc1)c1ccc2c(c1)OCO2]

A$_x$(VIII)

set forth herein.

Figure 12A:
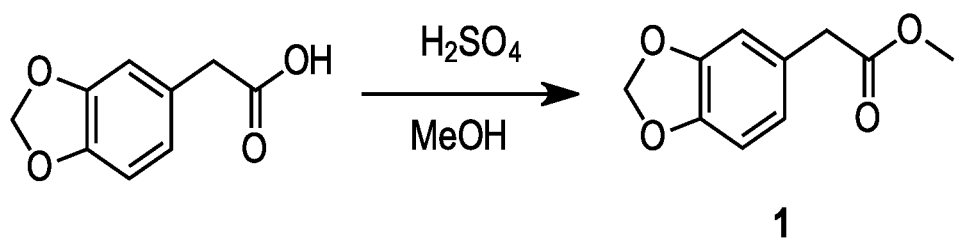
FIGS. 12A, 12B, 12C, and 12D depict further example chemical reactions for the synthesis of another example compound according to the present disclosure.

Example 8—Preparation of an Eighth Substituted Ethylamine Fused Heterocyclic Mescaline Derivative Referring to FIG. 12A, 3,4-(methylenedioxy)phenylacetic acid (15.0 g, 83.3 mmol) was dissolved in MeOH (150 mL) followed by the addition of sulfuric acid (2.25 mL, 42.2 mmol). The resulting solution was then heated at 70° C. for 4 h. The reaction was concentrated in vacuo, and the resulting residue was dissolved in EtOAc and neutralized with sat. NaHCO$_3$. The organic layer was washed with brine, dried over Na$_2$SO$_4$, filtered and concentrated in vacuo to afford the 1, as a light yellow oil which was used in the next step without further purification. $^1$H NMR (400 MHz, CDCl$_3$) δ 6.78 (d, J=1.7 Hz, 1H), 6.77-6.73 (m, 1H), 6.72-6.69 (m, 1H), 5.93 (s, 2H), 3.68 (s, 3H), 3.53 (s, 2H). (FIG. 12A, see: further also chemical reaction (a) in FIG. 3D).

Figure 12B:
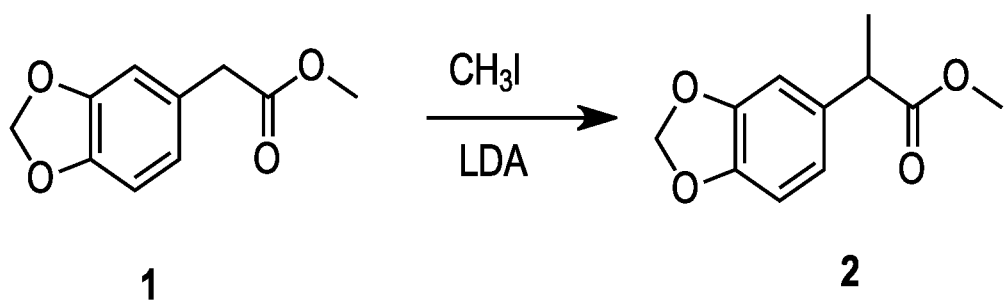

Referring next to FIG. 12B, a solution of diisopropylamine (4.15 mL, 29.6 mmol) in THF (80 mL) was cooled down to −78° C. To this solution was added 2.5 M n-butyllithium solution (11.3 mL, 28.3 mmol) dropwise, and the resulting mixture was stirred at −78° C. for 1 h. A solution of 1 (5.00 g, 25.7 mmol) in THF (20 mL) was added dropwise, and the reaction mixture was warmed up to 0° C. and stirred for 1 h. At this time, iodomethane (2.42 mL, 38.6 mmol) was added and the reaction was warmed up to RT and stirred for 3 h. The reaction was quenched by adding sat. aq. NH$_4$Cl. The volatiles were removed under reduced pressure. The residue was taken up in H$_2$O and extracted with EtOAc three times. The combined organic layers were washed with brine, dried over anhydrous Na$_2$SO$_4$, filtered, and concentrated to afford 2 as a crude product which was used in the next step without further purification. $^1$H NMR (400 MHz, CDCl$_3$) δ 6.84-6.78 (m, 1H), 6.74 (t, J=0.9 Hz, 2H), 5.93 (s, 2H), 3.69-3.60 (m, 4H), 1.45 (d, J=7.2 Hz, 3H). (FIG. 12B, see: further also chemical reaction (b) in FIG. 3D).

Figure 12C:
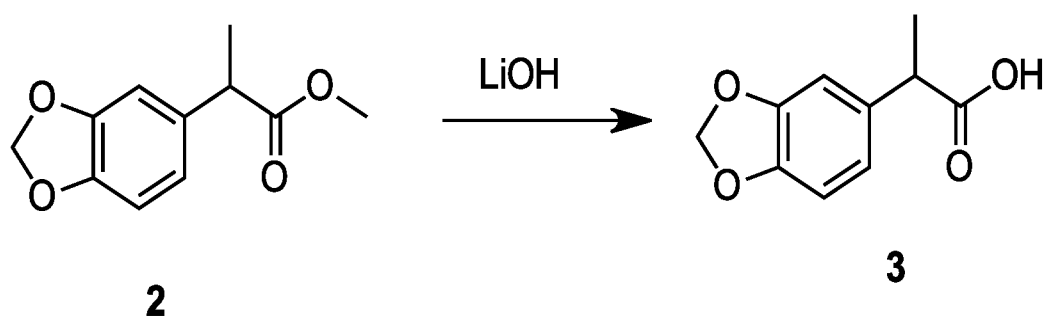

Referring next to FIG. 12C, a solution of 2 (2.50 g, 12.0 mmol) in MeOH (2.86 mL) and H$_2$O (20 mL) was cooled to 0° C. To this was added a solution of lithium hydroxide (1.44 g, 60.0 mmol) in THF (42.9 mL). The mixture was warmed up to RT and stirred at this temperature for 2 hours. The volatiles (THF/methanol) were removed under reduced pressure. The remaining aq. mixture was washed with DCM (2×), then acidified to pH-2 by adding conc. HCl. This aq. mixture was extracted with DCM (4×). The combined organic layers were washed with brine, dried over anhydrous Na$_2$SO$_4$, filtered, and concentrated to afford 3 as a crude product which was used in the next step without further purification. $^1$H NMR (400 MHz, CDCl$_3$) δ 6.83 (t, J=1.2 Hz, 1H), 6.78-6.74 (m, 2H), 5.94 (s, 2H), 3.65 (q, J=7.2 Hz, 1H), 1.47 (d, J=7.2 Hz, 3H). (FIG. 12C, see: further also chemical reaction (c) in FIG. 3D).

Figure 12D:
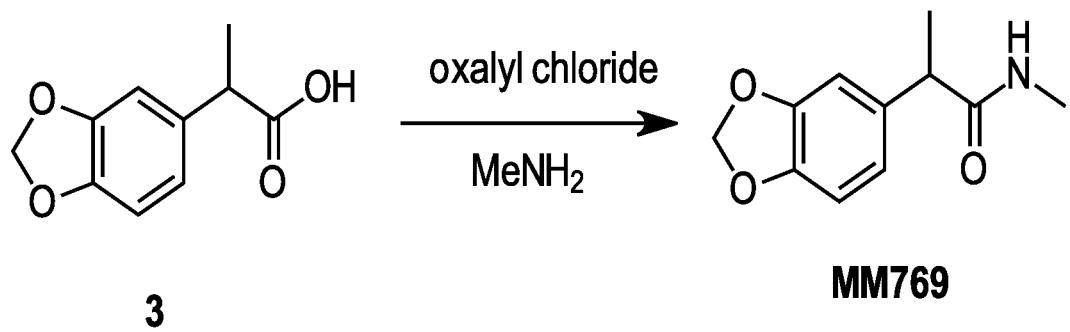

Referring next to FIG. 12D, intermediate 3 (150 mg, 772 μmol) was stirred in oxalyl chloride (400 μL, 4.68 mmol) for an hour. At this point the excess oxalyl chloride was removed under reduced pressure and the material was immediately used in the next step. Added to this was 2.0 M methylamine in THF (3.00 mL, 6.00 mmol) and the mixture was left to stir at room temperature for 30 minutes. At this point, water and EtOAc were added to the reaction mixture, and the aqueous phase was extracted with EtOAc, all organic layers were combined, dried over Na$_2$SO$_4$, filtered, and concentrated to afford racemic MM769 (152 mg, 95%) as a single component. LRMS-HESI: calc'd for C$_{11}$H$_{14}$NO$_3$ [M+H]$^+$ 208.10 m/z, observed 208.06. $^1$H NMR (400 MHz, CDCl$_3$) δ 6.82-6.69 (m, 3H), 5.95 (s, 2H), 5.36 (s, 1H), 347 (q, J=7.2 Hz, 1H), 2.74 (dd, J=4.9, 1.2 Hz, 3H), 1.48 (dd, J=7.2, 1.4 Hz, 3H). (FIG. 12D, see: further also chemical reaction (d) in FIG. 3D).

It is noted that MM769 corresponds with chemical compound A$_x$(I):

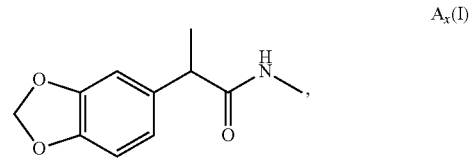

A$_x$(I)

set forth herein.

Figure 13A:
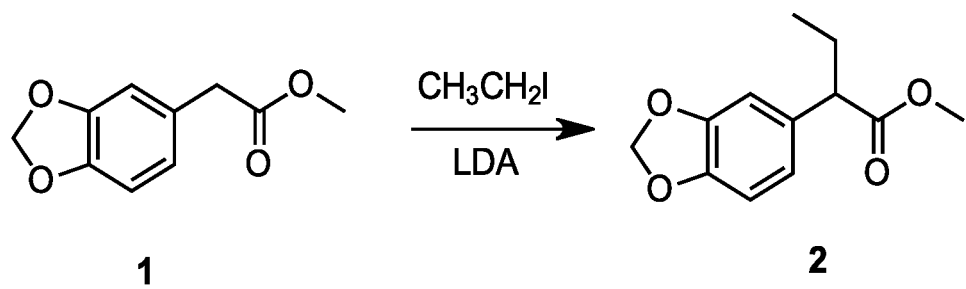
FIGS. 13A, 13B, and 13C depict further example chemical reactions for the synthesis of another example compound according to the present disclosure.

Example 9—Preparation of a Ninth Substituted Ethylamine Fused Heterocyclic Mescaline Derivative Referring to FIG. 13A, a solution of diisopropylamine (166 μL, 1.18 mmol) in THF (3.3 mL) was cooled down to −78° C. To this solution was added 2.5 M n-butyllithium solution (453 μL, 1.13 mmol) dropwise, and the resulting mixture was stirred at −78° C. for 1 h. A solution of 1 (200 mg, 1.03 mmol) (prepared as described in Example 8) in THF (824 μL) was added dropwise, and the reaction mixture was warmed up to 0° C. and stirred for 1 h. At this time, iodoethane (125 μL, 1.54 mmol) was added and the reaction was warmed up to RT and stirred overnight. The reaction was quenched by adding sat. aq. NH$_4$Cl. The reaction mixture was then concentrated in vacuo, redissolved in EtOAc and H$_2$O, the aqueous phase was extracted with EtOAc. All organic layers were combined, washed with brine, dried over Na$_2$SO$_4$, filtered, and concentrated in vacuo. The material was purified on silica gel using 6:4

Hex:EtOAc to afford intermediate 2 (90.0 mg, 39%) as product. (FIG. 13A, see: further also chemical reaction (b) in FIG. 3D).

Figure 13B:
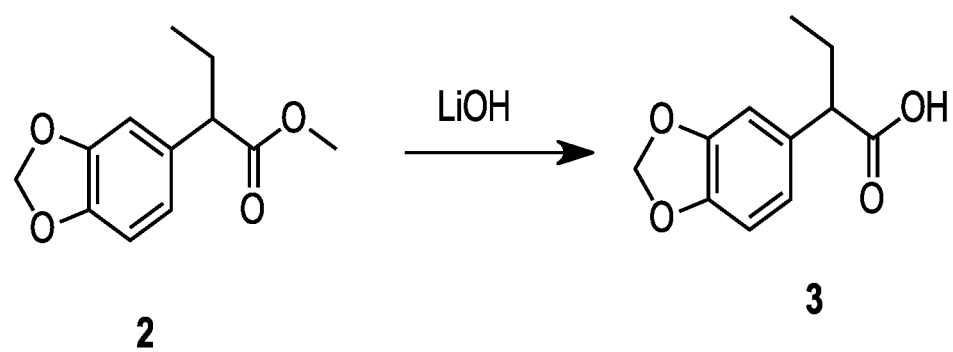

Referring next to FIG. 13B, a solution of 2 (90.0 mg, 405 µmol) in MeOH (96 µL) and H$_2$O (675 µL) was cooled to 0° C. To this was added a solution of lithium hydroxide (48.5 mg, 2.02 mmol) in THF (1.45 mL). The mixture was warmed up to RT and stirred at this temperature for 2 hours. The volatiles (THF/methanol) were removed under reduced pressure. The remaining aq. mixture was washed with DCM (2×), then acidified to pH-2 by adding conc. HCl. This aq. mixture was extracted with DCM (4×). The combined organic layers were washed with brine, dried over anhydrous Na$_2$SO$_4$, filtered, and concentrated to afford intermediate 3 (76.0 mg, 90%), which was used in the next step without further purification. (FIG. 13B, see: further also chemical reaction (c) in FIG. 3D).

Figure 13C:
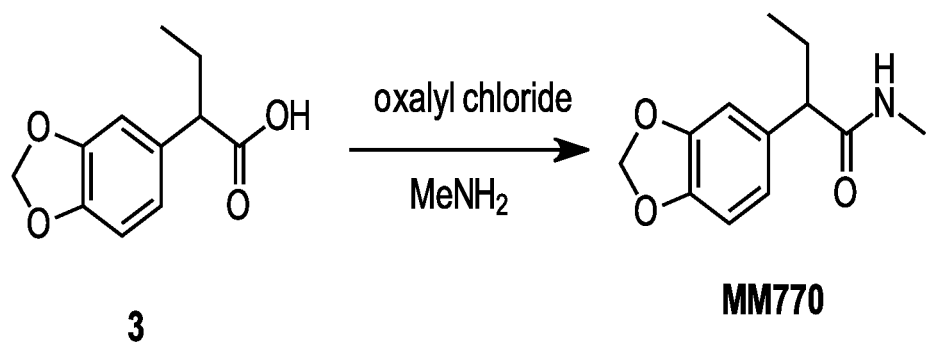

Referring next to FIG. 13C, intermediate 3 (76.0 mg, 365 µmol) was stirred in oxalyl chloride (250 µL, 2.92 mmol) for an hour. At this point the excess oxalyl chloride was removed under reduced pressure and the material was immediately used in the next step. Added to this was 2.0 M methylamine in THF (1.10 mL, 2.19 mmol) and the mixture was left to stir at room temperature for 30 minutes. At this point, water and EtOAc were added to the reaction mixture, and the aqueous phase was extracted with EtOAc, all organic layers were combined, dried over Na$_2$SO$_4$, filtered, and concentrated to afford racemic MM770 (75.8 mg, 94%) as a single component. LRMS-HESI: calc'd for C$_{12}$H$_{16}$NO$_3$ [M+H]$^+$ 222.11 m/z, observed 222.08. $^1$H NMR (400 MHz, CDCl$_3$) δ 6.81 (d, J=1.7 Hz, 1H), 6.78-6.68 (m, 2H), 5.94 (q, J=1.6 Hz, 2H), 5.40 (s, 1H), 3.13 (dd, J=8.5, 6.7 Hz, 1H), 2.75 (d, J=4.9 Hz, 3H), 2.16 (dp, J=14.3, 7.2 Hz, 1H), 1.81-1.65 (m, 1H), 0.85 (t, J=7.4 Hz, 3H). (FIG. 13C, see: further also chemical reaction (d) in FIG. 3D).

It is noted that MM770 corresponds with chemical compound A$_x$(III):

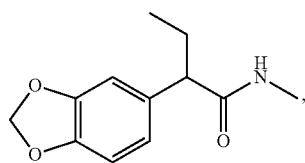

A$_x$(III)

set forth herein.

Figure 14A:
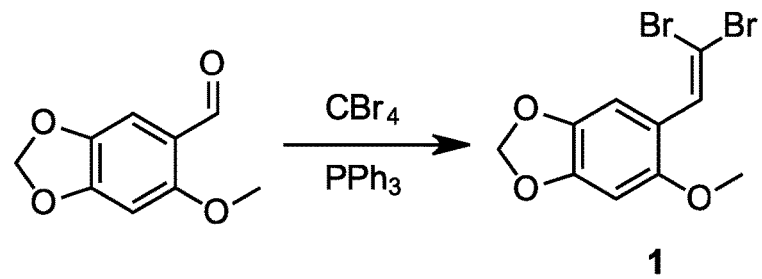
FIGS. 14A, 14B, and 14C depict further example chemical reactions for the synthesis of another example compound according to the present disclosure.

Example 10—Preparation of a Tenth Substituted Ethylamine Fused Heterocyclic Mescaline Derivative Referring to FIG. 14A, carbon tetrabromide (2.85 g, 8.33 mmol) was dissolved in 15 mL of DCM and cooled to 0° C. Slowly added to this, in a drop-wise manner was triphenylphosphine (4.41 g, 16.7 mmol) in 7 mL DCM. This mixture was left to stir for 20 minutes at 0° C. and then a solution of 6-methoxy-1,3-benzodioxole-5-carbaldehyde (750 mg, 4.16 mmol) in 8 mL of DCM was added in a drop-wise manner. The mixture was left at 0° C. for 4 hours. Upon completion, the mixture was slowly added to 150 mL of diethyl ether under rapid stirring. The resulting white precipitate was filtered and the filtrate was washed with water (2×50 mL), brine and dried with MgSO$_4$. The organic layer was concentrated to provide a white solid as a crude mixture. The material was purified on a silica gel column using 0 to 20% EtOAc in Hexanes to afford intermediate 1 (790 mg, 56%) as a white solid. $^1$H NMR (400 MHz, CDCl$_3$) δ 7.54 (s, 1H), 7.31 (s, 1H), 6.50 (s, 1H), 5.95 (s, 2H), 3.78 (s, 3H). (FIG. 14A, see: further also chemical reaction (a) in FIG. 3E).

Figure 14B:
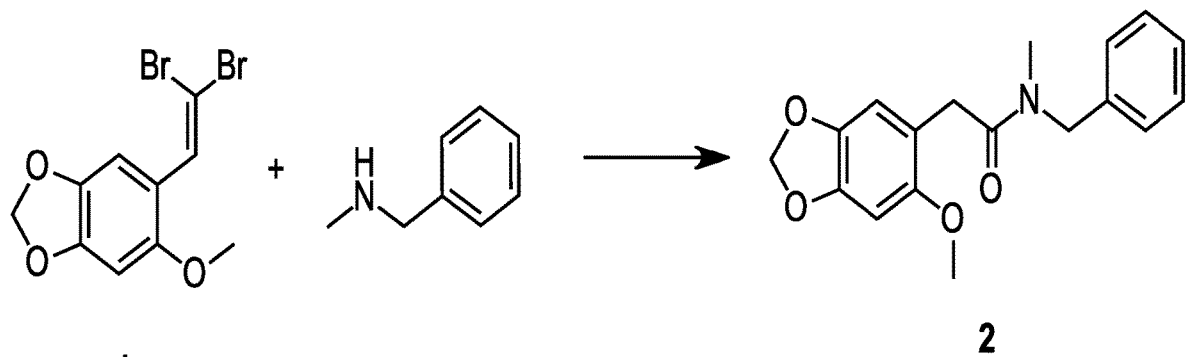

Referring next to FIG. 14B, to a solution of intermediate 1 (450 mg, 1.34 mmol) in DMF (5.06 mL) and H$_2$O (1.69 mL) was added N-benzylmethylamine (2.99 mL, 22.5 mmol). The reaction mixture was heated to 90° C. and left to react overnight. At this point the mixture was partitioned between DCM and 0.1 M HCl$_{(aq)}$. The aqueous phase was extracted with DCM, and all combined organic layers were washed with 0.1 M HCl, brine, dried over Na$_2$SO$_4$ and concentrated. The resulting material was purified on a silica gel column using 10% to 20% MeOH in DCM to afford intermediate 2 (120 mg, 29%). (FIG. 14B, see: further also chemical reaction (b) in FIG. 3E).

Figure 14C:
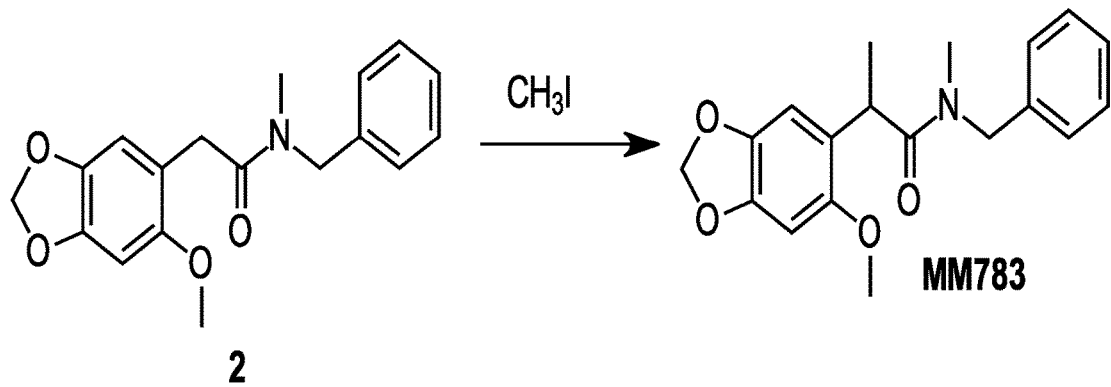

Referring next to FIG. 14C, a solution of diisopropylamine (51.5 µL, 367 µmol) in THF (1.0 mL) was cooled down to −78° C. To this solution was added 2.5 M n-butyllithium solution (140 µL, 351 µmol) dropwise, and the resulting mixture was stirred at −78° C. for 1 h. A solution of intermediate 2 (100 mg, 319 µmol) in THF (255 µL) was added dropwise, and the reaction mixture was warmed up to 0° C. and stirred for 1 h. At this time, iodomethane (30.2 µL, 485 µmol) was added and the reaction was warmed up to RT and stirred overnight. The reaction was quenched by adding sat. aq. NH$_4$Cl. The reaction mixture was then concentrated in vacuo, redissolved in EtOAc and H$_2$O, the aqueous phase was extracted with EtOAc. All organic layers were combined, washed with brine, dried over Na$_2$SO$_4$, filtered, and concentrated. The material was purified on silica gel using 6:4 Hex:EtOAc to afford racemic MM783 (63 mg, 60%) as a light brown oil. LRMS-HESI: calc'd for C$_{19}$H$_{22}$NO$_4$ [M+H]$^+$ 328.15 m/z, observed 328.11 m/z. $^1$H NMR (400 MHz, CDCl$_3$) δ 7.32-7.22 (m, 3H), 7.20-7.15 (m, 1H), 7.04-6.96 (m, 1H), 6.87 (d, J=29.6 Hz, 1H), 6.46 (d, J=38.3 Hz, 1H), 5.90 (d, J=1.3 Hz, 2H), 4.67-4.25 (m, 3H), 3.71 (d, J=45.0 Hz, 3H), 2.84 (d, J=45.3 Hz, 3H), 136 (dd, J=10.4, 6.8 Hz, 3H). NOTE the peak reporting includes observations of rotameric isomers for this compound. (FIG. 14C, see: further also chemical reaction (c) in FIG. 3E).

It is noted that MM783 corresponds with chemical compound A$_x$(IX):

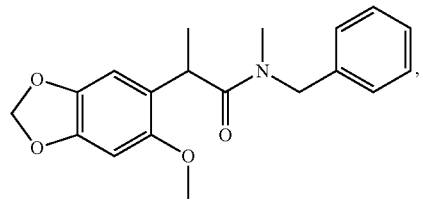

A$_x$(IX)

set forth herein.

Figure 15A:
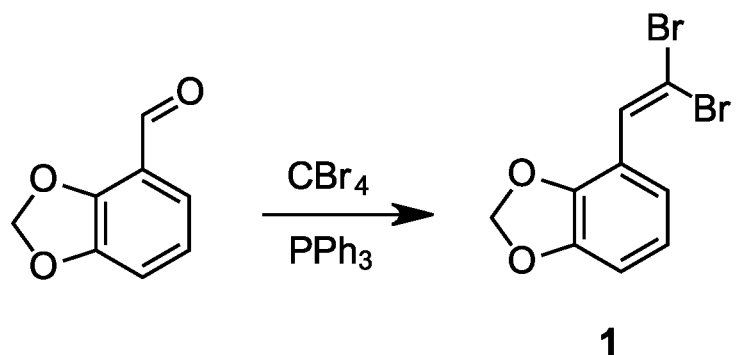
FIGS. 15A, 15B, and 15C depict further example chemical reactions for the synthesis of another example compound according to the present disclosure.

Example 11—Preparation of an Eleventh Substituted Ethylamine Fused Heterocyclic Mescaline Derivative Referring to FIG. 15A, carbon tetrabromide (3.42 g, 9.99 mmol) was dissolved in 15 mL of DCM and cooled to 0° C. Slowly added to this, in a drop-wise manner was triphenylphosphine (5.29 g, 20.0 mmol) in 8 mL DCM. This mixture was left to stir for 20 minutes at 0° C. and then a solution of 2,3-(methylenedioxy)benzaldehyde (750 mg, 5.00 mmol) in 8 mL of DCM was added in a drop-wise manner. The mixture was left at 0° C. for 4 hours. Upon completion, the mixture was slowly added to 150 mL of diethyl ether under rapid stirring. The resulting white precipitate was filtered and the filtrate was washed with water (2×50 mL), brine and dried with MgSO$_4$. The organic layer was concentrated to provide a white solid as a crude mixture. The material was purified on a silica gel column using 0 to 20% EtOAc in hexanes to afford intermediate 1 (1.10 g, 72%) as a white solid. (FIG. 15A, see: further also chemical reaction (a) in FIG. 3F).

Figure 15B:
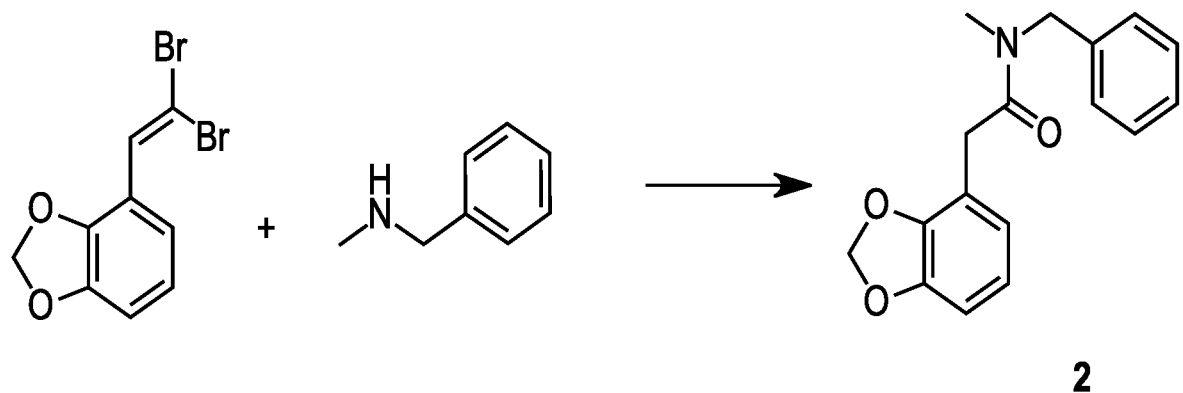

Referring next to FIG. 15B, to a solution of intermediate 1 (450 mg, 1.47 mmol) in DMF (5.56 mL) and H$_2$O (1.85 mL) was added N-benzylmethylamine (2.99 mL, 22.5 mmol). The reaction mixture was heated to 90° C. and left to react overnight. At this point the mixture was partitioned between DCM and 0.1 M HCl$_{(aq)}$. The aqueous phase was extracted with DCM, and all combined organic layers were washed with 0.1 M HCl, brine, dried over Na$_2$SO$_4$ and concentrated. The resulting material was purified on a silica gel column using 10% to 20% MeOH in DCM to afford intermediate 2 (160 mg, 38%). (FIG. 15B, see: further also chemical reaction (b) in FIG. 3E).

Figure 15C:
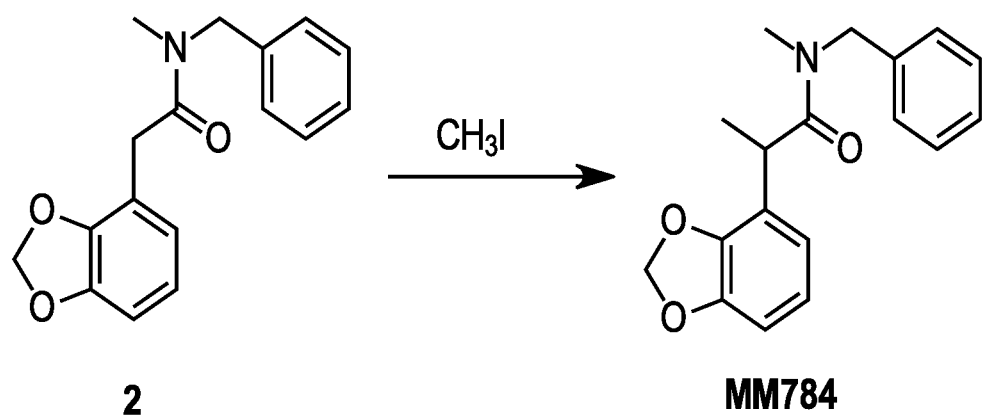

Referring next to FIG. 15C, a solution of diisopropylamine (91.1 μL, 649 μmol) in THF (1.8 mL) was cooled down to −78° C. To this solution was added 2.5 M n-butyllithium solution (140 μL, 351 μmol) dropwise, and the resulting mixture was stirred at −78° C. for 1 h. A solution of intermediate 2 (160 mg, 565 μmol) in THF (452 μL) was added dropwise, and the reaction mixture was warmed up to 0° C. and stirred for 1 h. At this time, iodomethane (53.4 μL, 858 μmol) was added and the reaction was warmed up to RT and stirred overnight. The reaction was quenched by adding sat. aq. NH$_4$Cl. The reaction mixture was then concentrated, redissolved in EtOAc and H$_2$O and the aqueous phase was extracted with EtOAc. All organic layers were combined, washed with brine, dried over Na$_2$SO$_4$, filtered, and concentrated. The material was purified on silica gel using 6:4 Hex:EtOAc to afford racemic MM784 (120 mg, 71%) as a light brown oil. LRMS-HESI: calc'd for C$_{18}$H$_{20}$NO$_3$ [M+H]$^+$ 298.14 m/z, observed 298.12 m/z. $^1$H NMR (400 MHz, CDCl$_3$) δ 7.33-7.23 (m, 3H), 7.22-7.16 (m, 1H), 7.03-6.97 (m, 1H), 6.94-6.80 (m, 2H), 6.72 (ddd, J=17.0, 7.4, 1.5 Hz, 1H), 5.96 (s, 1H), 5.80 (dd, J=71.0, 1.5 Hz, 1H), 4.78-4.43 (m, 2H), 4.14 (p, J=7.0 Hz, 1H), 2.89 (d, J=36.7 Hz, 3H), 1.49 (dd, J=7.7, 6.8 Hz, 3H). NOTE the peak reporting includes observations of rotameric isomers for this compound. (FIG. 15C, see: further also chemical reaction (c) in FIG. 3F).

It is noted that MM784 corresponds with chemical compound A$_y$(X):

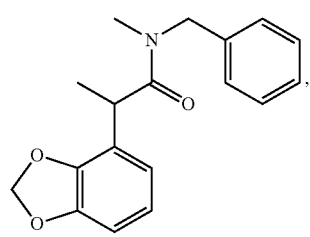

A$_y$(X)

set forth herein.

Figure 16A:
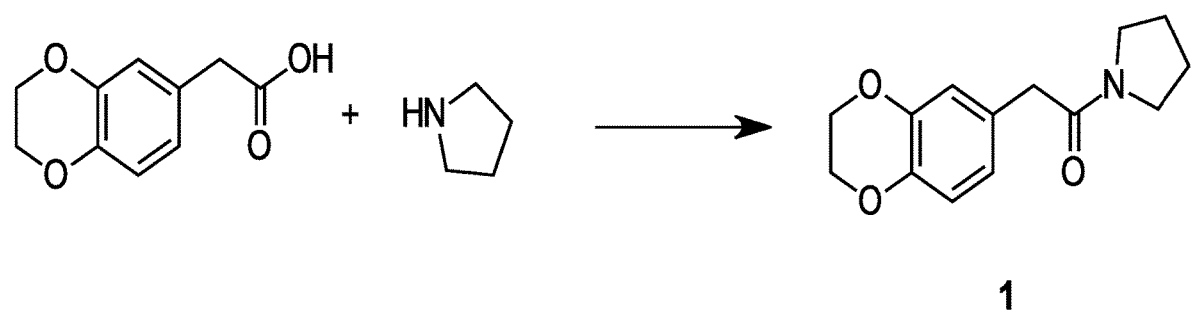
FIGS. 16A and 16B depict further example chemical reactions for the synthesis of another example compound according to the present disclosure.

Example 12—Preparation of a Twelfth Substituted Ethylamine Fused Heterocyclic Mescaline Derivative Referring to FIG. 16A, 1,4-benzodioxane-6-acetic acid (1.00 g, 5.15 mmol), EDC·HCl (2.08 g, 10.3 mmol) and N-hydroxysuccinimide (1.21 g, 10.3 mmol) were added to a reaction vial, followed by the addition of anhydrous THF (10.3 mL) and DMF (2.57 mL). The resulting mixture was stirred for an hour before the addition of pyrrolidine (430 μL, 5.15 mmol). After 18 hours the reaction mixture—was concentrated and the residue was re-suspended in half sat. NaHCO$_3$ and EtOAc. The organic layer was washed with sat NH$_4$Cl and brine, dried over anhydrous Na$_2$SO$_4$, filtered and concentrated. The resulting material was purified on silica gel using 0 to 60% EtOAc in hexanes to obtain intermediate 1 along with a minor amount of undetermined impurities. This material was used in subsequent steps without further purification. (FIG. 16A, see: further also chemical reaction (a) in FIG. 3G).

Figure 16B:
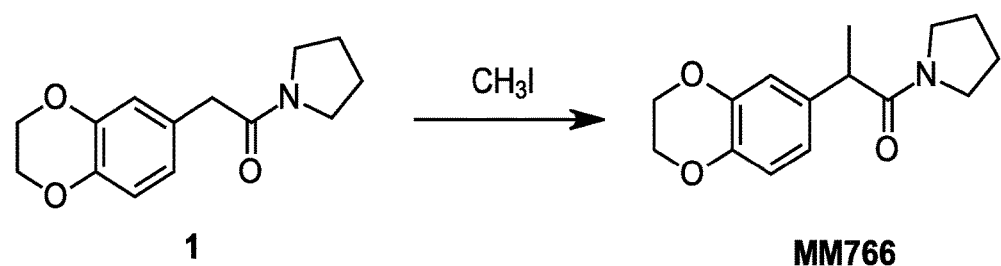

Referring next to FIG. 16B, a solution of diisopropylamine (196 μL, 1.40 mmol) in THF (3.9 mL) was cooled down to −78° C. To this solution was added 2.5 M n-butyllithium solution (534 μL, 1.33 mmol) dropwise, and the resulting mixture was stirred at −78° C. for 1 h. A solution of intermediate 1 (300 mg, 1.21 mmol) in THF (970 μL) was added dropwise, and the reaction mixture was warmed up to 0° C. and stirred for 1 h. At this time, iodomethane (115 μL, 1.84 mmol) was added and the reaction was warmed up to RT and stirred overnight. The reaction was quenched by adding sat. aq. NH$_4$Cl. The reaction mixture was then concentrated, redissolved in EtOAc and H$_2$O and the aqueous phase was extracted with EtOAc. All organic layers were combined, washed with brine, dried over Na$_2$SO$_4$, filtered, and concentrated. The material was purified on silica gel using 6:4 Hex:EtOAc to afford racemic MM766 (115 mg, 36%) as a pale yellow solid. LRMS-HESI: calc'd for C$_{15}$H$_{20}$NO$_3$ [M+H]$^+$ 262.14 m/z, observed 262.14 m/z. 1H NMR (400 MHz, CDCl$_3$) δ 6.82-6.72 (m, 3H), 4.22 (s, 4H), 3.61 (q, J=6.9 Hz, 1H), 3.55-3.47 (m, 1H), 3.46-3.35 (m, 2H), 3.21 (ddd, J=10.3, 7.2, 5.5 Hz, 1H), 1.94-1.69 (m, 4H), 1.39 (d, J=6.9 Hz, 3H). (FIG. 16B, see: further also chemical reaction (b) in FIG. 3G).

It is noted that MM766 corresponds with chemical compound A$_z$(XI):

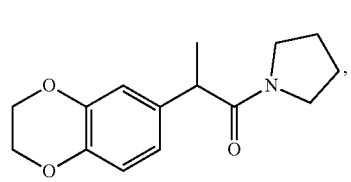

A$_z$(XI)

set forth herein.

Figure 17:
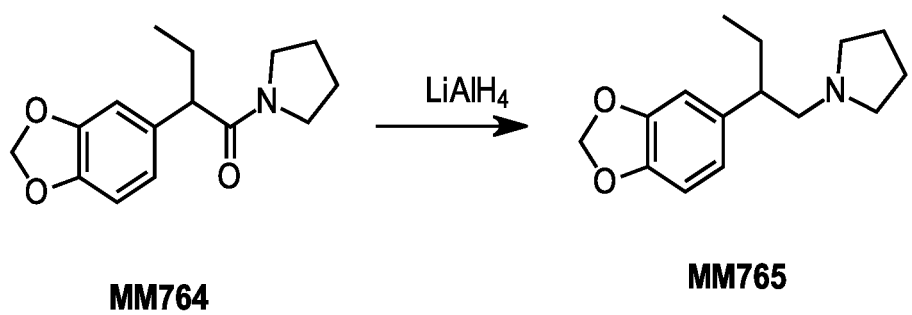
FIG. 17 depicts a further example reaction for the synthesis of another example compound according to the present disclosure.

Example 13—Preparation of a Thirteenth Substituted Ethylamine Fused Heterocyclic Mescaline Derivative Referring to FIG. 17, MM764 (50.0 mg, 191 μmol) (prepared as described in Example 6) was dissolved in THF (1.74 mL), the mixture was then cooled to 0° C. followed by addition of 2.0 M lithium aluminum hydride (144 μL, 287

µmol) in THF. The reaction mixture was warmed to room temperature and left to react overnight. The reaction was quenched using the Fieser work up and the resulting material was purified on silica gel using 10% MeOH in DCM to afford racemic MM765 (29 mg, 61%). LRMS-HESI: calc'd for $C_{15}H_{22}NO_2$ [M+H]$^+$ 248.16 m/z, observed 262.14 m/z. $^1$H NMR (400 MHz, CDCl$_3$) δ 6.73 (d, J=7.9 Hz, 1H), 6.67 (d, J=1.7 Hz, 1H), 6.63 (dd, J=7.9, 1.7 Hz, 1H), 5.92 (s, 2H), 2.74 (dd, J=11.7, 7.1 Hz, 1H), 2.60 (dtd, J=11.1, 6.6, 4.2 Hz, 1H), 2.47 (td, J=10.9, 4.8 Hz, 5H), 1.82 (dqd, J=13.6, 7.5, 4.4 Hz, 1H), 1.76-1.63 (m, 4H), 1.43 (ddq, J=13.5, 10.0, 7.3 Hz, 1H), 0.75 (t, J=7.4 Hz, 3H). (FIG. 17, see: further also chemical reaction (c) in FIG. 3A).

It is noted that MM765 corresponds with chemical compound B$_x$(IV):

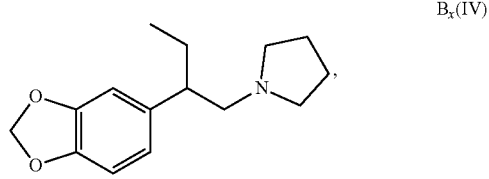 [SMILES: CCC(CN1CCCC1)c1ccc2c(c1)OCO2]

B$_x$(IV)

set forth herein.

Figure 18:
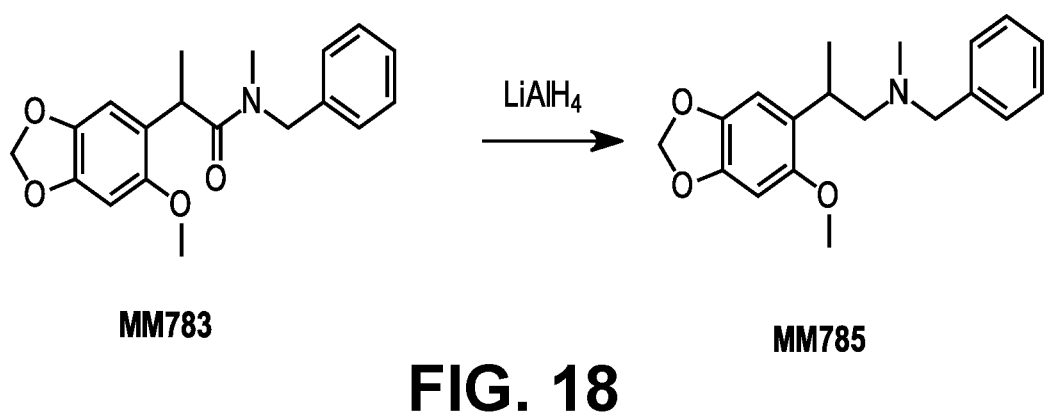
FIG. 18 depicts a further example reaction for the synthesis of another example compound according to the present disclosure.

Example 14—Preparation of a Fourteenth Substituted Ethylamine Fused Heterocyclic Mescaline Derivative Referring to FIG. 18, MM783 (48.0 mg, 147 µmol) (prepared as described in Example 10) was dissolved in THF (1.9 mL), the mixture was then cooled to 0° C. followed by addition of 2.0 M lithium aluminum hydride (110 µL, 220 µmol) in THF. The reaction mixture was warmed to room temperature and left to react overnight. The reaction was quenched using the Fieser work up and the resulting material was purified on silica gel using a 0 to 20% MeOH in DCM gradient to afford racemic MM785 (15 mg, 33%). LRMS-HESI: calc'd for $C_{19}H_{24}NO_3$ [M+H]$^+$ 314.18 m/z, observed 314.11 m/z. $^1$H NMR (400 MHz, CDCl$_3$) δ 7.38-7.21 (m, 5H), 6.59 (d, J=32.2 Hz, 2H), 5.95-5.90 (m, 2H), 3.77 (s, 3H), 3.60-3.40 (m, 3H), 2.48 (dd, J=12.1, 6.8 Hz, 1H), 2.36 (dd, J=12.1, 8.2 Hz, 1H), 2.23 (s, 3H), 1.20 (d, J=6.9 Hz, 3H). (FIG. 18, see: further also chemical reaction (d) in FIG. 3E).

It is noted that MM785 corresponds with chemical compound B$_x$(VIII):

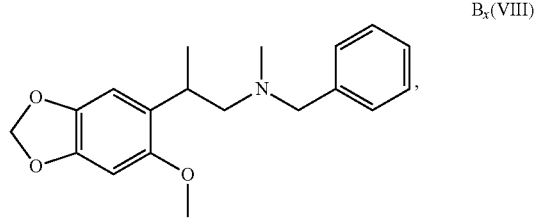 [SMILES: COc1cc2c(cc1C(C)CN(C)Cc1ccccc1)OCO2]

B$_x$(VIII)

set forth herein.

Figure 19:
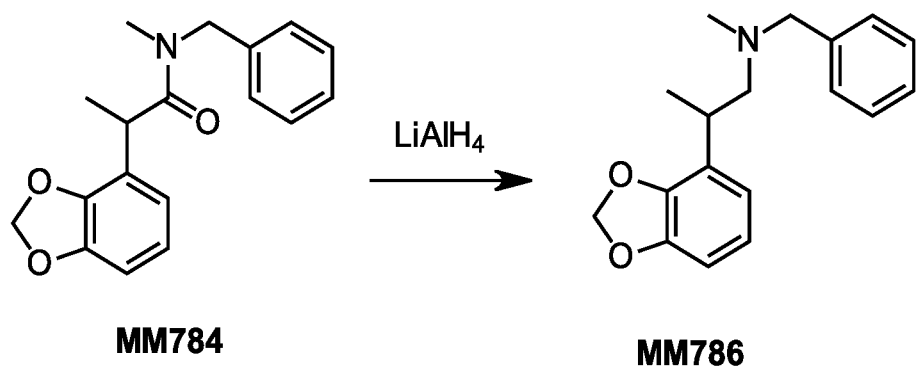
FIG. 19 depicts a further example reaction for the synthesis of another example compound according to the present disclosure.

Example 15—Preparation of a Fifteenth Substituted Ethylamine Fused Heterocyclic Mescaline Derivative Referring to FIG. 19, MM784 (54.0 mg, 182 µmol) (prepared as described in Example 11) was dissolved in THF (2.0 mL), the mixture was then cooled to 0° C. followed by addition of 2.0 M lithium aluminum hydride (136 µL, 272 µmol) in THF. The reaction mixture was warmed to room temperature and left to react overnight. The reaction was quenched using the Fieser work up and the resulting material was purified on silica gel using a 0 to 20% MeOH in DCM gradient to afford racemic MM786 (30 mg, 58%). LRMS-HESI: calc'd for $C_{18}H_{22}NO_2$ [M+H]$^+$ 284.16 m/z, observed 284.11 m/z. $^1$H NMR (400 MHz, CDCl$_3$) δ 7.36-7.19 (m, 5H), 6.81 (t, J=7.8 Hz, 1H), 6.76-6.66 (m, 2H), 5.92 (d, J=1.6 Hz, 1H), 5.88 (d, J=1.5 Hz, 1H), 3.60-3.48 (m, 2H), 3.19 (h, J=7.2 Hz, 1H), 2.67 (dd, J=12.2, 7.5 Hz, 1H), 2.49 (dd, J=12.2, 7.7 Hz, 1H), 2.26 (s, 3H), 1.31 (d, J=6.9 Hz, 3H). (FIG. 19, see: further also chemical reaction (d) in FIG. 3F).

It is noted that MM786 corresponds with chemical compound B$_y$(IX):

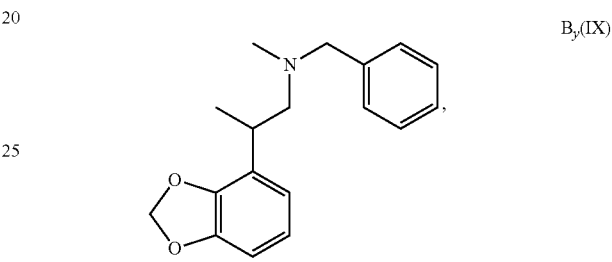

B$_y$(IX)

set forth herein.

Figure 20:
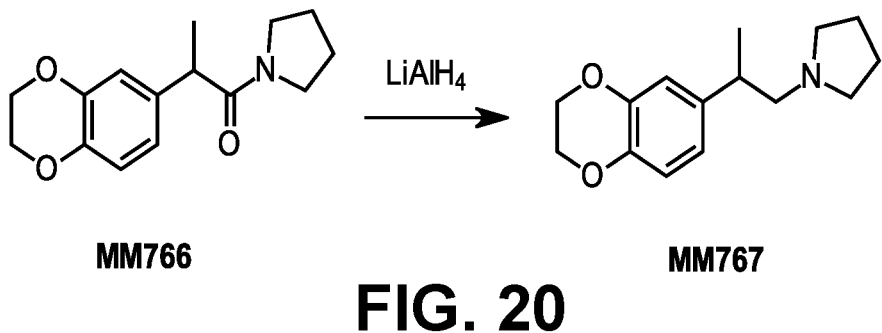
FIG. 20 depicts a further example reaction for the synthesis of another example compound according to the present disclosure.

Example 16—Preparation of a Sixteenth Substituted Ethylamine Fused Heterocyclic Mescaline Derivative Referring to FIG. 20, MM766 (55.0 mg, 210 µmol) (prepared as described in Example 12) was dissolved in THF (1.9 mL), the mixture was then cooled to 0° C. followed by addition of 2.0 M lithium aluminum hydride (150 µL, 301 µmol) in THF. The reaction mixture was warmed to room temperature and left to react overnight. The reaction was quenched using the Fieser work up and the resulting material was purified on silica gel using a 0 to 20% MeOH in DCM gradient to afford racemic MM767 (30 mg, 57%). LRMS-HESI: calc'd for $C_{15}H_{22}NO_2$ [M+H]$^+$ 248.17 m/z, observed 248.16 m/z. $^1$H NMR (400 MHz, CDCl$_3$) δ 6.78 (d, J=8.2 Hz, 1H), 6.73 (d, J=2.1 Hz, 1H), 6.69 (dd, J=8.3, 2.1 Hz, 1H), 4.29-4.19 (m, 4H), 2.81 (dp, J=8.8, 7.1 Hz, 1H), 2.63 (dd, J=11.8, 8.5 Hz, 1H), 2.56-2.40 (m, 5H), 1.81-1.67 (m, 4H), 1.24 (d, J=6.9 Hz, 3H). (FIG. 20, see: further also chemical reaction (c) in FIG. 3G).

It is noted that MM767 corresponds with chemical compound B$_z$(X):

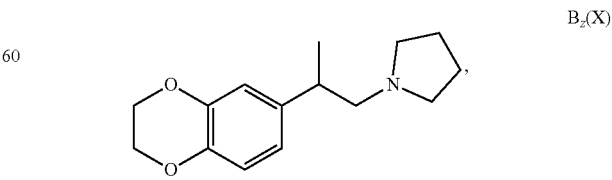

B$_z$(X)

set forth herein.

Figure 21A:
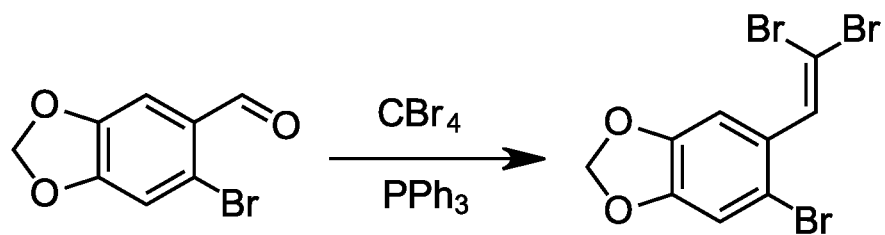
FIGS. 21A, 21B, 21C, and 21D depict further example chemical reactions for the synthesis of another example compound according to the present disclosure.

Example 17—Preparation of a Seventeenth Substituted Ethylamine Fused Heterocyclic Mescaline Derivative Referring to FIG. 21A, carbon tetrabromide (2.96 g, 8.65 mmol) was dissolved in 15 mL of DCM and cooled to 0° C. Slowly added to this, in a drop-wise manner was triphenylphosphine (4.58 g, 17.3 mmol) in 7 mL DCM. This mixture was left to stir for 20 minutes at 0° C. and then a solution of 6-bromo-1,3-benzodioxole-5-carboxaldehyde (1.00 g, 4.32 mmol) in 8 mL of DCM was added in a drop-wise manner. The mixture was left at 0° C. for 4 hours. At this point no starting material was observed to be present (TLC UV, 4:1 Hex:EtOAc) and added to the reaction mixture was 5 mL water, 25 mL EtOAc and 25 mL diethyl ether. This mixture was cooled back to 0° C. and the resulting solid material was filtered away. Added to the filtrate was an additional 15 mL of water and the aqueous phase was washed with EtOAc (2×20 mL). All organic phases were combined, washed with brine and dried over magnesium sulfate. After concentrating, the crude mixture was purified by column chromatography on a CombiFlash system (24 g 4:1 Hexanes:EtOAc) to yield the desired product, intermediate H (1.49 g, 90%) as a white solid. $^1$H NMR (400 MHz, CDCl$_3$) δ 7.43 (d, J=0.6 Hz, 1H), 7.13 (d, J=0.6 Hz, 1H), 7.04 (s, 1H), 6.02 (s, 2H). (FIG. 21A, see: further also chemical reaction (a) in FIG. 3E).

Figure 21B:
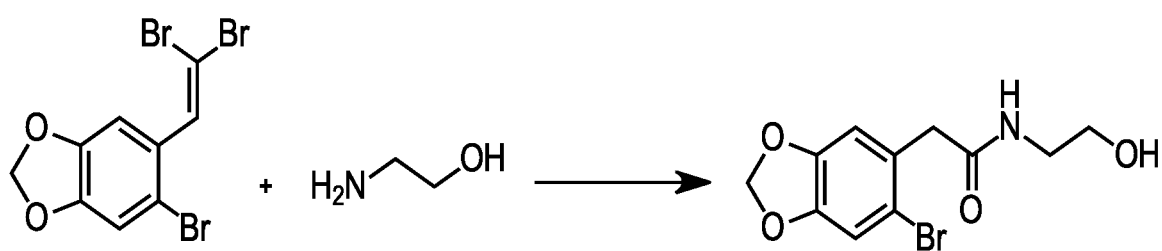

Referring next to FIG. 21B, to a solution of H (100 mg, 260 μmol) in DMF (1 mL) and H$_2$O (333 μL) was added ethanol amine (80 μL, 1.31 mmol). Upon heating to 90° C., the solid completely dissolved and the mixture was left to react at this temperature for 4 hours. At this point the starting material vicinal dibromide was no longer present in the reaction mixture (TLC, UV, 4:1 Hex:EtOAc) and the reaction was stopped. The mixture was poured into a separatory funnel containing 10 mL DCM and 10 mL 0.1 M HCl (aq.). The aqueous phase was extracted with DCM (3×10 mL) all organic phases were combined, washed with 0.1 M HCl (aq), brine and dried over magnesium sulfate. The organic phase was concentrated to a yellow solid which was purified by chromatography on a Combi-Flash system (4 g, 100% DCM, 10% MeOH in DCM, 20% MeOH in DCM) to recover intermediate MM611 (42.0 mg, 54%) as a white solid. HRMS-HESI calculated for C$_{11}$H$_{13}$BrNO$_4$ [M+H]$^+$: 302.0022 m/z, observed: 302.0022 m/z. $^1$H NMR (400 MHz, CDCl$_3$) δ 7.04 (s, 1H), 6.83 (s, 1H), 6.00 (s, 2H), 5.89 (s, 1H), 3.73-3.68 (m, 2H), 3.63 (s, 2H), 3.43-3.38 (m, 2H). (FIG. 21B, see: further also chemical reaction (b) in FIG. 3E).

Figure 21C:
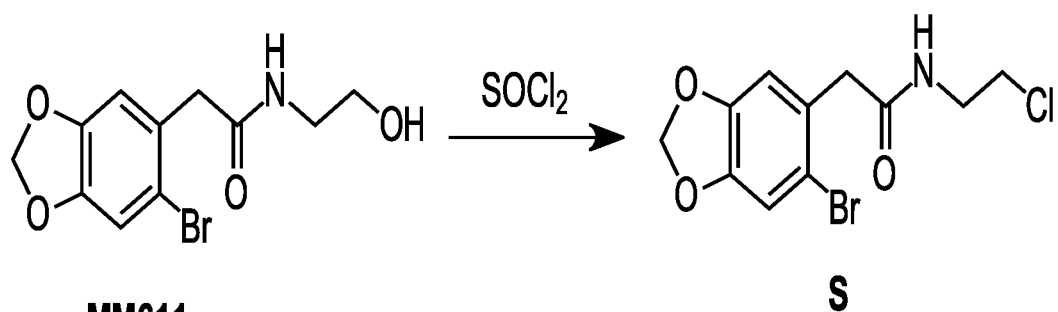

Referring next to FIG. 21C, intermediate MM611 (137 mg, 453 μmol) was suspended in CHCl$_3$ (3.50 mL). Added to this was thionyl chloride (100 μL, 1.36 mmol) and the mixture was left to stir at room temperature overnight. In the morning the reaction was monitored by TLC (UV, 9:1 DCM:MeOH). It was determined that no starting material remained and a new, less polar, compound had formed. The excess thionyl chloride was quenched with water and the reaction mixture was poured into a separatory funnel containing 15 mL of water. The aqueous layer was extracted with DCM (3×10 mL). All organic layers were combined, washed with water, brine, dried (MgSO$_4$), filtered and concentrated to provide intermediate S (127 mg, 87%) as a yellow powder. This was used in the next step without further purification. $^1$H NMR (400 MHz, CDCl$_3$) δ 7.04 (s, 1H), 6.83 (s, 1H), 6.00 (s, 2H), 5.88 (br s, 1H), 3.63 (s 2H), 3.60-3.57 (m, 4H). (FIG. 21C, see: further also chemical reaction (e) in FIG. 3D).

Figure 21D:
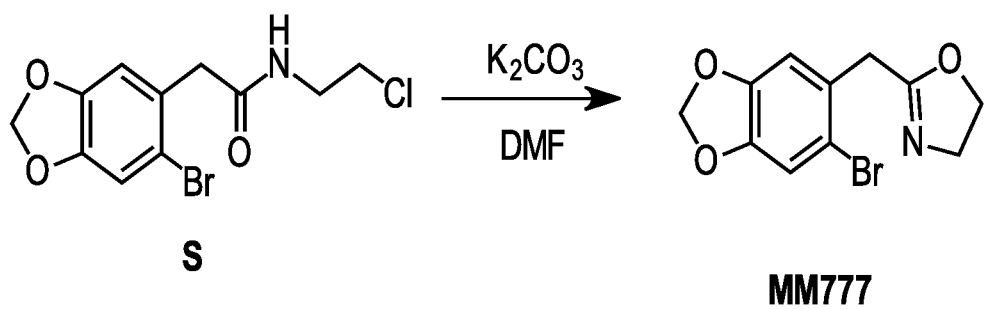

Referring next to FIG. 21D, added to a vial was intermediate S (75.0 mg, 234 μmol) and potassium carbonate (64.7 mg, 468 μmol) followed by DMF (1.13 mL). The temperature was increased to 75° C. and left to react overnight. In the morning the reaction was monitored by TLC (DCM:MeOH 9:1) and the mixture was observed to contain no starting material. The mixture was poured into a separatory funnel containing 10 mL of water and 10 mL of DCM. The aqueous layer was extracted with DCM (2×10 mL), all organic layers were combined, washed with water, brine, dried (MgSO$_4$) and filtered. After concentration the crude material was subjected to FC (4 g silica, DCM:MeOH 100:0 to 95:5) to provide the pure product, MM777 (45.0 mg, 68%), as a light yellow solid. LRMS-HESI: calc'd for C$_{11}$H$_{11}$BrNO$_3$ [M+H]$^+$ 283.99 m/z, observed 283.98 m/z. $^1$H NMR (400 MHz, CDCl$_3$) δ 7.01 (s, 1H), 6.82 (s, 1H), 5.96 (s, 2H), 4.26 (t, J=9.2 Hz, 2H), 3.84 (t, J=9.5 Hz, 2H), 3.67 (s, 2H). (FIG. 21D, see: further also chemical reaction (f) in FIG. 3E).

It is noted that MM777 corresponds with chemical compound C(IV):

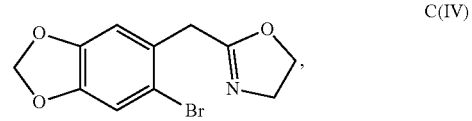 [SMILES: Brc1cc2c(cc1CC1=NCCO1)OCO2]

C(IV)

set forth herein.

The invention claimed is:

1. A pharmaceutical drug formulation comprising an effective amount of a compound or salt thereof, the compound selected from the group of compounds having the chemical formula:

B$_x$(II); B$_x$(IV); B$_x$(V); B$_x$(VI); B$_x$(VII); B$_x$(VIII); and B$_y$(IX):

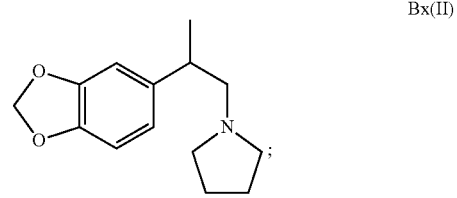

Bx(II)

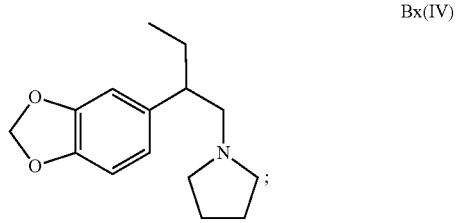

Bx(IV)

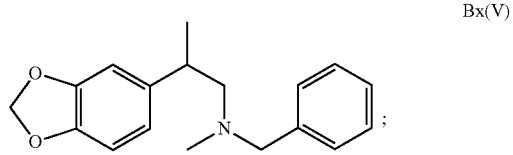

Bx(V)

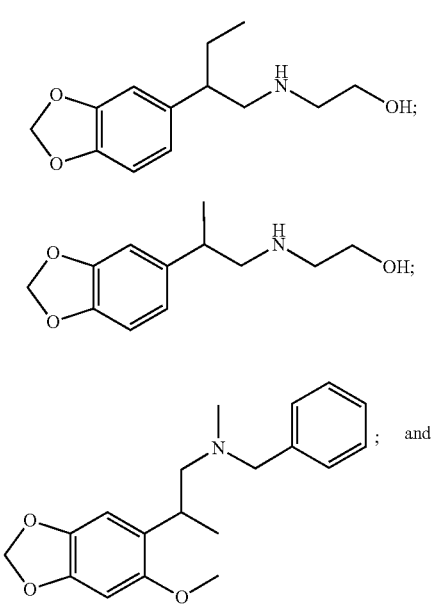

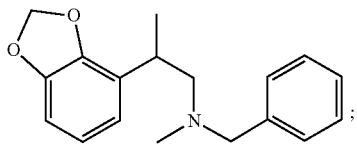

wherein in each of compound $B_x(II)$; $B_x(IV)$; $B_x(V)$; $B_x(VI)$; $B_x(VII)$; $B_x(VIII)$; and $B_y(IX)$, optionally, the nitrogen atom of the ethylamine portion of each compound may be protonated and includes a negatively charged anion balancing the positively charged nitrogen atom.

2. A method for treating a psychiatric disorder, the method comprising administering to a subject in need thereof a pharmaceutical formulation comprising a chemical compound according to claim 1, or a pharmaceutically acceptable salt thereof, wherein the pharmaceutical formulation is administered in an effective amount to treat the brain neurological disorder in the subject.

3. A pharmaceutical drug formulation according to claim 1, wherein the chemical compound has the formula $B_x(II)$.

* * * * *